United States Patent
Padmanabhan

(10) Patent No.: US 11,611,560 B2
(45) Date of Patent: Mar. 21, 2023

(54) SYSTEMS, METHODS, AND APPARATUSES FOR IMPLEMENTING CONSENSUS ON READ VIA A CONSENSUS ON WRITE SMART CONTRACT TRIGGER FOR A DISTRIBUTED LEDGER TECHNOLOGY (DLT) PLATFORM

(71) Applicant: salesforce.com, inc., San Francisco, CA (US)

(72) Inventor: Prithvi Krishnan Padmanabhan, San Ramon, CA (US)

(73) Assignee: salesforce.com, inc., San Francisco, CA (US)

(*) Notice: Subject to any disclaimer, the term of this patent is extended or adjusted under 35 U.S.C. 154(b) by 386 days.

(21) Appl. No.: 16/778,628

(22) Filed: Jan. 31, 2020

(65) Prior Publication Data

US 2021/0243193 A1    Aug. 5, 2021

(51) Int. Cl.
 *H04L 9/40* (2022.01)
 *G06Q 10/10* (2023.01)
 (Continued)

(52) U.S. Cl.
 CPC .......... *H04L 63/102* (2013.01); *G06F 16/248* (2019.01); *G06F 16/252* (2019.01);
 (Continued)

(58) Field of Classification Search
 None
 See application file for complete search history.

(56) References Cited

U.S. PATENT DOCUMENTS 5,634,053 A   5/1997  Noble et al.
6,333,929 B1  12/2001 Drottar et al.
(Continued)

FOREIGN PATENT DOCUMENTS

CN   108021986 A   5/2018
CN   109173261 A   1/2019
(Continued)

OTHER PUBLICATIONS

U.S. Appl. No. 17/153,872, filed Jan. 20, 2021, Prithvi Krishnan Padmanabhan.
(Continued)

*Primary Examiner* — Kaveh Abrishamkar
(74) *Attorney, Agent, or Firm* — Elliott, Ostrander & Preston, P.C.

(57) ABSTRACT

Described herein are means for implementing consensus on read via a consensus on write smart contract trigger for a Distributed Ledger Technology (DLT) platform in conjunction with a cloud based computing environment. According to a particular embodiment, there is a system having at least a processor and a memory therein, wherein the system is configurable with means for: operating a blockchain interface to a blockchain on behalf of a plurality of customers of the host organization, in which each of the plurality of customers operate as a participating node on the blockchain; receiving a read request for data stored on the blockchain from a user authenticated with the host organization; issuing a write transaction to the blockchain specifying both (i) the user and (ii) the read request; in which the write transaction automatically triggers execution of a smart contract to enforce access controls for the user; attaining consensus from the participating nodes of the blockchain for the write transaction at the blockchain pursuant to the access controls for the user being validated by the smart contract as allowing the user to read the data identified by the read request, in which the write transaction is added to the blockchain with (Continued)

an indication the user has permission to read the data identified by the read request; retrieving the data from the blockchain identified by the read request; throwing an event indicating the user has permission to read the data identified by the read request and returning as part of the thrown event, the data retrieved from the blockchain; and returning the data retrieved from the blockchain to the user in fulfillment of the read request. Other related embodiments are disclosed.

20 Claims, 34 Drawing Sheets

(51) Int. Cl.
    *G06F 16/248* (2019.01)
    *G06F 16/28* (2019.01)
    *G06F 16/25* (2019.01)

(52) U.S. Cl.
    CPC ............ *G06F 16/28* (2019.01); *G06Q 10/10* (2013.01); *H04L 63/08* (2013.01)

(56) References Cited

U.S. PATENT DOCUMENTS

| | | |
|---|---|---|
| 7,587,348 B2 | 9/2009 | Liao et al. |
| 8,095,463 B1 | 1/2012 | Hartmaier |
| 9,027,094 B1 | 5/2015 | Balazs et al. |
| 9,569,700 B1 | 2/2017 | Santos et al. |
| 9,690,822 B2 | 6/2017 | Roy-Faderman |
| 9,978,067 B1 | 5/2018 | Sadaghiani et al. |
| 10,042,636 B1 | 8/2018 | Srivastava et al. |
| 10,311,230 B2 | 6/2019 | Jagadeesan et al. |
| 10,373,129 B1 | 8/2019 | James et al. |
| 10,425,399 B2 | 9/2019 | Kravitz et al. |
| 10,482,466 B1 | 11/2019 | Walters et al. |
| 10,505,726 B1 | 12/2019 | Andon et al. |
| 10,521,196 B1 | 12/2019 | Wang et al. |
| 10,521,780 B1 | 12/2019 | Hopkins, III et al. |
| 10,541,821 B2 | 1/2020 | Toll et al. |
| 10,701,054 B2 | 6/2020 | Padmanabhan et al. |
| 10,728,283 B1 | 7/2020 | Dobrek et al. |
| 10,762,506 B1 | 9/2020 | Cash et al. |
| 10,885,567 B2 | 1/2021 | Bhattacherjee et al. |
| 10,929,866 B1 | 2/2021 | Qi et al. |
| 11,038,771 B2 | 6/2021 | Padmanabhan |
| 11,184,394 B1 | 11/2021 | Dobrek et al. |
| 11,244,313 B2 | 2/2022 | Padmanabhan et al. |
| 2005/0102159 A1 | 5/2005 | Mondshine |
| 2006/0118611 A1 | 6/2006 | Michelsen et al. |
| 2006/0259361 A1 | 11/2006 | Barhydt et al. |
| 2008/0066165 A1 | 3/2008 | Rosenoer |
| 2009/0037949 A1 | 2/2009 | Birch |
| 2011/0289140 A1 | 11/2011 | Pletter et al. |
| 2013/0041934 A1 | 2/2013 | Annamalaisami et al. |
| 2013/0226682 A1 | 8/2013 | Grossman |
| 2013/0346173 A1 | 12/2013 | Chandoor |
| 2014/0039990 A1 | 2/2014 | Georgi |
| 2014/0278894 A1 | 9/2014 | Toumayan et al. |
| 2015/0026061 A1 | 1/2015 | Siegel et al. |
| 2016/0027229 A1 | 1/2016 | Spanos et al. |
| 2016/0042383 A1 | 2/2016 | Joshi et al. |
| 2016/0092872 A1 | 3/2016 | Prakash et al. |
| 2016/0148251 A1 | 5/2016 | Thomas et al. |
| 2016/0350860 A1 | 12/2016 | Dintenfass et al. |
| 2016/0358267 A1 | 12/2016 | Arjomand et al. |
| 2016/0364743 A1 | 12/2016 | St. Lawrence et al. |
| 2017/0005804 A1 | 1/2017 | Zinder |
| 2017/0046698 A1 | 2/2017 | Haldenby et al. |
| 2017/0085545 A1 | 3/2017 | Lohe et al. |
| 2017/0103167 A1 | 4/2017 | Shah |
| 2017/0132625 A1 | 5/2017 | Kennedy |
| 2017/0132630 A1 | 5/2017 | Castinado et al. |
| 2017/0140145 A1 | 5/2017 | Shah |
| 2017/0200157 A1 | 7/2017 | Bergeon et al. |
| 2017/0206603 A1 | 7/2017 | Al-Masoud |
| 2017/0236215 A1 | 8/2017 | Eisen et al. |
| 2017/0289111 A1 | 10/2017 | Voell et al. |
| 2017/0295021 A1 | 10/2017 | Gutiérrez et al. |
| 2017/0295023 A1 | 10/2017 | Madhavan et al. |
| 2017/0300627 A1 | 10/2017 | Giordano et al. |
| 2017/0300872 A1 | 10/2017 | Brown et al. |
| 2017/0300876 A1 | 10/2017 | Musiala, Jr. et al. |
| 2017/0337534 A1 | 11/2017 | Goeringer et al. |
| 2017/0344988 A1 | 11/2017 | Cusden et al. |
| 2017/0353309 A1 | 12/2017 | Gray |
| 2017/0364549 A1 | 12/2017 | Abalos |
| 2017/0372300 A1 | 12/2017 | Dunlevy et al. |
| 2018/0005186 A1 | 1/2018 | Hunn |
| 2018/0006831 A1 | 1/2018 | Toll et al. |
| 2018/0019879 A1 | 1/2018 | Kravitz et al. |
| 2018/0026505 A1 | 1/2018 | Galmiche et al. |
| 2018/0041345 A1 | 2/2018 | Maim |
| 2018/0082256 A1 | 3/2018 | Tummuru et al. |
| 2018/0088928 A1 | 3/2018 | Smith et al. |
| 2018/0123779 A1 | 5/2018 | Zhang |
| 2018/0139186 A1 | 5/2018 | Castagna |
| 2018/0144042 A1 | 5/2018 | Sheng et al. |
| 2018/0158162 A1 | 6/2018 | Ramasamy |
| 2018/0165416 A1 | 6/2018 | Saxena et al. |
| 2018/0189100 A1 | 7/2018 | Nemoto et al. |
| 2018/0191503 A1 | 7/2018 | Alwar et al. |
| 2018/0204213 A1 | 7/2018 | Zappier et al. |
| 2018/0218176 A1 | 8/2018 | Voorhees et al. |
| 2018/0225611 A1 | 8/2018 | Daniel et al. |
| 2018/0232644 A1 | 8/2018 | Acharya et al. |
| 2018/0232659 A1 | 8/2018 | Ranatunga et al. |
| 2018/0239897 A1 | 8/2018 | Ventura |
| 2018/0247191 A1 | 8/2018 | Katz et al. |
| 2018/0253661 A1 | 9/2018 | Strauss |
| 2018/0262505 A1 | 9/2018 | Ligatti |
| 2018/0268401 A1 | 9/2018 | Ortiz et al. |
| 2018/0268506 A1 | 9/2018 | Wodetzki et al. |
| 2018/0276553 A1 | 9/2018 | Redkar et al. |
| 2018/0276626 A1 | 9/2018 | Laiben |
| 2018/0307990 A1 | 10/2018 | Chawla et al. |
| 2018/0365686 A1 | 12/2018 | Kondo |
| 2018/0367528 A1 | 12/2018 | Schwarz et al. |
| 2019/0012249 A1 | 1/2019 | Mercuri et al. |
| 2019/0012595 A1 | 1/2019 | Beser et al. |
| 2019/0019090 A1 | 1/2019 | Chacko et al. |
| 2019/0020716 A1* | 1/2019 | Fukuchi .............. G06F 11/2025 |
| 2019/0028276 A1 | 1/2019 | Pierce et al. |
| 2019/0034404 A1 | 1/2019 | Anderson et al. |
| 2019/0035018 A1 | 1/2019 | Nolan et al. |
| 2019/0050855 A1 | 2/2019 | Martino et al. |
| 2019/0052454 A1 | 2/2019 | Wright et al. |
| 2019/0058709 A1 | 2/2019 | Kempf et al. |
| 2019/0081796 A1 | 3/2019 | Chow et al. |
| 2019/0086988 A1 | 3/2019 | He et al. |
| 2019/0087598 A1 | 3/2019 | Adkins et al. |
| 2019/0087892 A1 | 3/2019 | Pinski et al. |
| 2019/0102409 A1 | 4/2019 | Shi et al. |
| 2019/0102423 A1 | 4/2019 | Little et al. |
| 2019/0108543 A1 | 4/2019 | Chan et al. |
| 2019/0109702 A1 | 4/2019 | Maggu et al. |
| 2019/0109713 A1 | 4/2019 | Clark et al. |
| 2019/0122186 A1 | 4/2019 | Kano et al. |
| 2019/0147532 A1 | 5/2019 | Singh et al. |
| 2019/0149325 A1 | 5/2019 | Garagiola et al. |
| 2019/0149334 A1 | 5/2019 | Velden |
| 2019/0158270 A1 | 5/2019 | Berti |
| 2019/0164156 A1 | 5/2019 | Lindemann |
| 2019/0164220 A1 | 5/2019 | Raj et al. |
| 2019/0172282 A1 | 6/2019 | Patel |
| 2019/0182047 A1 | 6/2019 | Andreina et al. |
| 2019/0188706 A1 | 6/2019 | McCurtis |
| 2019/0215149 A1 | 7/2019 | Ramasamy et al. |
| 2019/0228006 A1 | 7/2019 | Tormasov et al. |
| 2019/0236559 A1 | 8/2019 | Padmanabhan |
| 2019/0236562 A1 | 8/2019 | Padmanabhan |
| 2019/0236598 A1 | 8/2019 | Padmanabhan |
| 2019/0236606 A1 | 8/2019 | Padmanabhan et al. |

(56) References Cited

U.S. PATENT DOCUMENTS

| | | |
|---|---|---|
| 2019/0238316 A1 | 8/2019 | Padmanabhan |
| 2019/0238525 A1 | 8/2019 | Padmanabhan et al. |
| 2019/0287026 A1 | 9/2019 | Calmon et al. |
| 2019/0287116 A1 | 9/2019 | Karantzis |
| 2019/0295114 A1 | 9/2019 | Pavletic et al. |
| 2019/0303121 A1 | 10/2019 | Padmanabhan |
| 2019/0303445 A1 | 10/2019 | Padmanabhan |
| 2019/0303579 A1 | 10/2019 | Reddy et al. |
| 2019/0306235 A1 | 10/2019 | Veale et al. |
| 2019/0334716 A1 | 10/2019 | Kocsis et al. |
| 2019/0370634 A1 | 12/2019 | Moreno et al. |
| 2019/0370866 A1 | 12/2019 | Lawbaugh et al. |
| 2019/0377806 A1 | 12/2019 | Padmanabhan et al. |
| 2019/0385160 A1 | 12/2019 | Safak et al. |
| 2019/0386834 A1 | 12/2019 | Furukawa |
| 2019/0394175 A1* | 12/2019 | Zhang ................. H04L 9/3239 |
| 2020/0019923 A1 | 1/2020 | Santhar et al. |
| 2020/0027005 A1 | 1/2020 | Harrison et al. |
| 2020/0027090 A1 | 1/2020 | Braundmeier |
| 2020/0042939 A1 | 2/2020 | Padmanabhan |
| 2020/0050613 A1 | 2/2020 | Gauvreau, Jr. |
| 2020/0057860 A1 | 2/2020 | Patil et al. |
| 2020/0074477 A1 | 3/2020 | Lamba et al. |
| 2020/0074515 A1 | 3/2020 | Ghatage et al. |
| 2020/0076574 A1 | 3/2020 | Austin et al. |
| 2020/0089672 A1 | 3/2020 | Velisetti et al. |
| 2020/0089895 A1 | 3/2020 | Gollogly |
| 2020/0104636 A1 | 4/2020 | Halevi et al. |
| 2020/0118011 A1 | 4/2020 | Kaiser et al. |
| 2020/0133955 A1 | 4/2020 | Padmanabhan et al. |
| 2020/0134656 A1 | 4/2020 | Padmanabhan |
| 2020/0143267 A1 | 5/2020 | Gidney |
| 2020/0169546 A1 | 5/2020 | Padmanabhan |
| 2020/0186338 A1 | 6/2020 | Andon et al. |
| 2020/0234386 A1 | 7/2020 | Blackman et al. |
| 2020/0250174 A1 | 8/2020 | Padmanabhan et al. |
| 2020/0250176 A1 | 8/2020 | Padmanabhan |
| 2020/0250177 A1 | 8/2020 | Padmanabhan |
| 2020/0250295 A1 | 8/2020 | Padmanabhan |
| 2020/0250683 A1 | 8/2020 | Padmanabhan et al. |
| 2020/0250747 A1 | 8/2020 | Padmanabhan |
| 2020/0252205 A1 | 8/2020 | Padmanabhan |
| 2020/0252404 A1 | 8/2020 | Padmanabhan |
| 2020/0252406 A1 | 8/2020 | Padmanabhan et al. |
| 2020/0336475 A1 | 10/2020 | Padmanabhan et al. |
| 2020/0344132 A1 | 10/2020 | Padmanabhan |
| 2020/0357084 A1 | 11/2020 | Hunn et al. |
| 2021/0152535 A1 | 5/2021 | Padmanabhan et al. |
| 2021/0152536 A1 | 5/2021 | Padmanabhan et al. |
| 2021/0182423 A1 | 6/2021 | Padmanabhan |
| 2021/0192652 A1* | 6/2021 | Blaikie, III ........... G06F 16/245 |
| 2021/0226774 A1 | 7/2021 | Padmanabhan |
| 2021/0243193 A1 | 8/2021 | Padmanabhan |
| 2022/0006705 A1 | 1/2022 | Padmanabhan |
| 2022/0019575 A1* | 1/2022 | Qian ....................... G06F 16/27 |

FOREIGN PATENT DOCUMENTS

| | | |
|---|---|---|
| CN | 2019800219289 | 9/2020 |
| EP | 197071681 | 8/2020 |
| JP | 2020541893 | 7/2020 |
| WO | 2016161073 A1 | 10/2016 |
| WO | 2018007827 A1 | 1/2018 |
| WO | 2018007828 A2 | 1/2018 |
| WO | 2018194707 A1 | 10/2018 |
| WO | 2018230581 A1 | 12/2018 |
| WO | 2019152750 A1 | 8/2019 |

OTHER PUBLICATIONS

U.S. Appl. No. 17/163,547, filed Jan. 31, 2021, Prithvi Krishnan Padmanabhan.
U.S. Appl. No. 17/348,286, filed Jun. 15, 2021, Prithvi Krishnan Padmanabhan.
Bendor-Samuel, P. (2017) Blockchain-enabled "smart-contracts" solve problems in administering IT ecosystem services, CIO, 3 pages.
Final Office Action for U.S. Appl. No. 15/932,099 dated Jun. 1, 2020, 27 pages.
Final Office Action for U.S. Appl. No. 16/177,305 dated Feb. 2, 2021, 47 pages.
Final Office Action for U.S. Appl. No. 16/264,657 dated May 17, 2021, 36 pages.
Non-final Office Action for U.S. Appl. No. 16/177,305 dated Jul. 23, 2020, 52 pages.
Normans Media Ltd., Smart Contracts: Blockchain-based contracts that don't require lawyers. 2016, 4 pages.
Notice of Allowance for U.S. Appl. No. 16/264,653 dated Jun. 7, 2021, 21 pages.
Notice of Allowance for U.S. Appl. No. 16/683,945, dated Feb. 10, 2021, 14 pages.
Notice of Allowance for Application No. 15/932,100, dated Feb. 20, 2020, 5 pages.
Office Action for U.S. Appl. No. 15/885,803, dated Apr. 14, 2021, 31 pages.
Office Action for U.S. Appl. No. 15/932,092 Mar. 17, 2021, 23 pages.
Office Action for U.S. Appl. No. 16/177,300 dated Jun. 16, 2021, 80 pages.
Office Action for U.S. Appl. No. 16/683,945, dated Sep. 14, 2020, 18 pages.
Office Action for U.S. Appl. No. 15/932,099 dated Oct. 3, 2019, 26 pages.
Shukla, A., et al., "Smart Contracts for Multiagent Plan Execution in Untrusted Cyber-physical Systems," 2018 IEEE 25th International Conference on High Performance Computing Workshops (HiPCW), 10 pages.
Final Office Action for U.S. Appl. No. 15/885,803 dated Nov. 17, 2021, 28 pages.
Final Office Action for U.S. Appl. No. 15/885,811, dated Feb. 3, 2022, 38 pages.
Final Office Action for U.S. Appl. No. 15/932,092 dated Sep. 27, 2021, 25 pages.
Final Office Action for U.S. Appl. No. 15/932,099 dated Nov. 1, 2021, 35 pages.
Mandal, S., "A Framework for Modular Norm Extraction, Modeling, and Reasoning," [Doctoral dissertation, University of Nebraska], 2017, 151 pages, ProQuest Dissertations Publishing.
Non-final Office Action for U.S. Appl. No. 16/399,920, dated Feb. 17, 2022, 66 pages.
Non-final Office Action for U.S. Appl. No. 16/777,409 dated Oct. 4, 2021, 42 pages.
Non-final Office Action for U.S. Appl. No. 16/917,506, dated Oct. 4, 2021, 44 pages.
Norta, A. et al., "Self-Aware Agent Supported Contract Management on Blockchains for Legal Accountability," 2017, 37 pages.
Notice of Allowance for U.S. Appl. No. 16/177,300, dated Oct. 6, 2021, 14 pages.
Notice of Allowance for U.S. Appl. No. 16/264,653 dated Sep. 29, 2021, 17 pages.
Notice of Allowance for U.S. Appl. No. 16/683,932 dated Dec. 3, 2021, 9 pages.
Office Action for U.S. Appl. No. 15/885,811 dated Aug. 4, 2021, 26 pages.
Office Action for U.S. Appl. No. 16/177,305 dated Sep. 16, 2021, 42 pages.
Office Action for U.S. Appl. No. 16/264,645 dated Oct. 27, 2021, 46 pages.
Office Action for U.S. Appl. No. 16/399,913, dated Dec. 24, 2021, 51 pages.
"BigchainDB 2.0 the Blockchain Database," Berlin Germany dated May 2018, 14 pages.
"Deloitte IoT Powered by Blockchain", dated May 2017, 20 pages.
"How Creating Digital Twins In Blockchain Will Protect Brands?", dated Nov. 15, 2018, 4 pages.
"How Smart Certificates of Authenticity Improve Asset Management", Jan. 17, 2019, 4 pages.

(56) References Cited

OTHER PUBLICATIONS

"Nasdaq, Using Blockchain Track Assets Proof Ownership", dated Nov. 30, 2016, 30 pages.
Azaria, A., et al "MedRec: Using Blockchain for Medical Data Access and Permission Management," 2016 2nd Int'l Conference on Open and Big Data, IEEE, (Aug. 22, 2016), pp. 25-30.
Final Office Action for U.S. Appl. No. 15/885,803, dated Jul. 20, 2020, 29 pages.
Final Office Action for U.S. Appl. No. 15/885,811, dated Aug. 5, 2020, 45 pages.
Final Office Action for U.S. Appl. No. 15/932,092 dated Jun. 22, 2020, 42 pages.
Final Office Action for U.S. Appl. No. 15/932,099 dated Jun. 1, 2020, 26 pages.
Genestier, P., et al, "Blockchain for Consent Management in the eHealth Environment: A Nugget for Privacy and Security Challenges," Journal of the Int'l Society for Telemedicine and eHealth, (Jan. 1, 2017), 4 pages.
International Search Report and Written Opinion for Application No. PCT/US2019/036103, dated Aug. 1, 2019, 12 pages.
International Search Report and Written Opinion for Application No. PCT/US2020/01561B dated May 11, 2020, 13 pages.
International Search Report and Written Opinion for International Patent Application No. PCT/US2019/016199, dated Apr. 2, 2019, 12 pages.
McConaghy et al., "BigchainDB: A Scalable Blockchain Database (DRAFT)" dated Jun. 8, 2016, 64 Pages.
Notice of Allowance for U.S. Appl. No. 15/932,100 dated Feb. 20, 2020, 5 pages.
Notice of Allowance for U.S. Appl. No. 15/940,646, dated Oct. 31, 2019, 8 pages.
Notice of allowance for U.S. Appl. No. 16/264,653 dated Nov. 23, 2020, 16 pages.
Office Action for U.S. Appl. No. 15/885,803 dated Jan. 8, 2020, 47 pages.
Office Action for U.S. Appl. No. 15/885,811 dated Jan. 17, 2020, 40 pages.
Office Action for U.S. Appl. No. 15/932,092 dated Jan. 22, 2020, 36 pages.
Office Action for U.S. Appl. No. 15/932,100, dated Nov. 8, 2019, 9 pages.
Office Action for U.S. Appl. No. 15/940,646, dated Apr. 29, 2019, 7 pages.
Office Action for U.S. Appl. No. 16/177,305 dated Jul. 23, 2020, 41 pages.
Office Action for U.S. Appl. No. 16/264,657, dated Sep. 18, 2020, 33 pages.
Office Action for U.S. Appl. No. 16/683,945 dated Sep. 14, 2020, 26 Pages.
Office Action for EP Application No. 19707168.1 dated Sep. 24, 2020, 3 pages.
Ojha, "Chaincode for Go Developers, Part 1: Writing Blockchain Chaincode in Go for Hyperledger Fabric v0.6," 2017, 15 pages.
Peterson, K., et al, "A Blockchain-Based Approach to Health Information Exchange Networks," (Aug. 8, 2016), Retrieved from the Internet: URL: http://kddlab.zjgsu.edu.cn:7200/research/blockchain/huyiyang-reference/A%20Blockchain-Based%20Approach%20to%20Health%20Information%20Exchange.pdf, Retrieved on Mar. 21, 2019), 10 pages.
Salesforce, "Force.com Apex Code Developer's Guide," version 34.0, 2015, 1000 pages.
Sandgaard, J., et al, "MedChain White Paper V1.1" (Oct. 1, 2017), Retrieved from the Internet: URL:https://www.medchain.global/doc/Medchain%20Whitepaper%20v1.1.pdf, Retrieved on Mar. 21, 2019, 54 pages.
Using Sawtooth with Docker: Configuring the List of Transaction Families, Apr. 6, 2018, 13 pages.
Wikipedia, "Federate database system," Jun. 8, 2016, https://en.wikipedia.org/w/index.php/?title=Federated%20database%20system&oldid=808166410, 6 pages.
Wikipedia, "Solidity," Feb. 2, 2017, https://web.archive.org/web/2017020202304/https://en.wikipeida.org/wiki/Solidity (Year: 2017), 3 pages.
Zyskind, G., et al, "Decentralizing Privacy: Using Blockchain to Protect Personal Data," 2015 IEEE Security and Privacy Workshops (May 1, 2015), 5 pages.

* cited by examiner

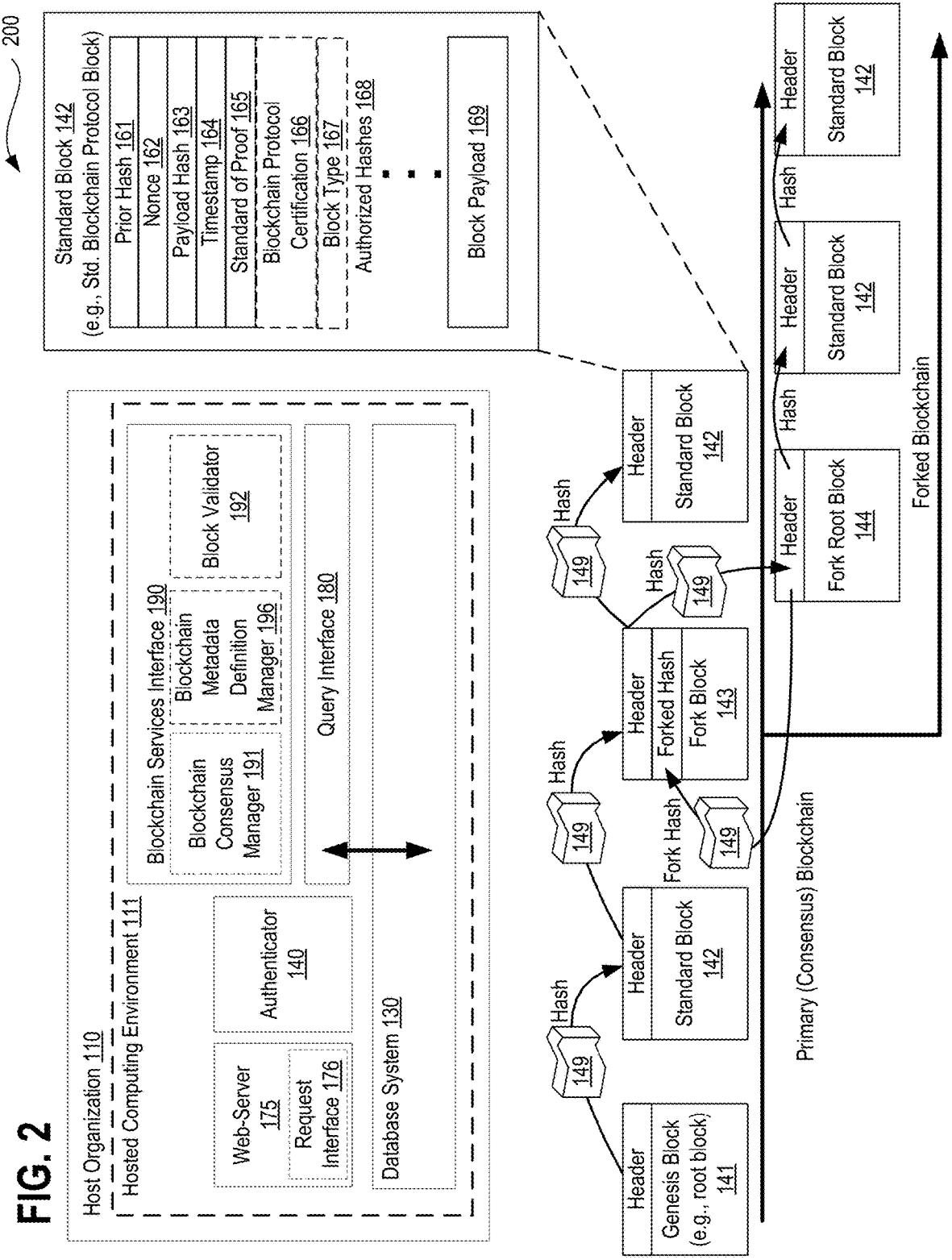

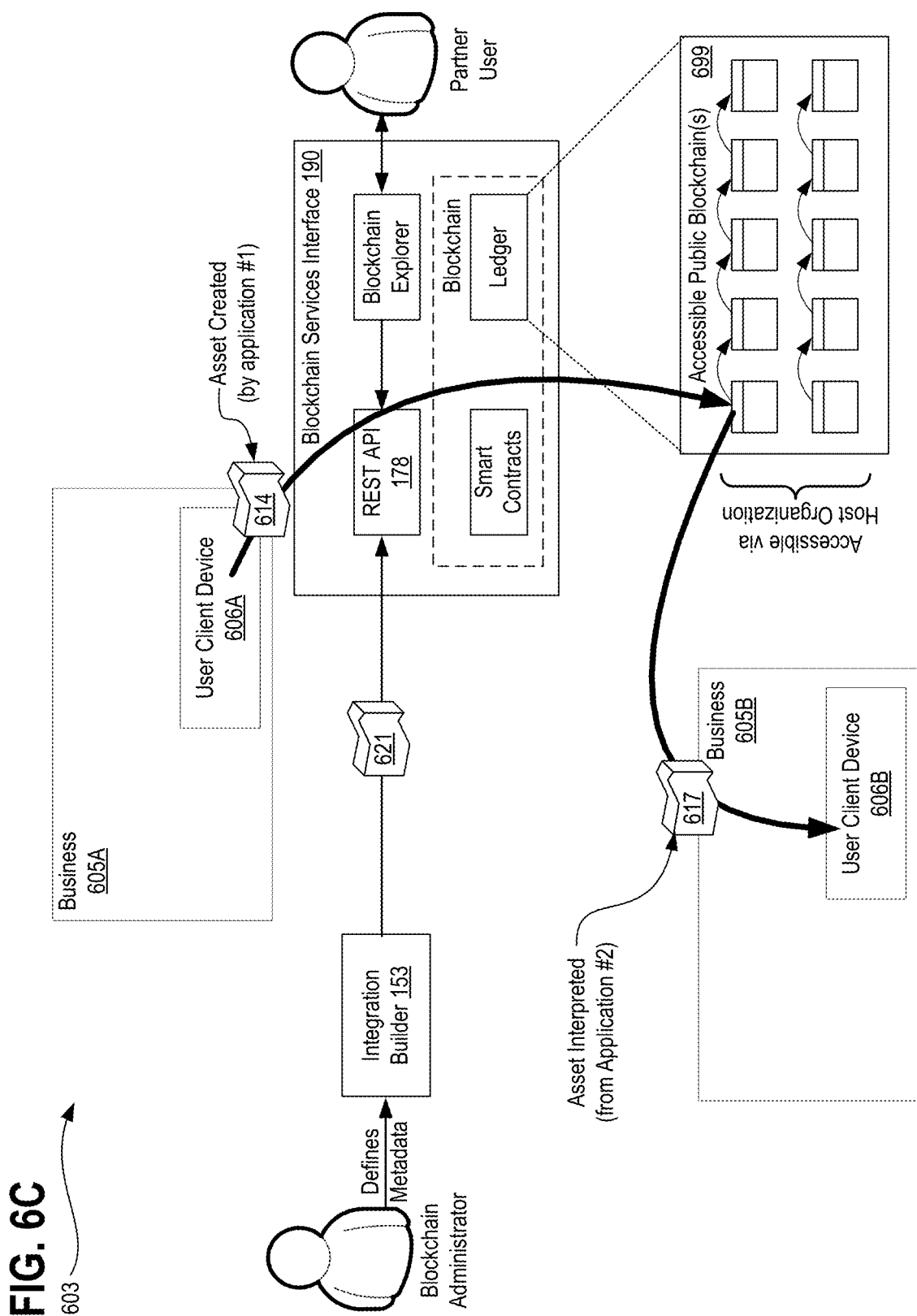

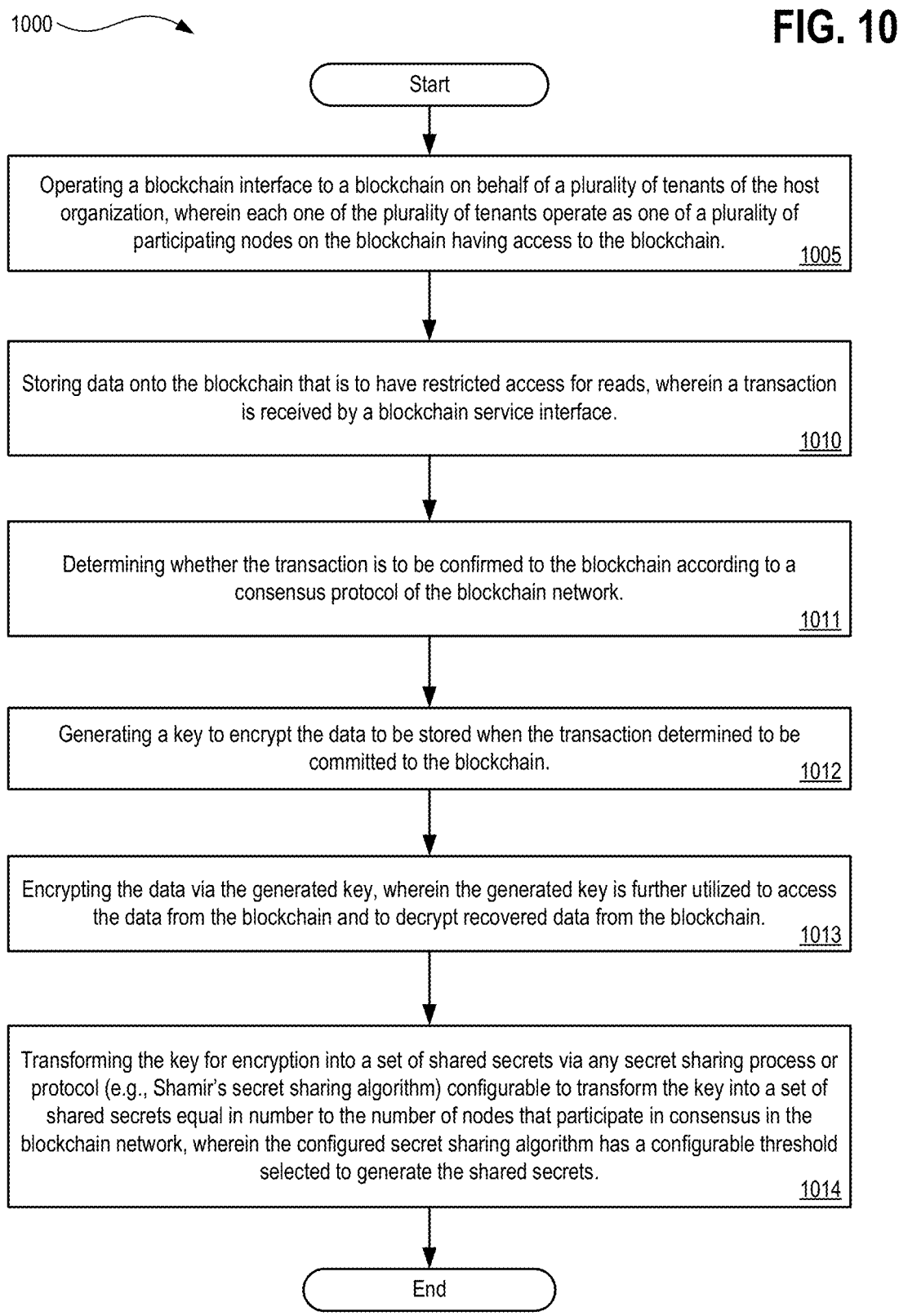

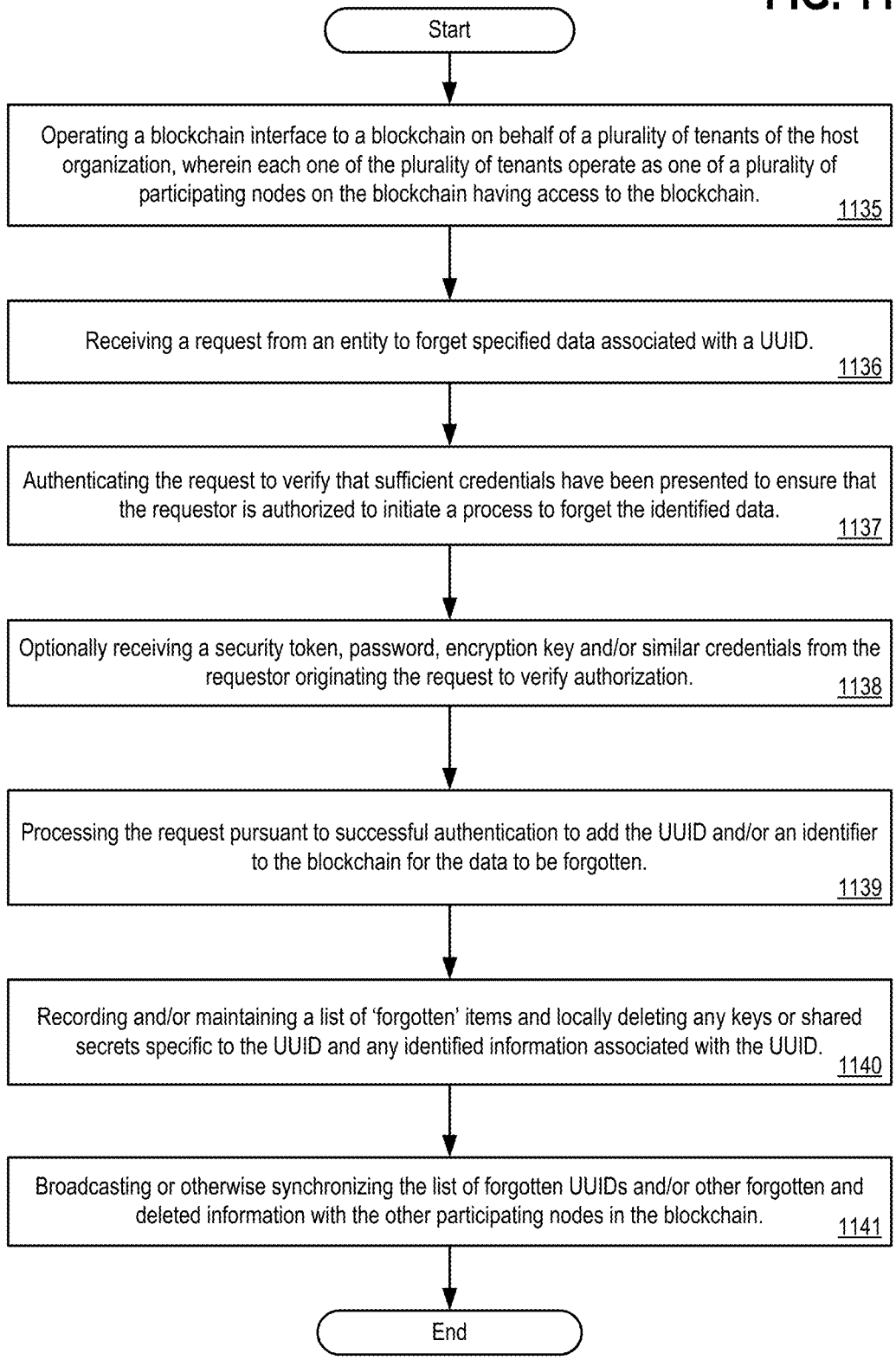

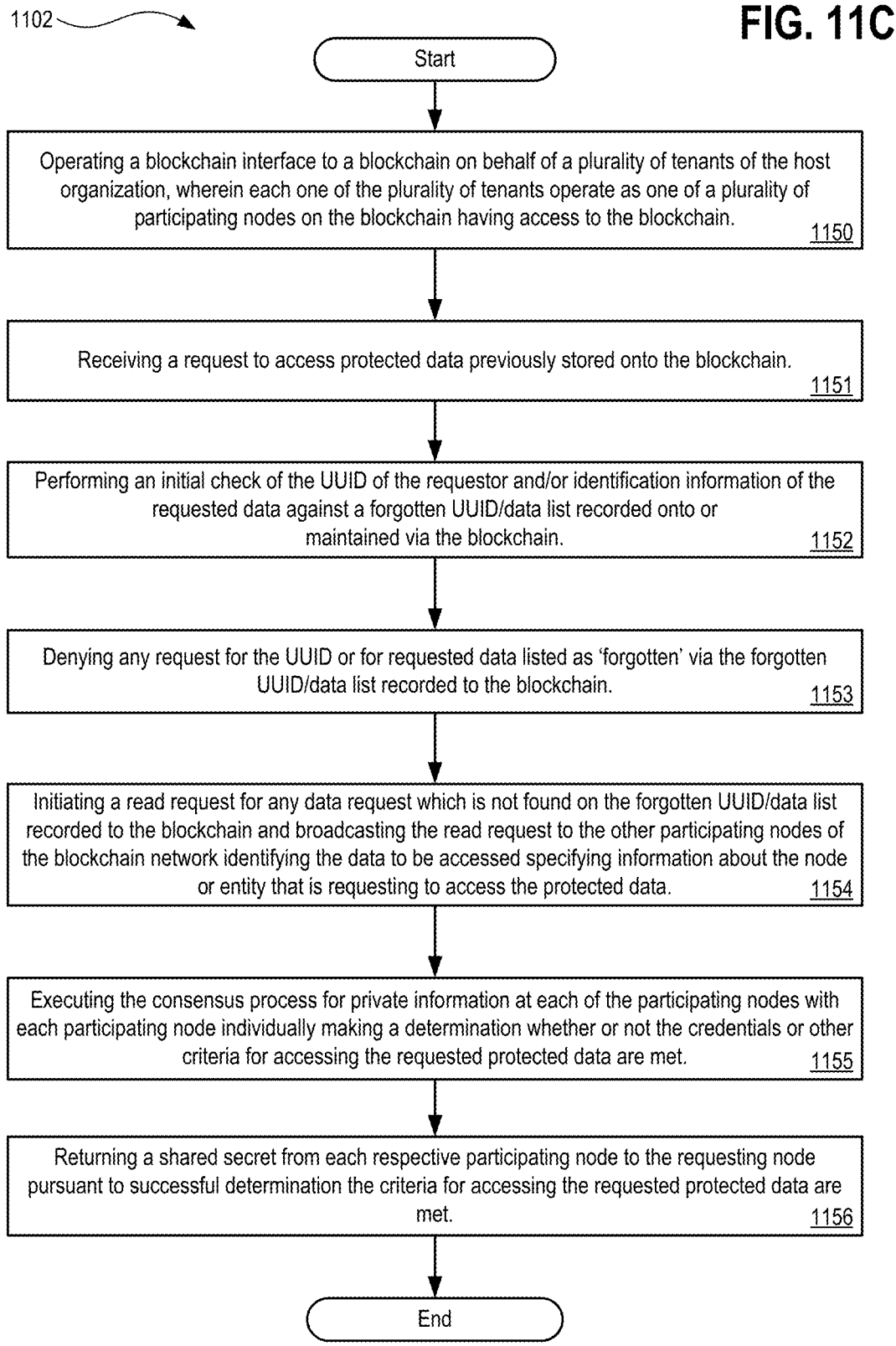

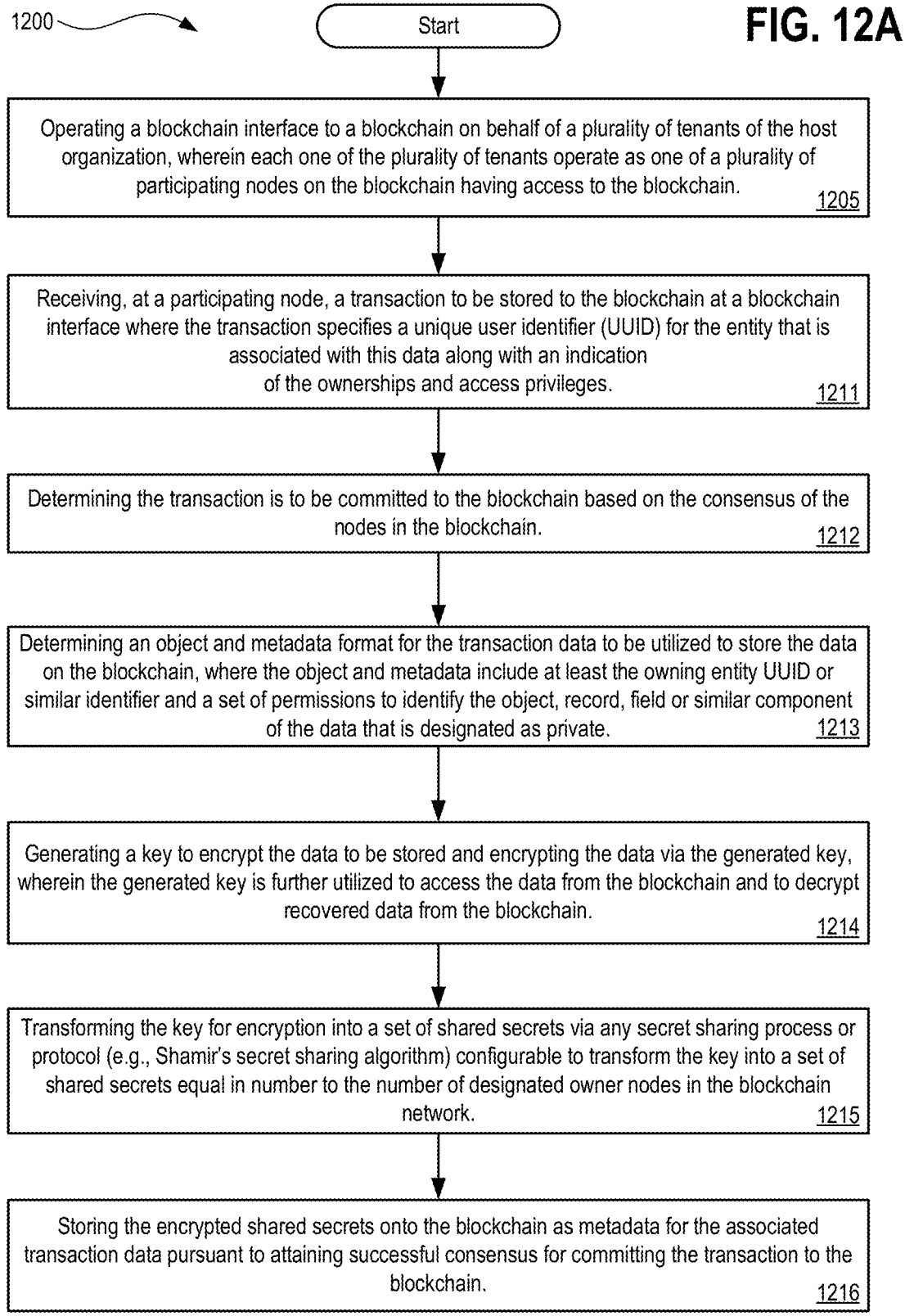

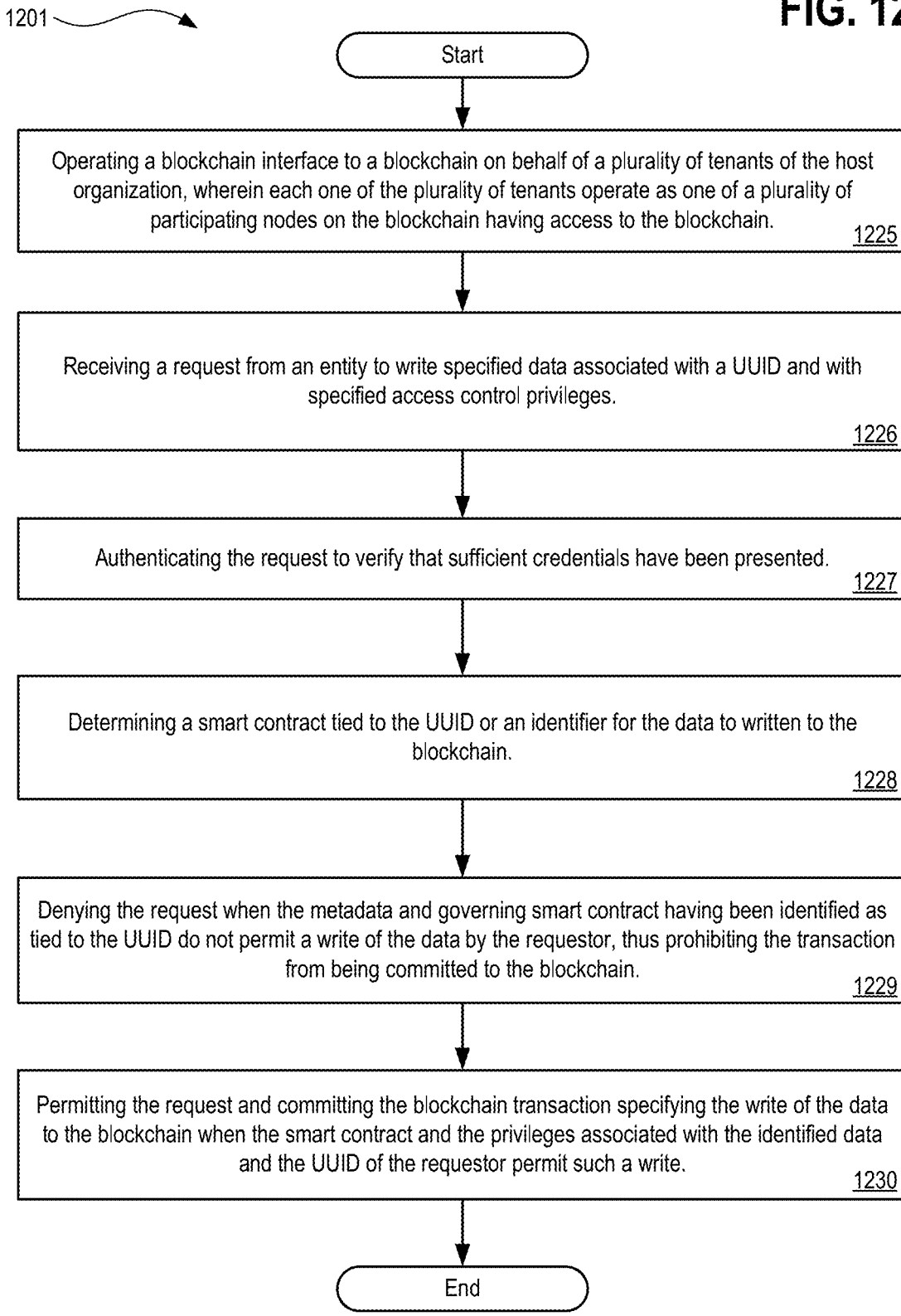

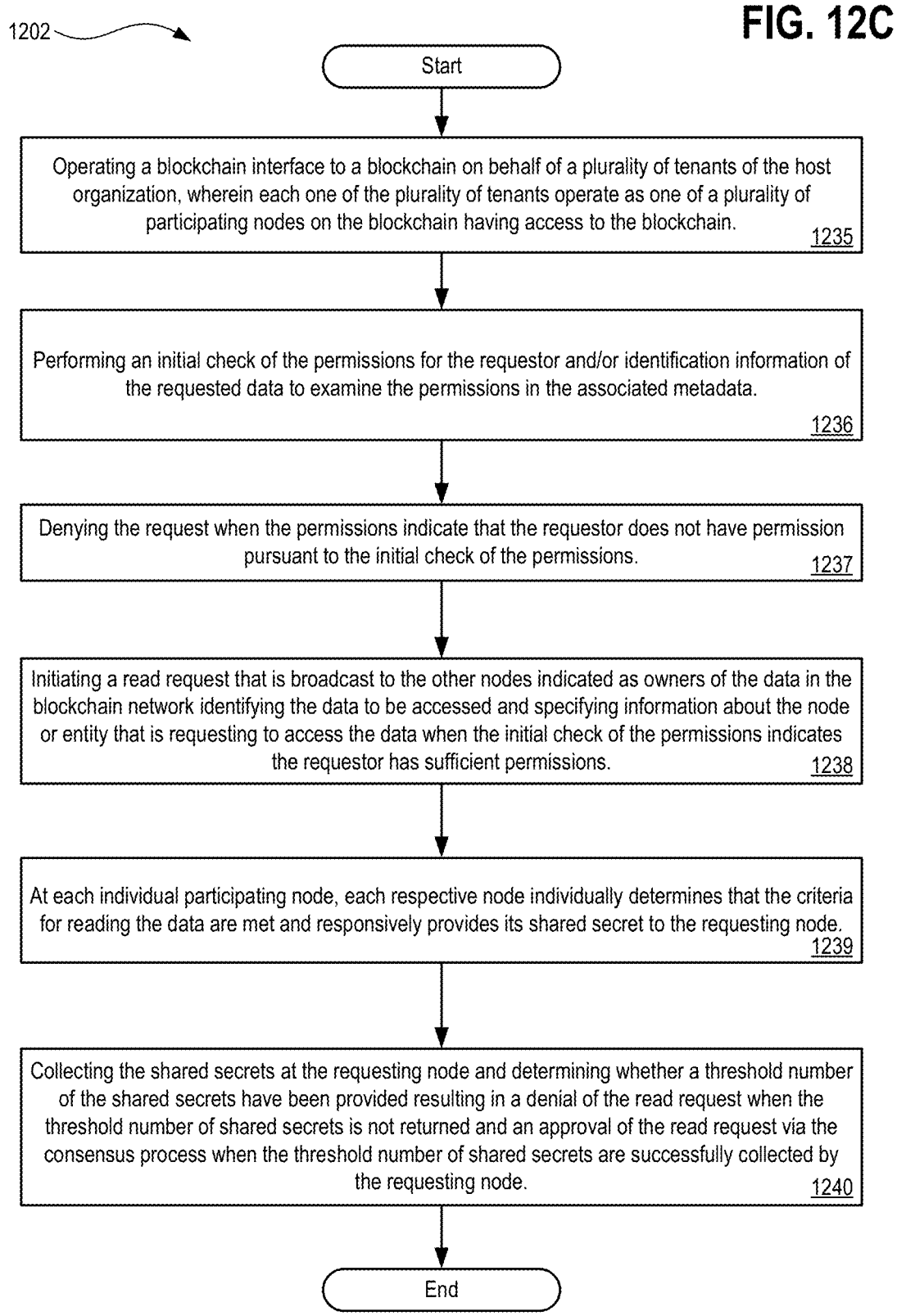

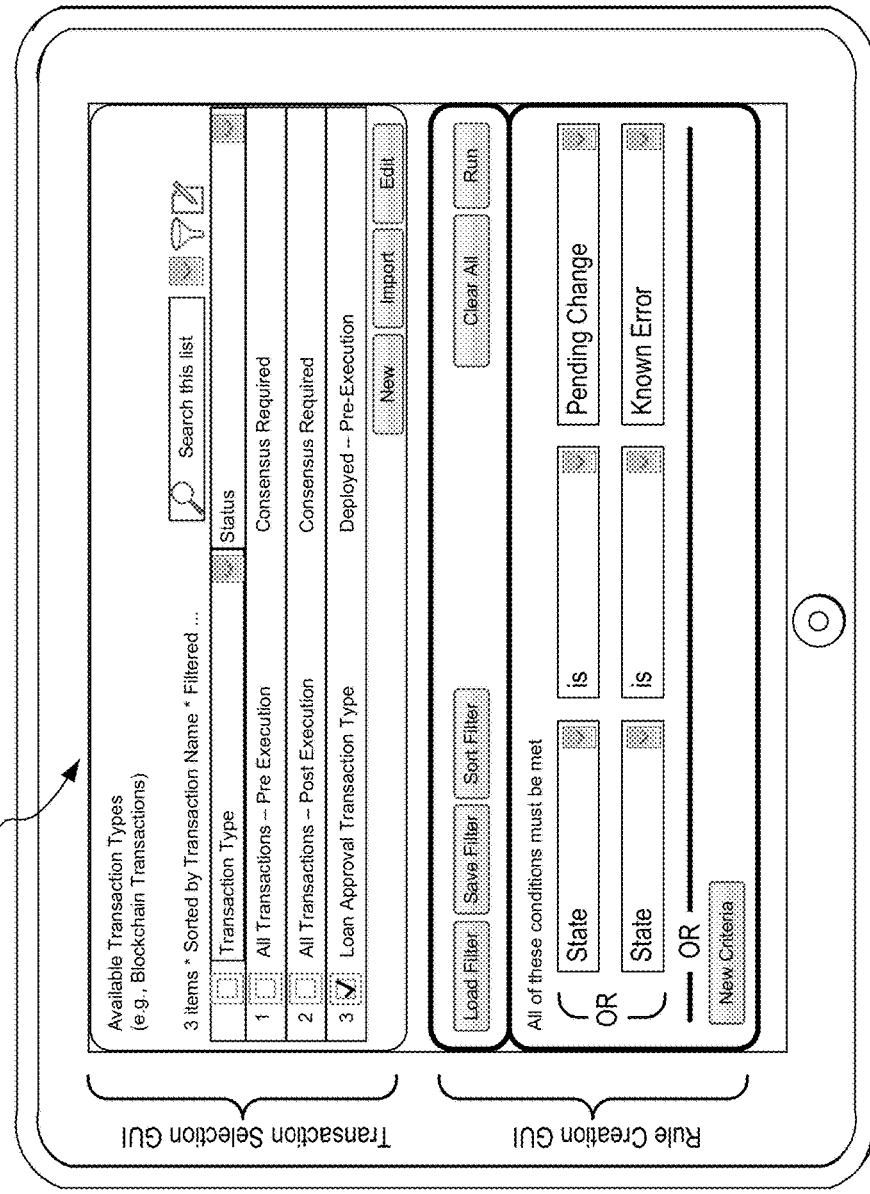
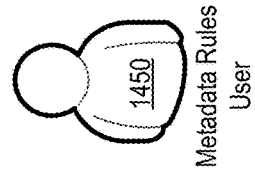
FIG. 14B

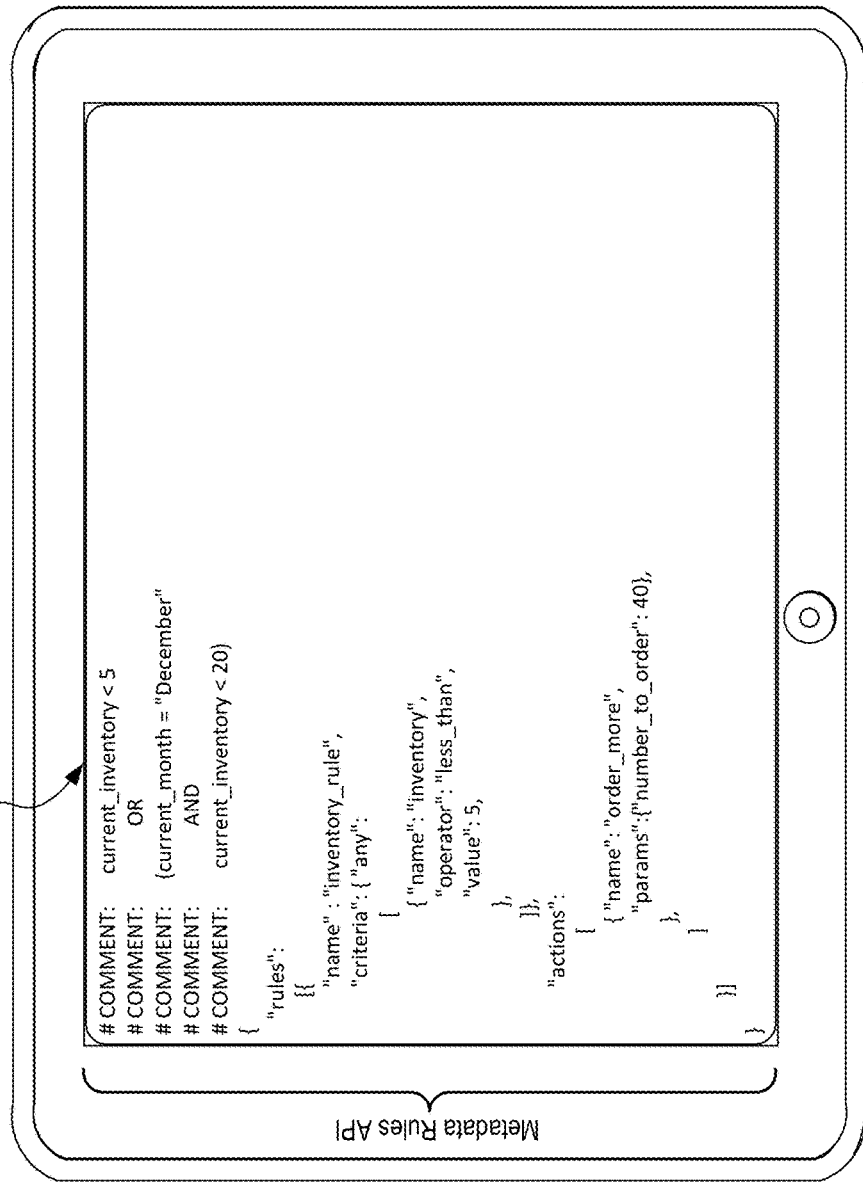
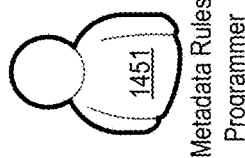
FIG. 14C

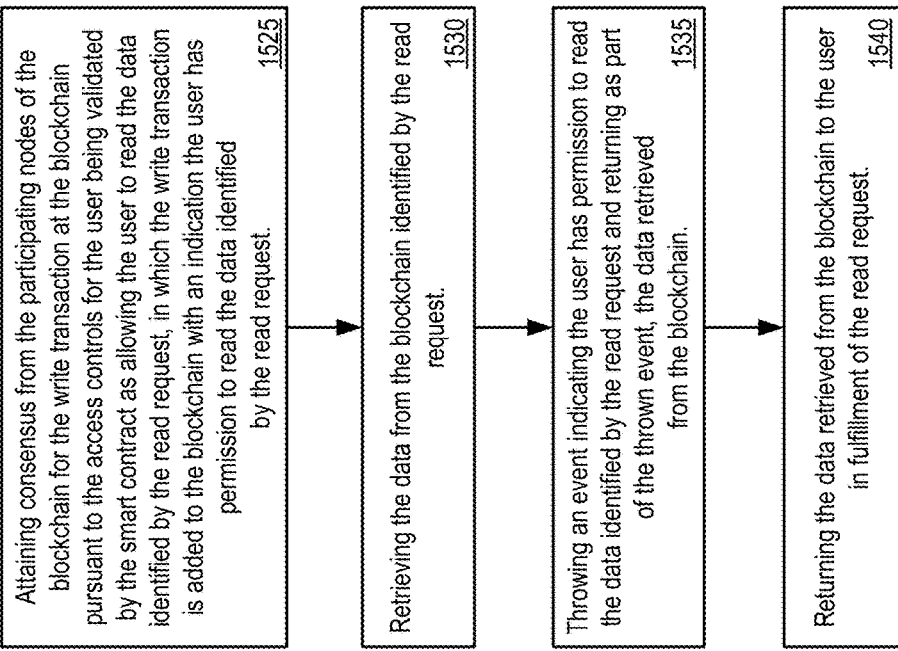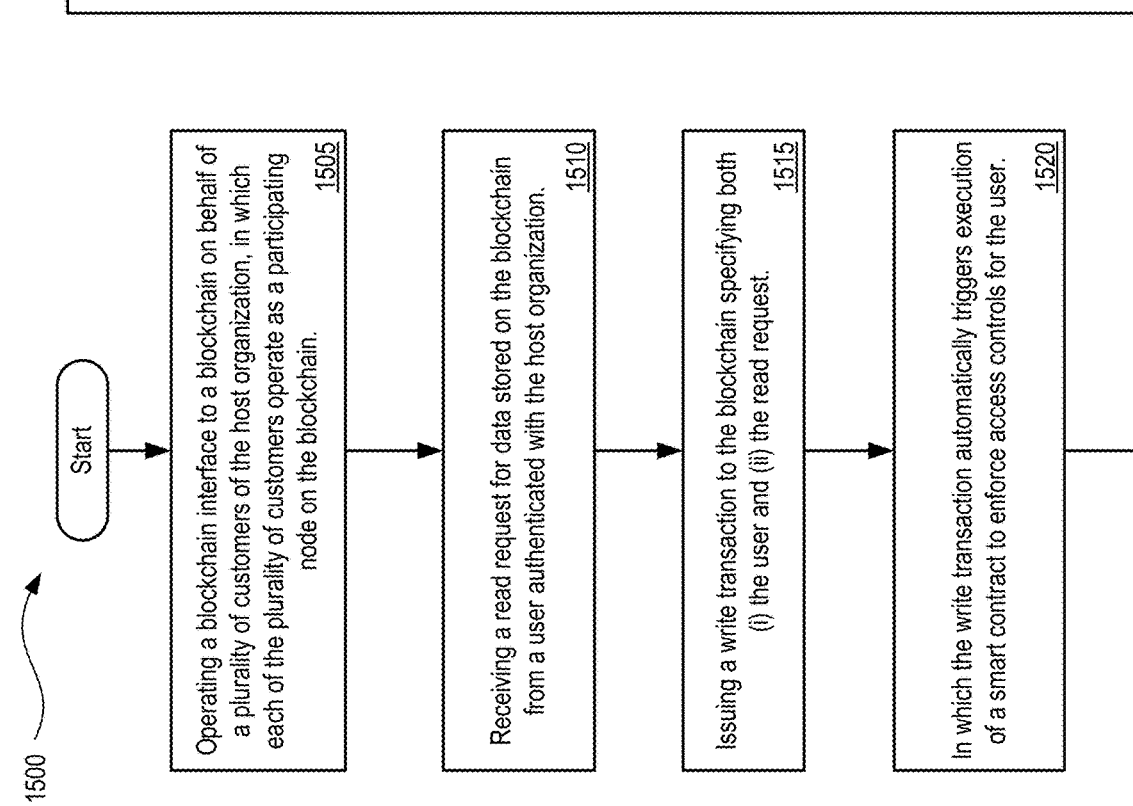

SYSTEMS, METHODS, AND APPARATUSES FOR IMPLEMENTING CONSENSUS ON READ VIA A CONSENSUS ON WRITE SMART CONTRACT TRIGGER FOR A DISTRIBUTED LEDGER TECHNOLOGY (DLT) PLATFORM

CLAIM OF PRIORITY

None.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of distributed ledger technology and API gateways or platforms. More particularly, disclosed embodiments relate to systems, methods, and apparatuses for implementing consensus on read via a consensus on write smart contract trigger for a Distributed Ledger Technology (DLT) platform in conjunction with a cloud based computing environment.

BACKGROUND

The subject matter discussed in the background section should not be considered prior art merely because of its mention in the background section. Similarly, a problem mentioned in the background section or associated with the subject matter of the background section should not be considered to have been previously recognized in the prior art.

In modern financial systems, assets such as currencies, or securities, are typically held and traded electronically. Transferring assets often requires point-to-point interaction between multiple intermediaries, and reconciliation of duplicated ledgers. This system has some disadvantages, such as the time required for settlement of asset transfers or payments, which often takes days, transfers involve fee payments to multiple intermediaries, and reconciliation can involve expensive overhead, it may be difficult to find out the status of a pending transfer or the current owner of an asset, transfers may not complete, and it may be difficult to make one transfer conditional on another, the complexity of the such systems makes it difficult to prevent fraud or theft, and, whether transactions are reversible depends on the transfer mechanism, rather than the business requirements of the transacting party.

Many of these problems can be fixed if asset ownership were recorded on a single shared ledger. However, a combination of practical and technological constraints have made such ledgers difficult to adopt. Such a shared ledger would tend to require trust in a single party. That party would need to have the technical capacity to process every transaction in real time. Additionally, to address the disadvantages discussed above, the ledger would need to support more sophisticated logic than simple ownership changes. In 2009, a person or group of persons operating under the pseudonym Satoshi Nakamoto introduced Bitcoin, the first implementation of a protocol that enables issuance of a digital bearer instrument without a trusted third party, using an electronic ledger replication system known as a blockchain. Bitcoin solves the problem of implementing decentralized digital cash, but its security model limits its efficiency and throughput, its design only supports a single asset, and its virtual machine has only limited support for custom programs that determine asset movement, sometimes called smart contracts.

Ethereum, introduced in 2015, generalizes the concept of a blockchain to a fully programmable state replication mechanism. While it includes a much more powerful programming language, it presents additional challenges for scalability and efficiency.

In contrast to Bitcoin and Ethereum, which are designed to operate on the public Internet, most financial activity already occurs within restricted networks of financial institutions. A shared ledger operated within this network can take advantage of blockchain technology without sacrificing the efficiency, security, privacy, and flexibility needed by institutions, financial or otherwise.

The present state of the art may therefore benefit from the systems, methods, and apparatuses for implementing consensus on read via a consensus on write smart contract trigger for a Distributed Ledger Technology (DLT) platform in conjunction with a cloud based computing environment, as is described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 2 depicts another exemplary architecture, with additional detail of a blockchain and a forked blockchain, in accordance with described embodiments;

FIG. 6C depicts another exemplary architecture in accordance with described embodiments;

FIG. 10 is a flowchart of one embodiment of a process for consensus on read in accordance with described embodiments;

FIGS. 11A, 11B, and 11C depict flowcharts related to a set of processes for implementing a right to forget function within a blockchain service interface in accordance with described embodiments;

FIGS. 12A, 12B, and 12C depict flowcharts related to a set of processes for implementing an access control function within a blockchain service interface in accordance with described embodiments;

FIG. 14B depicts another exemplary architecture in accordance with described embodiments;

FIG. 14C depicts another exemplary architecture in accordance with described embodiments;

FIG. 15 depicts a flow diagram illustrating a method for implementing consensus on read via a consensus on write smart contract trigger for a Distributed Ledger Technology (DLT) platform in accordance with described embodiments;

DETAILED DESCRIPTION

Figure 1A:
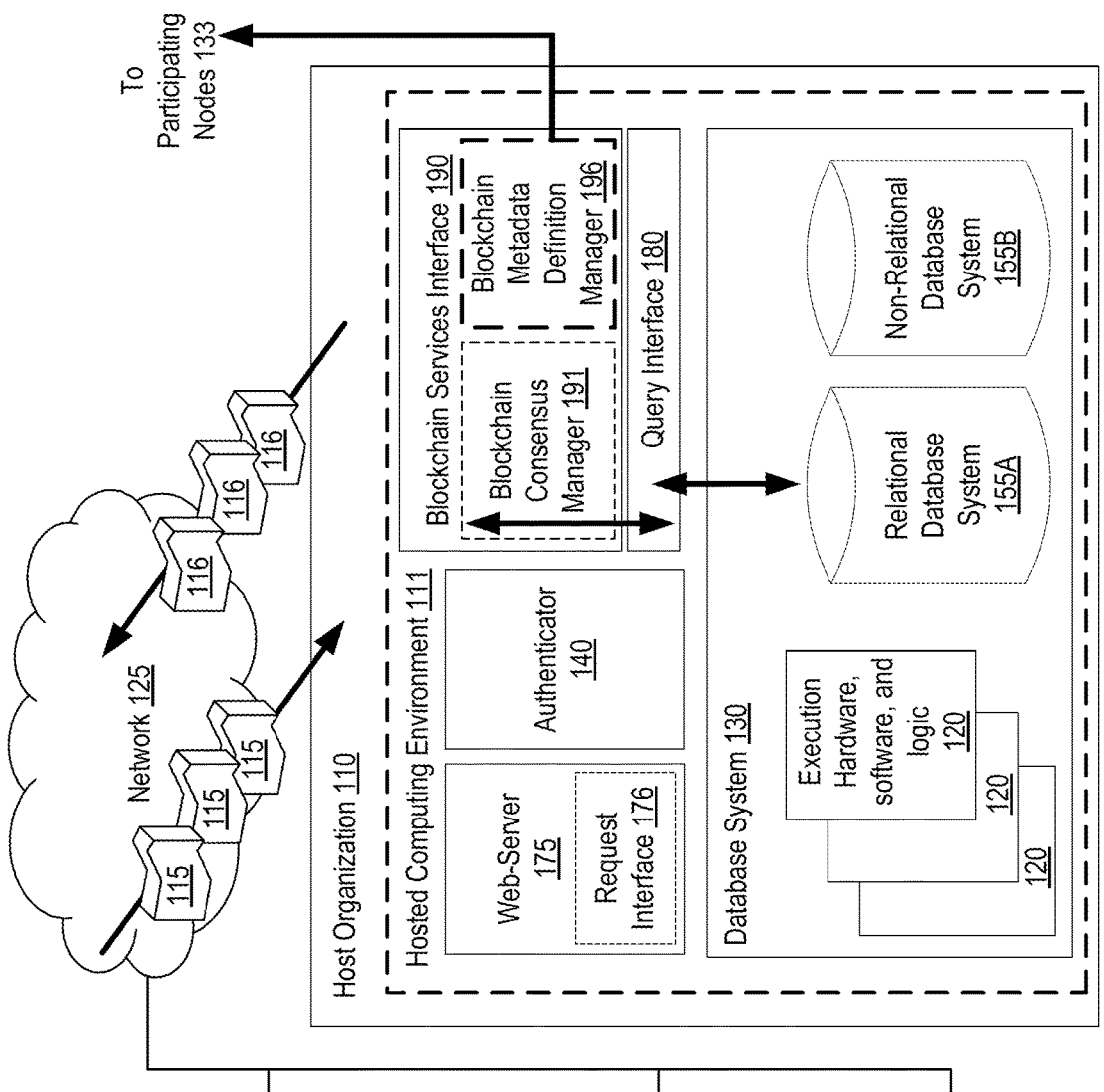
FIG. 1A depicts an exemplary architecture in accordance with described embodiments.

Described herein are systems, methods, and apparatuses for implementing consensus on read via a consensus on write smart contract trigger for a Distributed Ledger Technology (DLT) platform in conjunction with a cloud based computing environment.

For instance, according to one embodiment, there is a method performed by a system having at least a processor and a memory therein and operates within a host organization. According to such an embodiment, the system is specially configurable to perform operations including: operating a blockchain interface to a blockchain on behalf of a plurality of customers of the host organization, in which each of the plurality of customers operate as a participating node on the blockchain; receiving a read request for data stored on the blockchain from a user authenticated with the host organization; issuing a write transaction to the blockchain specifying both (i) the user and (ii) the read request; in which the write transaction automatically triggers execution of a smart contract to enforce access controls for the user; attaining consensus from the participating nodes of the blockchain for the write transaction at the blockchain pursuant to the access controls for the user being validated by the smart contract as allowing the user to read the data identified by the read request, in which the write transaction is added to the blockchain with an indication the user has permission to read the data identified by the read request; retrieving the data from the blockchain identified by the read request; throwing an event indicating the user has permission to read the data identified by the read request and returning as part of the thrown event, the data retrieved from the blockchain; and returning the data retrieved from the blockchain to the user in fulfillment of the read request.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1A depicts an exemplary architecture 100 in accordance with described embodiments.

In one embodiment, a hosted computing environment 111 is communicably interfaced with a plurality of user client devices 106A-C (e.g., such as mobile devices, smart phones, tablets, PCs, etc.) through host organization 110. In one embodiment, a database system 130 includes databases 155A and 155B, for example, to store application code, object data, tables, datasets, and underlying database records comprising user data on behalf of customer organizations 105A-C (e.g., users of such a database system 130 or tenants of a multi-tenant database type database system or the affiliated users of such a database system). Such databases include various database system types including, for example, a relational database system 155A and a non-relational database system 155B according to certain embodiments.

In certain embodiments, a client-server computing architecture may be utilized to supplement features, functionality, or computing resources for the database system 130 or alternatively, a computing grid, or a pool of work servers, or some combination of hosted computing architectures may provide some or all of computational workload and processing demanded of the host organization 110 in conjunction with the database system 130.

The database system 130 depicted in the embodiment shown includes a plurality of underlying hardware, software, and logic elements 120 that implement database functionality and a code execution environment within the host organization 110.

In accordance with one embodiment, database system 130 utilizes the underlying database system implementations 155A and 155B to service database queries and other data interactions with the database system 130 that communicate with the database system 130 via the query interface 180. The hardware, software, and logic elements 120 of the database system 130 are separate and distinct from the customer organizations (105A, 105B, and 105C) which utilize web services and other service offerings as provided by the host organization 110 by communicably interfacing to the host organization 110 via network 125. In such a way, host organization 110 may implement on-demand services, on-demand database services or cloud computing services to subscribing customer organizations 105A-C.

Further depicted is the host organization 110 receiving input and other requests 115 from customer organizations 105A-C via network 125 (such as a public Internet). For example, incoming search queries, database queries, API requests, interactions with displayed graphical user interfaces and displays at the user client devices 106A-C, or other inputs may be received from the customer organizations 105A-C to be processed against the database system 130, or such queries may be constructed from the inputs and other requests 115 for execution against the databases 155A and 155B or the query interface 180, pursuant to which results 116 are then returned to an originator or requestor, such as a user of one of a user client device 106A-C at a customer organization 105A-C.

In one embodiment, each customer organization 105A-C may be a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 125 on behalf of the query interface 180 and for providing a web-based interface or other graphical displays to an end-user user client device 106A-C or machine originating such data requests 115.

Certain requests 115 received at the host organization may be directed toward a blockchain for which the blockchain services interface 190 of the host organization 110 operates as an intermediary.

The query interface 180 is capable of receiving and executing requested queries against the databases and storage components of the database system 130 and returning a result set, response, or other requested data in furtherance of the methodologies described. The query interface 180 additionally provides functionality to pass queries from web-server 175 into the database system 130 for execution against the databases 155A and 155B for processing search queries, or into the other available data stores of the host organization's computing environment 111. In one embodiment, the query interface 180 implements an Application Programming Interface (API) through which queries may be executed against the databases 155A and 155B or the other data stores.

Additionally, the query interface 180 provides interoperability with the blockchain services interface 190, thus permitting the host organization 110 to conduct transactions with either the database system 130 via the query interface 180 or to transact blockchain transactions onto a connected blockchain for which the host organization 110 is a participating node or is in communication with the participating nodes 133, or the host organization 110 may conduct transactions involving both data persisted by the database system 130 (accessible via the query interface 180) and involving data persisted by a connected blockchain (e.g., accessible from a participating node 133 or from a connected blockchain directly, where the host organization operates a participating node on such a blockchain).

In certain embodiments, the Application Programming Interface (API) of the query interface 180 provides an API model through which programmers, developers, and administrators may interact with the blockchain services interface 190 or the database system 130, or both, as the needs and particular requirements of the API caller dictate.

Host organization 110 may implement a request interface 176 via web-server 175 or as a stand-alone interface to receive requests packets or other requests 115 from the user client devices 106A-C. Request interface 176 further supports the return of response packets or other replies and responses 116 in an outgoing direction from host organization 110 to the user client devices 106A-C. Authenticator 140 operates on behalf of the host organization to verify, authenticate, and otherwise credential users attempting to gain access to the host organization.

Further depicted within host organization 110 is the blockchain services interface 190 having included therein both a blockchain consensus manager 191 and a block validator 192. Blockchain services interface 190 communicatively interfaces the host organization 110 with other participating nodes 133 (e.g., via the network 125) so as to enable the host organization 110 to participate in available blockchain protocols by acting as a blockchain protocol compliant node so as to permit the host organization 110 to access information within such a blockchain as well as enabling the host organization 110 to provide blockchain services to other participating nodes 133 for any number of blockchain protocols supported by, and offered to customers and subscribers by the host organization 110. In other embodiments, the host organization merely operates as a participating node so as to enable the host organization 110 to interact with the blockchain protocol(s) provided by others.

The blockchain consensus manager 191 facilitates consensus management for private and public blockchains upon which tenants, customer organizations, or the host organization 110 operates as a participating node on a supported blockchain. Additionally depicted is the blockchain metadata definition manager 196, which enables the blockchain services interface 190 to define and create metadata which is then pushed to and transacted onto a blockchain which is interfaced via the blockchain services interface 190.

For instance, via the blockchain metadata definition manager 196, it is possible to for any customer organization 105A-C of the host organization to define and create metadata which is then recorded or transacted onto the blockchain for use by that customer organization 105A-C and for use by other participating nodes on the blockchain, regardless of whether or not those participating nodes 133 are also customer organizations 105A-C with the host organization 110.

For example, once metadata is defined and created via the blockchain metadata definition manager 196 and pushed onto the blockchain, any participating node 133 with access to the blockchain where that metadata definition resides can then create data records and store information onto the blockchain which adopts the defined metadata definition and thus complies with the newly created metadata definition. In such a way, all participating nodes can utilize information which is stored in compliance with the newly created metadata definition, as there is a standardized and customized manner for storing such data.

In one embodiment, the blockchain consensus manager 191 and blockchain metadata definition manager 196 work in conjunction to implement consensus on read functions as described further herein below with reference to FIGS. 10-12. A consensus on read is a specific type of consensus for controlling read access to data stored on the blockchain. Data is stored in an encrypted format where the encryption key is distributed as a shared secret with other nodes in the blockchain platform. The nodes 133 of the network perform a consensus on read operation when a request to access the data is made. The consensus on read process examines the credentials or any configured criteria that is determined to be required, which is provided in the access request. Each node that approves of the read access responds with its portion of the shared secret that enables the requesting node to generate the key from the shared secrets to decrypt the data on the blockchain and access the data. A threshold number of secrets must be returned to enable access to the encrypted data. The threshold number can be configured and/or determined by the shared secret algorithm utilized with the consensus on read process (e.g., Shamir's secret sharing algorithm).

In further embodiments, a permissions manager 181 operates to enforce access controls and privileges as defined in metadata for data stored in the blockchain. The permissions manager 181 can enforce restrictions on accessing records, objects, fields, or similar levels of granularity on access control including read and write access controls. The permissions manager 181 enforces management of the blockchain data based on metadata defining access privileges.

The access privileges utilize a unique user identifier (UUID) or similar entity identifier. The metadata can define a list of entities with permission to read or write data in the blockchain. The metadata can also define a set of owners that control the consensus on read process that is utilized to manage the access to access controlled information. In some embodiments, the permissions manager 181 implement a right to forget process (e.g., in compliance with European Union general data protection regulation (GDPR)) or similar process to 'erase' data from the blockchain. The operations of the permissions manager 181 and the consensus on read process of the blockchain consensus manager 191 including the right to forget and access privileges are further discussed and described herein with relation to FIGS. 10-12.

According to certain embodiments, the blockchain metadata definition manager 196 additionally permits non-subscribers (e.g., entities which are not customer organizations 105A-C) of the host organization to nevertheless utilize the blockchain metadata definition manager 196 and graphical user interfaces (GUIs) associated with the blockchain metadata definition manager 196 via an exposed API interface for such non-subscribing customers which may then create and define metadata definitions which are then pushed onto the blockchain via the host organization's blockchain services interface 190.

A blockchain is a continuously growing list of records, grouped in blocks, which are linked together and secured using cryptography. Each block typically contains a hash pointer as a link to a previous block, a timestamp and transaction data. By design, blockchains are inherently resistant to modification of the data. A blockchain system essentially is an open, distributed ledger that records transactions between two parties in an efficient and verifiable manner, which is also immutable and permanent. A distributed ledger (also called a shared or common ledger, or referred to as distributed ledger technology (DLT)) is a consensus of replicated, shared, and synchronized digital data geographically spread across multiple nodes. The nodes may be located in different sites, countries, institutions, user communities, customer organizations, host organizations, hosted computing environments, or application servers. There is no central administrator or centralized data storage.

Blockchain systems use a peer-to-peer (P2P) network of nodes, and consensus algorithms ensure replication of digital data across nodes. A blockchain system may be either public or private. Not all distributed ledgers necessarily employ a chain of blocks to successfully provide secure and valid achievement of distributed consensus: a blockchain is only one type of data structure considered to be a distributed ledger.

P2P computing or networking is a distributed application architecture that partitions tasks or workloads between peers. Peers are equally privileged, equally capable participants in an application that forms a peer-to-peer network of nodes. Peers make a portion of their resources, such as processing power, disk storage or network bandwidth, directly available to other network participants, without the need for central coordination by servers or hosts. Peers are both suppliers and consumers of resources, in contrast to the traditional client-server model in which the consumption and supply of resources is divided. A peer-to-peer network is thus designed around the notion of equal peer nodes simultaneously functioning as both clients and servers to the other nodes on the network.

For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority. In this manner, blockchains are secure by design and are an example of a distributed computing system with high *Byzantine* fault tolerance. Decentralized consensus has therefore been achieved with a blockchain. This makes blockchains potentially suitable for the recording of events, medical records, insurance records, and other records management activities, such as identity management, transaction processing, documenting provenance, or voting.

A blockchain database is managed autonomously using a peer-to-peer network and a distributed timestamping server. Records, in the form of blocks, are authenticated in the blockchain by collaboration among the nodes, motivated by collective self-interests. As a result, participants' uncertainty regarding data security is minimized. The use of a blockchain removes the characteristic of reproducibility of a digital asset. It confirms that each unit of value, e.g., an asset, was transferred only once, solving the problem of double spending.

Blocks in a blockchain each hold batches ("blocks") of valid transactions that are hashed and encoded into a Merkle tree. Each block includes the hash of the prior block in the blockchain, linking the two. The linked blocks form a chain. This iterative process confirms the integrity of the previous block, all the way back to the first block in the chain, sometimes called a genesis block or a root block.

By storing data across its network, the blockchain eliminates the risks that come with data being held centrally and controlled by a single authority. Although the host organization 110 provides a wide array of data processing and storage services, including the capability of providing vast amounts of data with a single responsible agent, such as the host organization 110, blockchain services differ insomuch that the host organization 110 is not a single authority for such services, but rather, via the blockchain services interface 190, is merely one of many nodes for an available blockchain protocol or operates as blockchain protocol manager and provider, while other participating nodes 133 communicating with the host organization 110 via blockchain services interface 190 collectively operate as the repository for the information stored within a blockchain by implementing compliant distributed ledger technology (DLT) in accordance with the available blockchain protocol offered by the host organization 110.

The decentralized blockchain may use ad-hoc message passing and distributed networking. The blockchain network lacks centralized points of vulnerability that computer hackers may exploit. Likewise, it has no central point of failure. Blockchain security methods include the use of public-key cryptography. A public key is an address on the blockchain. Value tokens sent across the network are recorded as belonging to that address. A private key is like a password that gives its owner access to their digital assets or the means to otherwise interact with the various capabilities that blockchains support. Data stored on the blockchain is generally considered incorruptible. This is where blockchain has its advantage. While centralized data is more controllable, information and data manipulation are common. By decentralizing such data, blockchain makes data transparent to everyone involved.

Every participating node 133 for a particular blockchain protocol within a decentralized system has a copy of the blockchain for that specific blockchain protocol. Data quality is maintained by massive database replication and computational trust. Generally speaking, no centralized official copy of the database exists and, by default, no user and none of the participating nodes 133 are trusted more than any other. Blockchain transactions are broadcast to the network using software, via which any participating node 133, including the host organization 110 when operating as a node, receives such transaction broadcasts. Broadcast messages are delivered on a best effort basis. Nodes validate transactions, add them to the block they are building, and then broadcast the completed block to other nodes. Blockchains use various time-stamping schemes, such as proof-of-work, to serialize changes. Alternate consensus may be utilized in conjunction with the various blockchain protocols offered by and supported by the host organization, with such consensus mechanisms including, for example proof-of-stake, proof-of-authority and proof-of-burn, to name a few.

Open blockchains are more user friendly than conventional traditional ownership records, which, while open to the public, still require physical access to view. Because most of the early blockchains were permissionless, there is some debate about the specific accepted definition of a so called "blockchain," such as, whether a private system with verifiers tasked and authorized (permissioned) by a central authority is considered a blockchain. The concept of permissioned verifiers is separate and distinct from the permissioned access control processes described herein. Proponents of permissioned or private chains argue that the term blockchain may be applied to any data structure that groups data into time-stamped blocks. These blockchains serve as a distributed version of multiversion concurrency control (MVCC) in databases. Just as MVCC prevents two transactions from concurrently modifying a single object in a database, blockchains prevent two transactions from spending the same single output in a blockchain. Regardless, of the semantics or specific terminology applied to the varying types of blockchain technologies, the methodologies described herein with respect to a "blockchain" expand upon conventional blockchain protocol implementations to provide additional flexibility, open up new services and use cases for the described blockchain implementations, and depending upon the particular blockchain protocol offered or supported by the blockchain services interface 190 of the host organization 110, both private and public mechanisms are described herein and utilized as needed for different implementations supported by the host organization 110.

An advantage to an open, permissionless, or public, blockchain network is that guarding against bad actors is not required and no access control is generally needed, although as discussed herein, the embodiments provide for a blockchain access control for particular cases that are applicable to permissioned or public blockchains. This means that applications may be added to the network without the approval or trust of others, using the blockchain as a transport layer. Conversely, permissioned (e.g., private) blockchains use an access control layer to govern who has access to the network. The embodiments further provide access controls for entities within or external to a private or public blockchain. In contrast to public blockchain networks, validators on private blockchain networks are vetted, for example, by the network owner, or one or more members of a consortium. They rely on known nodes to validate transactions. Permissioned blockchains also go by the name of "consortium" or "hybrid" blockchains. Today, many corporations are using blockchain networks with private blockchains, or blockchain-based distributed ledgers, independent of a public blockchain system.

Figure 1B:
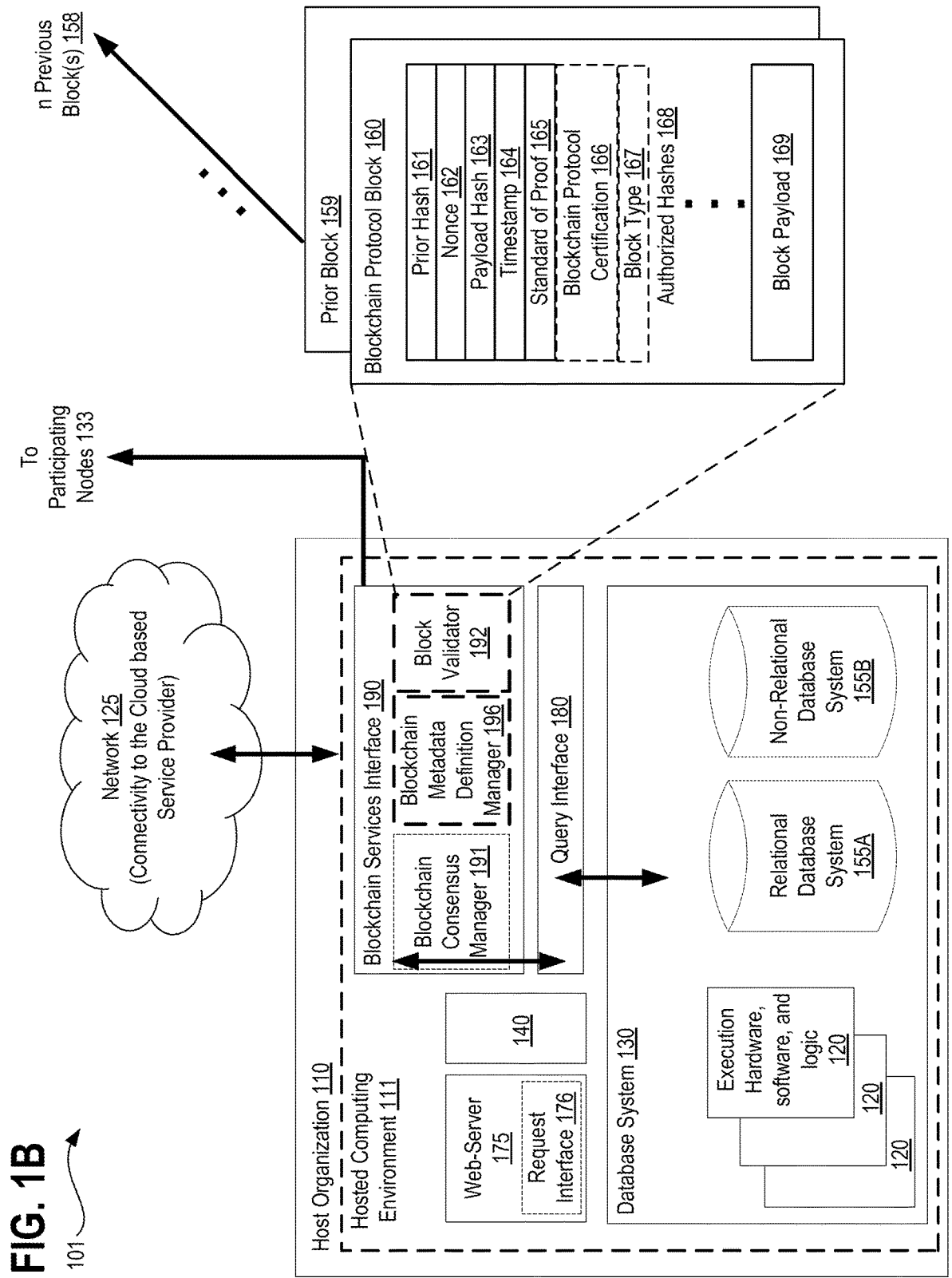
FIG. 1B depicts another exemplary architecture, with additional detail of a blockchain protocol block operating in conjunction with a block validator, in accordance with described embodiments.

FIG. 1B depicts another exemplary architecture 101, with additional detail of a blockchain protocol block 160 operating in conjunction with a block validator 192, in accordance with described embodiments. The blockchain consensus manager 191 implements consensus on read and the permissions manager 181 support access control and similar operations as further described herein below in relation to FIGS. 10-12.

The blockchain consensus manager 191 implements consensus on read and the permissions manager 181 support access control and similar operations as further described herein below in relation to FIGS. 10-12.

In particular, a blockchain protocol block 160 is depicted here to be validated by the block validator 192 of the host organization 110, with the blockchain protocol block including addition detail of its various sub-components, and certain optional elements which may be utilized in conjunction with the blockchain protocol block 160 depending on the particular blockchain protocol being utilized via the blockchain services interface 190.

In accordance with a particular embodiment, the blockchain protocol block 160 depicted here defines a particular structure for how the fundamental blocks of any given blockchain protocol supported by the host organization 110 are organized.

According to certain embodiments, blockchain metadata definition manager 196 as shown here may utilize a specific blockchain implementation which is provided by the host organization 110 and thus, for which the applicable blockchain protocol is defined by the host organization 110. Alternatively, the blockchain metadata definition manager 196 may utilize any publicly accessible blockchain for which the host organization operates as a participating node so as to establish access or the blockchain metadata definition manager 196 may utilize a private blockchain, including those which are not provided by the host organization 110, so long as the host organization is able to authenticate with such a private blockchain and access the blockchain by operating as a participating node on the private blockchain.

As will be described in greater detail below, the blockchain metadata definition manager 196 implements a specialized metadata definition and creation scheme which may include the use of GUIs and other user-friendly interfaces which are provided by the host organization either via an API or via an interface of the host organization, such as the web-server 175 via which users and customer organizations may interact with the host organization and more particularly, with the services and applications provided by the host organization, including use of GUIs provided by the blockchain metadata definition manager 196 which is made accessible to tenants of the host organization via the cloud computing platform and in certain embodiments made available to non-tenants and non-subscribers of the host organization 110, either of which may then utilize the GUIs and functionality provided by the blockchain metadata definition manager 196.

It may be necessary in accordance with certain embodiments that a customized blockchain protocol implementation be provided by the host organization to support use of the specialized metadata definition and creation scheme as implemented by the blockchain metadata definition manager 196. However, in other embodiments where the metadata is permissibly defined and stored onto a blockchain by the host organization 110, any blockchain utilized to store such data will be unaffected because such blockchains are agnostic as to what types of metadata is defined or created and transacted onto the blockchain by the host organization. Stated differently, while the host organization 110 facilitates the definition and creation of such metadata and transacts that information onto a blockchain, it is immaterial to the blockchain as to what applications elect to utilize such data, whereas the host organization facilitates a platform in which applications may elect to only utilize data which is in compliance with the defined and created metadata, thus permitting transferability of such data, as well as many other benefits. For instance, other non-compliant applications may store data in a non-compliant format, but the applications which comply with the formatting requirements and utilize the metadata defined and stored on the blockchain will simply have the benefit of data interoperability. This will be true regardless of whether the applications are utilizing a blockchain established by the host organization or whether the applications are utilizing some public or private blockchain not established by the host organization, but for which the applications have the ability to access such a blockchain via the host organizations' blockchain services interface 190 in the manner described above.

With respect to the blockchain protocol 160 (regardless of whether it is an existing and already available blockchain protocol or a custom implemented blockchain protocol), the prior hash 161 is the result of a non-reversible mathematical computation using data from the prior block 159 as the input. The prior block 159 in turn utilized data from the n previous block(s) 158 to form the non-reversible mathematical computation forming the prior hash for those respective blocks. For instance, according to one embodiment, the non-reversible mathematical computation utilized is a SHA256 hash function, although other hash functions may be utilized. According to such an embodiment, the hash function results in any change to data in the prior block 159 or any of the n previous blocks 158 in the chain, causing an unpredictable change in the hash of those prior blocks, and consequently, invalidating the present or current blockchain protocol block 160. Prior hash 161 creates the link between blocks, chaining them together to form the current blockchain protocol block 160.

When the block validator 192 calculates the prior hash 161 for the prior block 159, the hash must meet certain criteria defined by data stored as the standard of proof 165. For instance, in one embodiment, this standard of proof 165 is a number that the calculated hash must be less than. Because the output of the hashing function is unpredictable, it cannot be known before the hash is calculated what input will result in an output that is less than the standard of proof 165. The nonce 162 is used to vary the data content of the block, allowing for a large number of different outputs to be produced by the hash function in pursuit of an output that meets the standard of proof 165, thus making it exceedingly computationally expensive (and therefore statistically improbable) of producing a valid block with a nonce 162 that results in a hash value meeting the criteria of the standard of proof 165.

Payload hash 163 provides a hash of the data stored within the block payload 169 portion of the blockchain protocol block 160 and need not meet any specific standard of proof 165. However, the payload hash is included as part of the input when the hash is calculated for the purpose of storing it as the prior hash 161 for the next or subsequent block. Timestamp 164 indicates what time the blockchain protocol block 160 was created within a certain range of error. According to certain blockchain protocol implementations provided via the blockchain services interface 190, the distributed network of users (e.g., blockchain protocol nodes) checks the timestamp 164 against their own known time and will reject any block having a timestamp 164 which exceeds an error threshold, however, such functionality is optional and may be required by certain blockchain protocols and not utilized by others.

The blockchain protocol certification 166 defines the required size and/or data structure of the block payload 169 as well as certifying compliance with a particular blockchain protocol implementation, and thus, certifies the blockchain protocol block subscribes to, implements, and honors the particular requirements and configuration options for the indicated blockchain protocol. The blockchain protocol certification 166 may also indicate a version of a given blockchain protocol and the blockchain protocol may permit limited backward and forward compatibility for blocks before nodes will begin to reject new blockchain protocol blocks for non-compliance.

Block type 167 is optional depending on the particular blockchain protocol utilized. Where required for a specific blockchain protocol exposed via the blockchain services interface 190, a block type 167 must be indicated as being one of an enumerated list of permissible block types 167 as will be described in greater detail below. Certain blockchain protocols use multiple different block types 167, all of which may have varying payloads, but have a structure which is known a priori according to the blockchain protocol utilized, the declared block type 167, and the blockchain protocol certification 166 certifying compliance with such requirements. Non-compliance or an invalid block type or an unexpected structure or payload for a given declared block type 167 will result in the rejection of that block by network nodes.

Where a variable sized block payload 169 is utilized, the block type 167 may indicate permissibility of such a variable sized block payload 169 as well as indicate the index of the first byte in the block payload 169 and the total size of the block payload 169. The block type 167 may be utilized to store other information relevant to the reading, accessing, and correct processing and interpretation of the block payload 169.

Block payload 169 data stored within the block may relate to any number of a wide array of transactional data depending on the particular implementation and blockchain protocol utilized, including payload information related to, for example, financial transactions, ownership information, data access records, document versioning, medical records, voting records, compliance and certification, educational transcripts, purchase receipts, digital rights management records, or literally any kind of data that is storable via a payload of a blockchain protocol block 160, which is essentially any data capable of being digitized. Depending on the particular blockchain protocol chosen, the payload size may be a fixed size or a variable size, which in either case, will be utilized as at least part of the input for the hash that produces the payload hash 163.

Various standards of proof 165 may be utilized pursuant to the particular blockchain protocol chosen, such as proof of work, hash value requirements, proof of stake, a key, or some other indicator such as a consensus, or proof of consensus. Where consensus based techniques are utilized, the blockchain consensus manager 191 provides consensus management on behalf of the host organization 110, however, the host organization 110 may be operating only as one of many nodes for a given blockchain protocol which is accessed by the host organization 110 via the blockchain services interface 190 or alternatively, the host organization 110 may define and provide a particular blockchain protocol as a cloud based service to customers and subscribers (and potentially to non-authenticated public node participants), via the blockchain services interface 190. Such a standard of proof 165 may be applied as a rule that requires a hash value to be less than the proof standard, more than the proof standard, or may require a specific bit sequence (such as 10 zeros, or a defined binary sequence) or a required number of leading or trailing zeroes (e.g., such as a hash of an input which results in 20 leading or trailing zeros, which is computationally infeasible to provide without a known valid input).

The hash algorithms used for the prior hash 161, the payload hash 163, or the authorized hashes 168 may all be of the same type or of different types, depending on the particular blockchain protocol implementation. For instance, permissible hash functions include MD5, SHA-1, SHA-224, SHA-256, SHA-384, SHA-515, SHA-515/224, SHA-515/256, SHA-3 or any suitable hash function resistant to pre-image attacks. There is also no requirement that a hash is computed only once. The results of a hash function may be reused as inputs into another or the same hash function again multiple times in order to produce a final result.

FIG. 2 depicts another exemplary architecture 200, with additional detail of a blockchain and a forked blockchain, in accordance with described embodiments.

More particularly, there is now depicted a primary blockchain (e.g., a consensus blockchain) which begins with a genesis block 141 (sometimes called a root block) followed by a series of standard blocks 142, each having a header which is formed based at least in part from a hash of the header of the block which precedes it. There is additionally depicted a forked blockchain formed with an initial fork root block 144, followed by then a series of standard blocks 142. Because each block in the blockchain contains a hash of the immediately preceding block stored in the previous hash, a link going back through the chain from each block is effectively created via the blockchain and is a key component to making it prohibitively difficult or computationally infeasible to maliciously modify the chain.

As depicted, the primary blockchain includes a single fork which is originating from the fork block 143. As shown here, the genesis block 141 is a special block that begins the primary blockchain and is different from the other blocks because it is the first block in the primary block chain and therefore, cannot by definition, include a hash of any previous block. The genesis block 141 marks the beginning of the primary blockchain for the particular blockchain protocol being utilized. The blockchain protocol governs the manner by which the primary blockchain grows, what data may be stored within, and forked blockchains are created, as well as the validity of any block and any chain may be verified via the block validator 192 of the host organization or any other participating network node of the blockchain pursuant to the rules and requirements set forth by the blockchain protocol certification 166 which is embedded within the genesis block 141 and then must be certified to and complied with by every subsequent block in the primary blockchain or any forked blockchain.

The blockchain protocol certification 166 inside each block in the genesis chain defines the default set of rules and configuration parameters that allows for the creation of forks and the modification of rules and configuration parameters in those forks, if any. Some blockchain protocol implementations permit no variation or non-compliance with the default set of rules as established via the blockchain protocol certification 166 and therefore, any fork will be the result of pending consensus for multiple competing and potentially valid primary blockchains. Once consensus is reached (typically after one or two cycles of new block formations) then the branch having consensus will be adopted and the fork truncated, thus returning to a single primary consensus blockchain. Conversely, in other implementations, a forked blockchain may permissibly be created and continue to exist indefinitely alongside the primary blockchain, so long as the forked blockchain complies with the blockchain protocol certification 166 and permissible variation of rules and configuration parameters for a forked blockchain within that blockchain protocol.

Fork block 143 anchors the forked blockchain to the primary blockchain such that both the primary blockchain and the forked chain are considered valid and permissible chains where allowed pursuant to the blockchain protocol certification 166. Normally, in a blockchain, all non-consensus forks are eventually ignored or truncated and thus considered invalid except for the one chain representing the longest chain having consensus. Nevertheless, the fork block 143 expands beyond the conventional norms of prior blockchain protocols by operating as and appearing as though it is a standard block 142, while additionally including a reference to a fork hash 149 identifying the first block of the permissible forked blockchain, represented here as the fork root block 144 for the valid forked blockchain. The fork root block 144 of the forked blockchain is then followed by standard blocks, each having a header based on a prior valid block's hash, and will continue indefinitely.

According to a particular embodiment, the forked blockchain utilizes some variation from the rules and configuration parameters utilized by default within the primary consensus blockchain, resulting in the need for a valid forked blockchain. Therefore, the variation of the rules and configuration parameters are encoded within a new blockchain protocol certification 166 for the fork root block 144 which, as noted above, must remain compliant with the original rules and valid range of configuration parameters as set forth by the blockchain protocol certification 166 of the original genesis block 141 for the primary blockchain. Because the fork root block 144 must continue to carry the original blockchain protocol certification 166, a forked blockchain protocol certification may be stored within a block payload 169 segment of the fork root block 144 thus establishing the rules and permissible configuration parameters of subsequent standard blocks 142 in the forked blockchain.

For instance, a forked blockchain may be utilized to support declarative smart actions as enabled by the host organization where a forked blockchain of a public or private blockchain is customized via a new blockchain protocol certification 166 to support both the declarative establishment of smart actions and their required information capture provisions as defined by an administrator as well as the ability to map the data captured with a transaction utilizing such a declared smart action back to the cloud platform entity as provided by the host organization.

When a new blockchain protocol certification 166 is applied for a valid fork, its rules and configuration is applied to all subsequent standard blocks for the fork and all subsequent sub-forks, where additional forks are permitted, and enforced by the participating nodes as though the forked blockchain were an original primary blockchain. Such forks may be desirable for certain customers seeking to apply a specialized set of rules or configurations for a particular group, such as a working group, a certain sub-type of transactions, or some other variation from the primary blockchain where an entirely separate "sidechain" is not required or desirable. A forked blockchain is distinguishable from a sidechain as it remains part of the same blockchain protocol and is permanently connected with the primary blockchain at the fork block 143 with a returned fork hash 149 being returned to and immutably written into the primary consensus blockchain where it will remain via the chain hashing scheme for all subsequent standard blocks of the primary blockchain. Stated very simply, the forked blockchain is explicitly tied to the primary blockchain via the fork block 143. Conversely, a sidechain may be an entirely distinct blockchain protocol for which an agreed rate of exchange or conversion factor is applied to all information or value passed between the primary blockchain and any sidechain without any explicit reference or fork hash 149 embedded within the primary blockchain.

Sidechaining therefore is a mechanism by which declared smart actions for assets, tokens, value, or payload entries from one blockchain may be securely used within a completely separate blockchain via a pre-defined exchange or conversion scheme, and yet, be permissibly moved back to the original chain, if necessary. By convention, the original blockchain is referred to as the main chain or the primary blockchain, whereas any additional blockchains which allow users to transact within them utilizing the tokens, values, or payload of the main chain are referred to as sidechains. For instance, there may be a private blockchain with a defined linkage to a public blockchain, thus allowing tokens, value, or payload data to be securely moved between the public blockchain and the private blockchain.

Consider for instance the host organization's use of a previously existing blockchain for the implementation of the services provided by the blockchain metadata definition manager 196. It may be advantageous to utilize an existing blockchain, but then creating a specialized sidechain or a forked blockchain specifically for the services provided by blockchain metadata definition manager 196 yet remain in compliance with the blockchain protocol certification 166 required by the primary (consensus) blockchain.

In other instances, a modified Distributed Ledger Technology (DLT) ledger may be utilized which is a hosted ledger fully under the control of the host organization, and as such, it may not be necessary to side-chain from a primary chain. Still other examples may include the host organization providing and defining the blockchain protocol for a public blockchain, in which case the host organization may define the blockchain protocol utilized in such a way that the extended capabilities of the blockchain metadata definition manager 196 (see e.g., FIG. 1A) are native to the protocol, thus requiring no side-chaining or conversely, the host organization may define and operate a public blockchain which has a limited sub-set of functionality available to the public and then extend the capabilities of the blockchain metadata definition manager 196 by side-chaining off of the public blockchain to provide the enhanced functionality.

According to described embodiments, the blockchain protocol certification 166 defining the protocol rules for a forked chain may be developed in any relevant programming or scripting language, such as, Python, Ruby, Perl, JavaScript, PHP, Scheme, VBScript, Java, Microsoft .Net, C++, C #, C, or a custom-created language for defining the protocol rules.

Under normal operating conditions, even conventional blockchains naturally fork from time to time, however, with previously known blockchains, ultimately only a single branch may form the primary consensus chain and all other forks must be ignored or truncated with only the primary consensus blockchain being considered as valid. Consensus on which chain is valid may be achieved by choosing the longest chain, which thus represents the blockchain having the most work put into completing it. Therefore, it is necessary to utilize the fork block 143 as described herein to permit permissibly forked chains to be created and certified as authorized forks via the fork hash 149 so as to prevent participating nodes to ignore or truncate the fork. Because each node may independently validate the forked blockchain, it will not be ignored, just as a validated primary blockchain will not be ignored upon having consensus.

Figure 3:
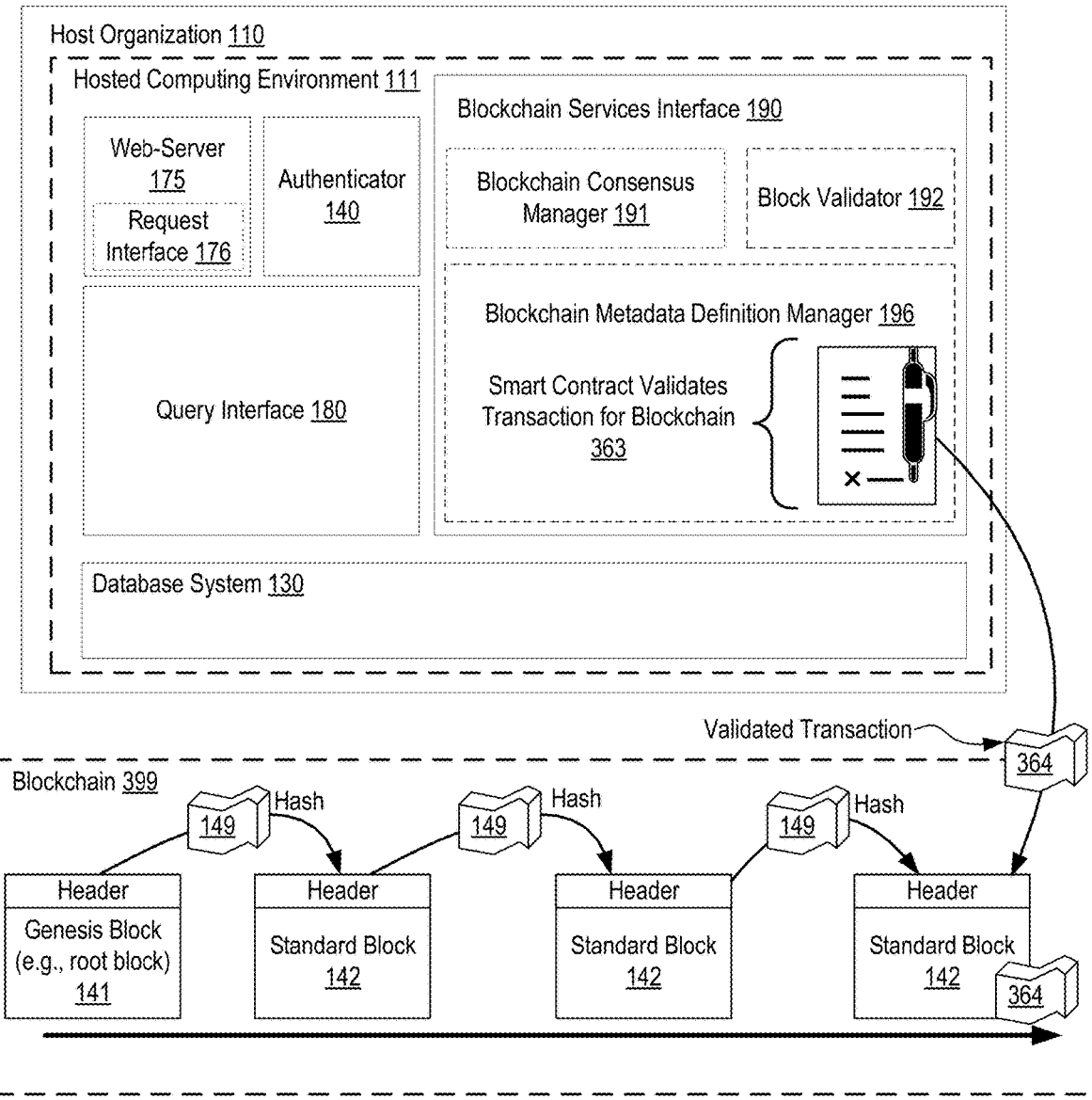
FIG. 3 depicts another exemplary architecture in accordance with described embodiments.

FIG. 3 depicts another exemplary architecture 300 in accordance with described embodiments.

According to one embodiment, the blockchain metadata definition manager 196 writes data or metadata onto a blockchain by transacting an asset to the blockchain or adding an asset to the blockchain via a new transaction with the blockchain. According to a particular embodiment, the transaction has a specific transaction type, for instance, defined as a blockchain storage transaction type, which triggers execution of a smart contract to perform validation of the transaction and specifically to perform validation of the data or metadata within the asset being added to or transacted onto the blockchain.

For example, such a smart contract 363 may execute via the host organization's blockchain services interface 190 which performs the validation and then transacts the new asset onto the blockchain pursuant to successful validation of the data or metadata within the asset being stored on the blockchain. As shown here at element 363, a smart contract executes and validates the transaction for the blockchain. Subsequently, a validated transaction 364 is then added to or transacted onto the blockchain 399.

Figure 4A:
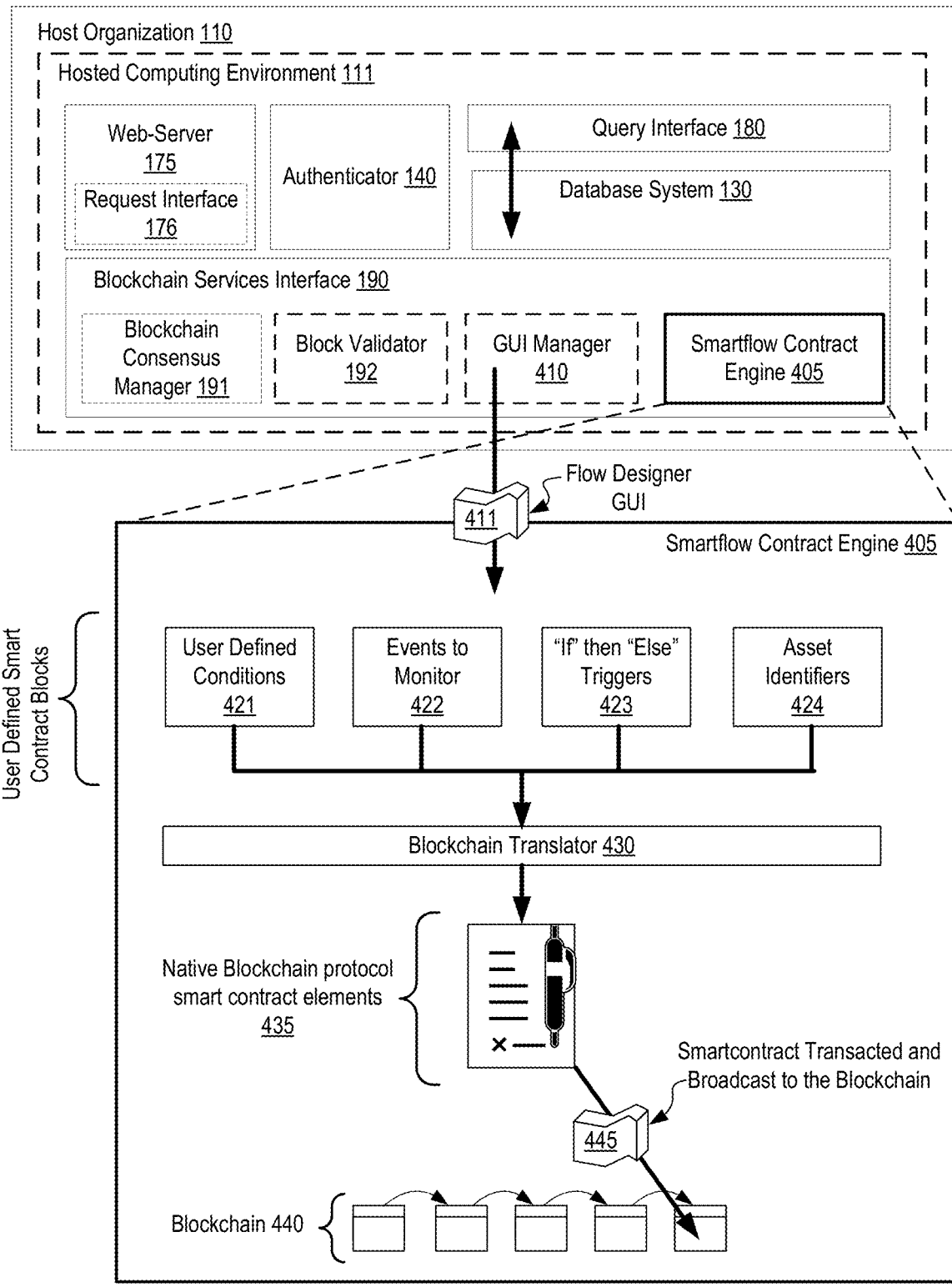
FIG. 4A depicts another exemplary architecture, with additional detail of a blockchain implemented smart contract created utilizing a smartflow contract engine, in accordance with described embodiments.

FIG. 4A depicts another exemplary architecture 400, with additional detail of a blockchain implemented smart contract created utilizing a smartflow contract engine 405, in accordance with described embodiments.

In particular, there is depicted here within the host organization the blockchain services interface 190 which now includes the smartflow contract engine 405 and additionally includes the GUI manager 410.

Because blockchain utilizes a distributed ledger, creation and execution of smart contracts may be technically complex, especially for novice users. Consequently, a smart flow visual designer allows implementation of smart contracts with greater ease. The resulting smart flow contract has mathematically verifiable auto-generated code, as created by the blockchain translator 430 freeing customers and users from having to worry about the programming language used in any given blockchain protocol. Moreover, the smart flow contract engine implements visual designers that coordinate with the blockchain translator 430 to generate the requisite native code capable of executing on each of the participating nodes of the blockchain, thus further allowing easy processing and verification of the smart contract. According to certain embodiments, each smart flow contract utilizes a mathematical code based verifiable encryption scheme.

Flow designers provide users with a simple, intuitive, web-based interface for designing applications and customized process flows through a GUI based guided flow design experience. The flow designer enables even novice users to create otherwise complex functionality, without necessarily having coding expertise or familiarity with the blockchain.

The GUI manager 410 presents a flow designer GUI 411 interface to a user device via which users may interact with the host organization. The smartflow contract engine 405 in coordination with the GUI manager interprets the various rules, conditions, and operations provided by the user, to generate a smartflow contract which is then translated or written into the target blockchain protocol.

Through the flow designer GUI 411, a user may completely define utilizing visual flow elements how a particular process, event, agreement, contract, purchase, or some other transaction needs to occur, including dependencies, checks, required process inputs and outputs, triggers, etc.

Using the flow designer GUI 411, the user simply drags and drops operational blocks and defines various conditions and "if then else" events, such as if this event occurs, then take this action. As depicted here, there are a variety of user defined smart contract blocks including user defined conditions 421, events to monitor 422, "if" then "else" triggers 423, and asset identifiers 424.

Once the user has completed defining the flow including all of its operational blocks, conditions, triggers and events, the smartflow contract engine takes each of the individual blocks and translates them into a native target blockchain protocol via the blockchain translator 430, and then generates a transaction to write the translated smartflow contract 445 into the blockchain 440 via the blockchain services interface 190.

Once transacted to the blockchain, every participating node with the blockchain will have a copy of the smart contract, and therefore, if any given event occurs, the corresponding trigger or rule or condition will be viewable to all participating nodes, some of which may then take an action based on the event as defined by the smart contract.

The blockchain services interface 190 of the host organization provides customers, users, and subscribers access to different blockchains, some of which are managed by the host organization 110, such as private blockchains, others being public blockchains which are accessible through the host organization 110 which participates as a node on such public blockchains. Regardless, each blockchain utilizes a different blockchain protocol and has varying rules, configurations, and possibly different languages via which interfaces must use to communicate with the respective blockchains. Consequently, the blockchain translator 430 depicted here translates the user defined smart contract blocks into the native or required language and structure of the targeted blockchain 440 onto which the resulting smart contract is to be written or transacted.

Once the smart contract is transacted and broadcast to the blockchain 445 it is executed within the blockchain and its provisions, as set forth by the user defined smart contract blocks, are then carried out and enforced.

According to one embodiment, a salesforce.com visual flow designer is utilized to generate the user defined smart contract blocks which are then translated into a blockchain smart contract. According to other embodiments, different visual flow designers are utilized and the blockchain translator 430 translates the user defined smart contract blocks into a blockchain smart contract.

The resulting native blockchain protocol smart contract elements 435 may be embodied within a code, structure, or language as dictated by the blockchain 440 onto which the smart contract is to be written. For instance, if the smart contract is to be written to Ethereum then the blockchain translator 430 must translate the user defined smart contract blocks into the Ethereum compliant "Solidity" programming language. Solidity is a contract-oriented, high-level language for implementing smart contracts specifically on Ethereum. Influenced by C++, Python and JavaScript, the language is designed to target the Ethereum Virtual Machine (EVM). Smart contract elements include support for voting, crowd funding, blind auctions, multi-signature wallets, as well as many other functions.

Conversely, if the smart contract is to be written to Hyperledger, then the language is different, utilizing the Go programming language which permits use of a distributed ledger blockchain for and smart contracts, among other capabilities.

While smart contracts are beneficial and supported by many blockchain protocols they may be cumbersome to implement to the requirement that they be programmed in differing languages depending on the particular blockchain being targeted. Therefore, not only must users understand programming constructs, but also the particular syntactical nuances of the required programming language for the blockchain protocol in question.

By utilizing the smart flow contract engine 405, even novice users may create compliant smart contracts by generating the smart contract elements with the flow designer and then leveraging the blockchain translator 430 to actually render the native blockchain programming language code embodying the smart contract elements as defined by the user, subsequent to which the blockchain services interface 190 handles the transacting of the smart contract onto the blockchain.

Consider for example a vendor that sells to Home Depot and wants to execute a smart contract with Home Depot which uses Ethereum. The vendor logs in with the host organization, assuming he is an authenticated user and has access to the cloud subscription services, and then accesses the smartflow contract engine 405 through which the user may generate whatever flow he wishes. When done, the user, via the flow designer GUI 411, instructs the blockchain services interface 190 to execute the smart contract, thus causing the smartflow contract engine to translate the user's custom designed smartflow contract into Ethereum compliant "Solidity" code, subsequent to which the smart contract is then written into the blockchain for execution. The vendor need not know how to program or even understand the details of transacting with the blockchain. Rather, the cloud based services accessible through the host organization 40 remove the complexity from the process and present the user with a simple flow designer GUI 411 through which all the necessary operations may thus be carried out.

According to such embodiments, writing the smart contract to the blockchain requires storing metadata defining the smart contract in the blockchain as supported by the particular blockchain protocol. According to one embodiment, when a transaction occurs on the blockchain, having the metadata for the smart contract therein, the smart contract is executed and the various user defined smart contract events, conditions, and operations are then effectuated.

According to certain embodiments, the user defined smart contract, having been translated and transacted onto the blockchain, triggers events within the host organization.

For example, consider that Wal-Mart and Nestle have an agreement that a shipment must be transported within a climate controlled trailer within a range of 35 to 39 degrees Fahrenheit at all times. Moreover, if the temperature exceeds 39 degrees at anytime, then the payment is nullified.

Within the host organization, a Customer Relationship Management (CRM) platform defines and manages the various relationships and interactions between customers, vendors, potential customers. suppliers, etc. The term CRM is usually in reference to a CRM system, which is a tool that helps businesses with contact management, sales management, workflow processes, productivity and so forth.

In the above example with Wal-Mart and Nestle, the CRM system will possess the requirements for the shipment. Because the host organization through the CRM system monitors the shipment and subscribes to shipment events, such as temperature data, the CRM system will monitor for and become aware of a temperature related event for the particular shipment which may then be linked back to the smart contract automatically. More particularly, because the host organization operates as a participating node for the blockchain within which the smart contract is executing, the host organization has visibility to both the smart contract terms and conditions accessible via the blockchain and also the CRM requirements for the shipment, such as the required temperature range.

Therefore, upon the occurrence of a smart contract condition violation, the host organization will synchronize the violation with the CRM system (which is not part of the blockchain) to halt the payment associated with that particular shipment, pursuant to the terms of the executing smart contract.

According to one embodiment, the blockchain sends out an event which the CRM system of the host organization will listen to, and then conduct some substantive action based on the event according to what is specified by the user defined smart contract flow. With the above example, the substantive action being to halt payment for the shipment pursuant to the smart contract on the blockchain.

Each of the participating parties for an executing smart contract will likely have their respective CRM systems subscribed to events of the blockchain associated with the executing smart contract, and therefore, both parties are likely to be aware of the event.

According to one embodiment, logic is written into the CRM system to facilitate a specific action responsive to a blockchain event. Stated differently, non-blockchain actions may be carried out pursuant to an executing blockchain smart contract.

Figure 4B:
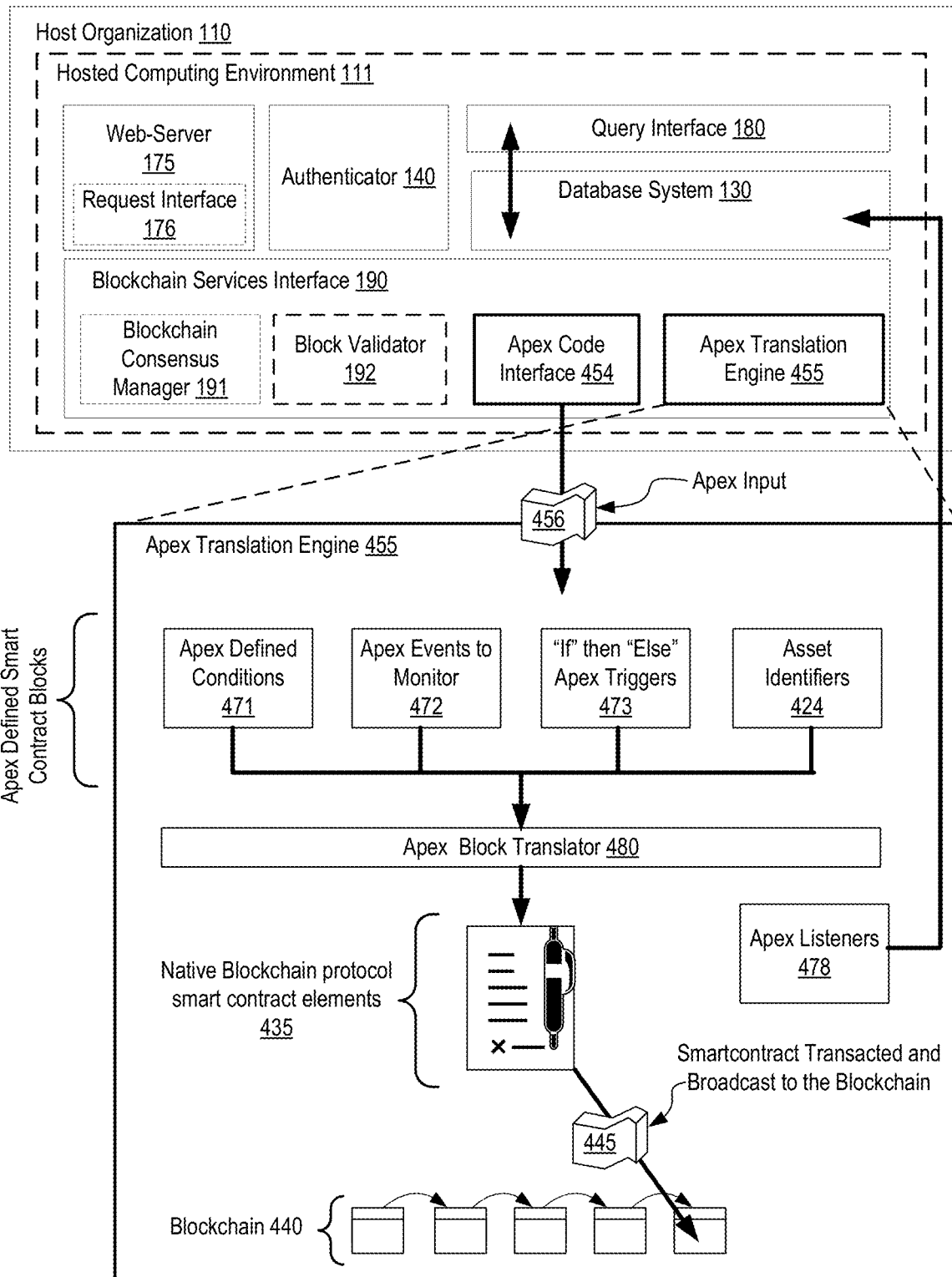
FIG. 4B depicts another exemplary architecture, with additional detail of a blockchain implemented smart contract created utilizing an Apex translation engine, in accordance with described embodiments.

FIG. 4B depicts another exemplary architecture 401, with additional detail of a blockchain implemented smart contract created utilizing an Apex translation engine 455, in accordance with described embodiments.

As depicted here, there is an Apex translation engine 455 within the blockchain services interface 190.

Apex is a programming language provided by the Force.com platform for developers. Apex is similar to Java and C# as it is a strongly typed, object-oriented based language, utilizing a dot-notation and curly-brackets syntax. Apex may be used to execute programmed functions during most processes on the Force.com platform including custom buttons and links, event handlers on record insertion, update, or deletion, via scheduling, or via the custom controllers of Visualforce pages.

Developers of the salesforce.com host organization utilize Apex frequently to implement SQL programming, database interactions, custom events for GUI interfaces, report generation, and a multitude of other functions. Consequently, there is a large community of developers associated with the host organization 110 which are very familiar with Apex and prefer to program in the Apex language rather than having to utilize a less familiar programming language.

Problematically, smart contracts must be written in the native language of the blockchain protocol being targeted for execution of the smart contract on the respective blockchain.

For instance, as noted above, if the smart contract is to be written to Ethereum then the smart contract must be written with the Ethereum compliant "Solidity" programming language.

Like the smart contracts, Apex is a kind of metadata. Therefore, the Apex translation engine 455 permits developers familiar with Apex to program their smart contracts for blockchains utilizing the Apex programming language rather than utilizing the native smart contract protocol programming language.

As depicted here, developers write their smart contracts utilizing the Apex programming language and then provide the Apex input 456 to the Apex translation engine 455 via the depicted Apex code interface 454, for example, by uploading a text file having the developer's Apex code embedded therein.

The Apex translation engine 455 parses the Apex input 456 to identify the Apex defined smart contract blocks and breaks them out in preparation for translation. As despite here, there are Apex defined conditions 471, Apex events to monitor 472, "if" then "else" Apex triggers 473, and as before, asset identifiers 424 which are not Apex specific.

The Apex defined smart contract blocks are then provided to the Apex block translator 480 which converts them into the native blockchain protocol smart contract elements 435 for the targeted blockchain protocol. Once translated, the process is as described above, in which the translated smart contract is transacted and broadcast 445 to the blockchain 440 for execution 445.

Unlike the visual flow GUI, because Apex is programmatic, users writing Apex code may write programs to execute on a smart contract and are not limited by the available functions within the visual flow GUI.

According to a particular embodiment, the Apex input 456 is first translated into JavaScript and then subsequently translated into a specific blockchain API appropriate for the targeted blockchain protocol upon which the smart contract is to be executed.

According to another embodiment, listening events may be written using the Apex language and provided in the Apex input 456, however, such listening events are to be executed by the host organization. Therefore, the Apex block translator 480 separates out any identified Apex listeners 478 and returns those to the host organization 110 where they may be implemented within the appropriate CRM system or other event monitoring system. In such a way, developers may write the Apex input 456 as a single program and not have to separately create the smart contract and also the related listening events in separate systems.

Figure 5:
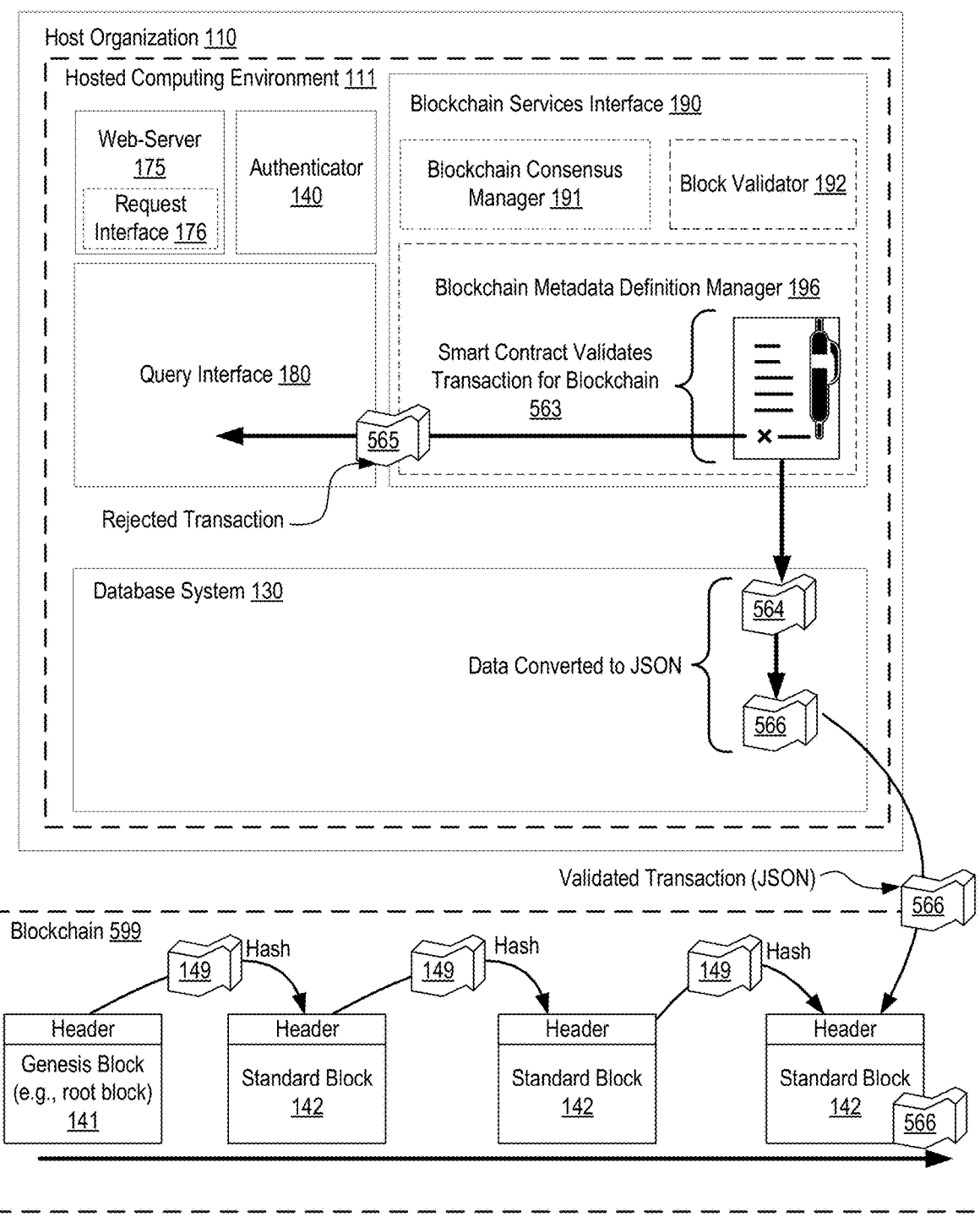
FIG. 5 depicts another exemplary architecture in accordance with described embodiments.

FIG. 5 depicts another exemplary architecture 501 in accordance with described embodiments.

Conventional solutions permit the storage of free-form text within an asset transacted onto the blockchain, for instance, storing such data within a payload portion of the asset, however, because such data is not validated, there is a risk that corrupted or incorrect data is written to the blockchain and later retrieved on the assumption that such data is valid.

By executing a smart contract to perform transaction validation of the entity or asset being transacted onto the blockchain, it is therefore possible to enforce various masks, data structures, data types, data format, or other requirements prior to such data being written to the blockchain 599.

According to such embodiments, the blockchain metadata definition manager 196 executes smart contract validation 563, and if the data to be written to the blockchain is not compliant with the requirements set forth by the executed smart contract, then the transaction is rejected 565, for instance, sending the transaction back to a query interface to inform the originator of the transaction. Otherwise, assuming the transaction is compliant pursuant to smart contract execution, then the transaction is validated 564 and written to the blockchain.

According to one embodiment, the smart contract applies a data mask to validate compliance of the data or metadata to be written to the blockchain. In other embodiments, the smart contract enforces rules which are applied to the data as part of the validation procedure.

According to one embodiment, the smart contract executes as part of a pre-defined smart contract system which executes with any blockchain which permits the use of smart contracts, and the smart contract performs the necessary data validation.

According to one embodiment, the data or metadata to be written to the blockchain 599 is converted to a JSON format to improve storage efficiency. JavaScript Object Notation (JSON) provides an open-standard file format that uses human-readable text to transmit data objects consisting of attribute-value pairs and array data types or any other serializable value. It is a very common data format used for asynchronous browser-server communication, including as a replacement for XML in some AJAX-style systems. Additionally, because JSON is a language-independent data format, it may be validated by the smart contract on a variety of different smart contract execution platforms and blockchain platforms, regardless of the underlying programming language utilized for such platforms.

Thus, as depicted here, data or metadata to be written to the blockchain may be converted into a JSON format 566 (e.g., within database system 130 of the host organization 110) and the validated and converted JSON data is then transacted onto the blockchain.

Figure 6A:
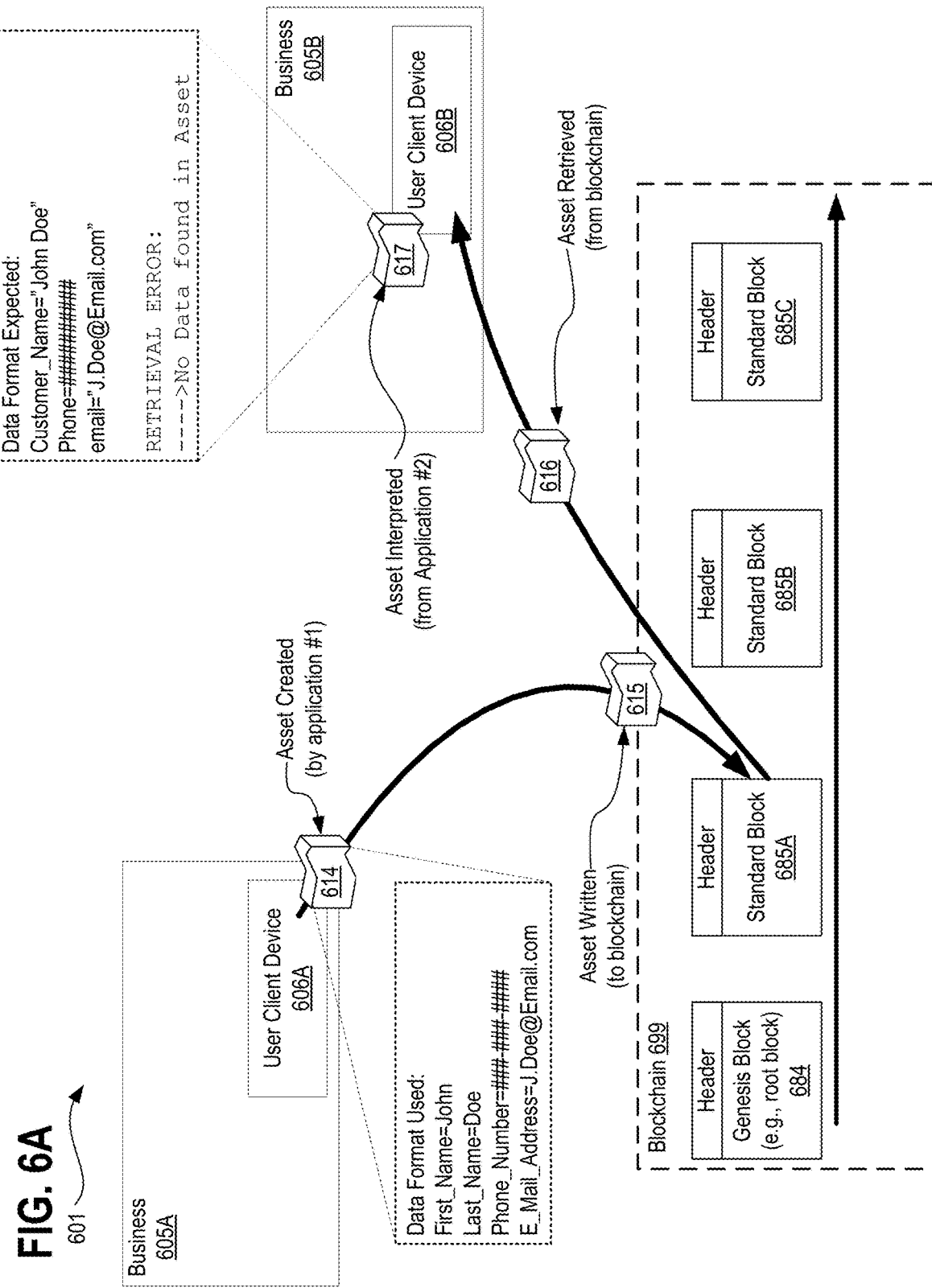
FIG. 6A depicts another exemplary architecture in accordance with described embodiments.

FIG. 6A depicts another exemplary architecture 601 in accordance with described embodiments.

As shown here, the asset created 614 by application #1 is written onto the blockchain as asset 615. The blockchain 699 is depicted as receiving the written asset 615 at standard block 685A following genesis block 684, as shown. Although it will be written to the latest new block on the blockchain 699, such as standard block 685B, or 685C, or some other later block, whatever block that is at the time of the transaction.

Many customer organizations and businesses operate in a network-centric manner as they are obligated by the marketplace to solve customer problems. Therefore, it becomes necessary for businesses, including sometimes unrelated business organizations, to share data amongst one another on behalf of their customers.

Understandably, however, different businesses have a fundamental lack of trust in one another. Thus, many businesses find themselves in a situation today where they need to share data to satisfy their customers, and yet, they cannot trust that the other businesses with whom they share data can be trusted.

Distributed Ledger Technology and blockchain platforms specifically solve the issue of trust as is described above. This is true because data written onto the blockchain is immutable insomuch that updates may be provided, but the historical data is always accessible, and further still, all participating nodes for the blockchain cooperatively contribute to consensus based upon an agreed consensus model. The exception to this is the modified DLT technology discussed above for which a shared ledger (e.g., element 157 at FIG. 1C, et seq.) is hosted internally to a host organization and for which the host organization operates as the single and centralized trust authority, or alternatively for which trust determination is delegated to a customer organization operating a modified DLT shared ledger instance 157, pursuant to which the customer organization then determines for themselves who has access rights, such as what partner organizations or users, etc., have consent from the customer organization to access data in the modified DLT shared ledger.

Therefore, utilization of DLT technologies and blockchain technology specifically is considered to solve the issue of trust amongst businesses wishing to share data.

Notwithstanding the issue of trust having been largely solved, there remains two further obstacles which prevent adoption of the technology.

Firstly, adoption of blockchain is technologically complex and exceedingly difficult for most businesses to implement on their own. Even a technical evaluation of such data requires specialized computer programmers and developers having adequate skill in this particular area of expertise coupled with an understanding of the needs of the business, often provided by a technical business analyst, and then the procurement of additional computing infrastructure and either the development of a blockchain platform and protocol themselves or the identification and then participation with an existing public or private blockchain that meets the needs of the business. These developers must understand how to package and transact assets (sometimes called "coins") onto the blockchain and how to transfer those assets, within which their information of interest is embedded, between nodes and make such data available to other participating nodes on the blockchain, such that the information may be shared. Further still, there needs to be a consensus model by such a blockchain which is acceptable to the business. For these reasons alone, adoption of blockchain technologies, though promising, remains an insurmountable burden for many businesses.

Secondly, even assuming the above mentioned obstacles are overcome, there remains a significant problem with data standardization across applications for information which is written to, stored within, or persisted by the blockchain. For instance, even assuming a business manages to transact information to the blockchain and make that data accessible to another business, there simply is no guarantee whatsoever that the information written to the blockchain by a first business will be understandable by a second business. Therefore, the transportability of data amongst businesses wishing to share data presents another significant problem, due to the lack of standardization of data written onto the variously available blockchain platforms.

Consider the exemplary depiction shown here at FIG. 6A, in which there are two businesses 605A and 605B, which have managed to agree to share data with one another and have successfully implemented the necessary computing architecture to transact with a blockchain 699.

With all data sharing agreements in place, business 605A creates an asset via its application #1 executing at the user client device 606A, and as depicted, embeds a customer record into that asset 614 which is to then be transacted onto the blockchain 699. As shown here, application #1 creates the asset with the following information:

Data Format Used:
First_Name=John
Last_Name=Doe
Phone_Number=###-###-####
E_Mail_Address=J.Doe@Email.com Notably, for this record, there are four fields, including "First_Name" and "Last_Name" followed by "Phone_Number" which has a particular format mask used as well in which there are hyphens "-" required in between certain digits, and finally an email address which has a field identifier of "E_Mail_Address."

Each of the various fields are then populated with data.

The created asset is then transacted onto the blockchain 699 as depicted by the asset written 615 onto the blockchain and at some later time, business 605B elects to retrieve the information via its own application #2.

As shown here, business 605B transacts with the blockchain and the asset retrieved 616 is successfully transmitted to the application #2 executing at user client device 606B.

All seems well, until the application #2 utilizes its own understanding of the data to interpret the asset 617 via the code executing at application #2, which expects the following information:

Data Format Expected:
Customer_Name="John Doe"
Phone=##########
email="J.Doe@Email.com"
RETRIEVAL ERROR:
---->No Data Found in Asset As might be expected, application #2 encounters a retrieval error message: "No Data found in Asset."

This is the result when application #2 looks for a field named "Customer_Name" and yet there is no such field. Application #2 additionally looks for the field "Phone" and finds no such field, and finally searches for "email" and again finds no such field.

While a human reader may readily understand that "First_Name" with the value "John" represents a sub-portion of the field "Customer_Name," such logic simply is not available within applications and computing programs which simply search for the field name that they are instructed (e.g., programmed) to search for, which is "Customer_Name" and not a combination of "First_Name" and "Last_Name."

While such a conversion between the two field types would be trivial for any programmer, the fact remains that the two applications by each of the respective businesses are simply incompatible, and if they are to be made compatible, then custom translation for these fields needs to be programmed.

Fundamentally, the non-transferability of this date is due to a lack of data standardization. The two distinct application entities each are enabled to write to the blockchain and retrieve from it, and an agreement is in place between the businesses to share such data, and yet, the two entity applications lack the ability to share the data because there is no definition of what constitutes a customer's name. One application expects this to be a combination of "First_Name" and "Last_Name" fields whereas another application expects the field "Customer_Name" to be utilized as a single field for the customer's full name.

Figure 6B:
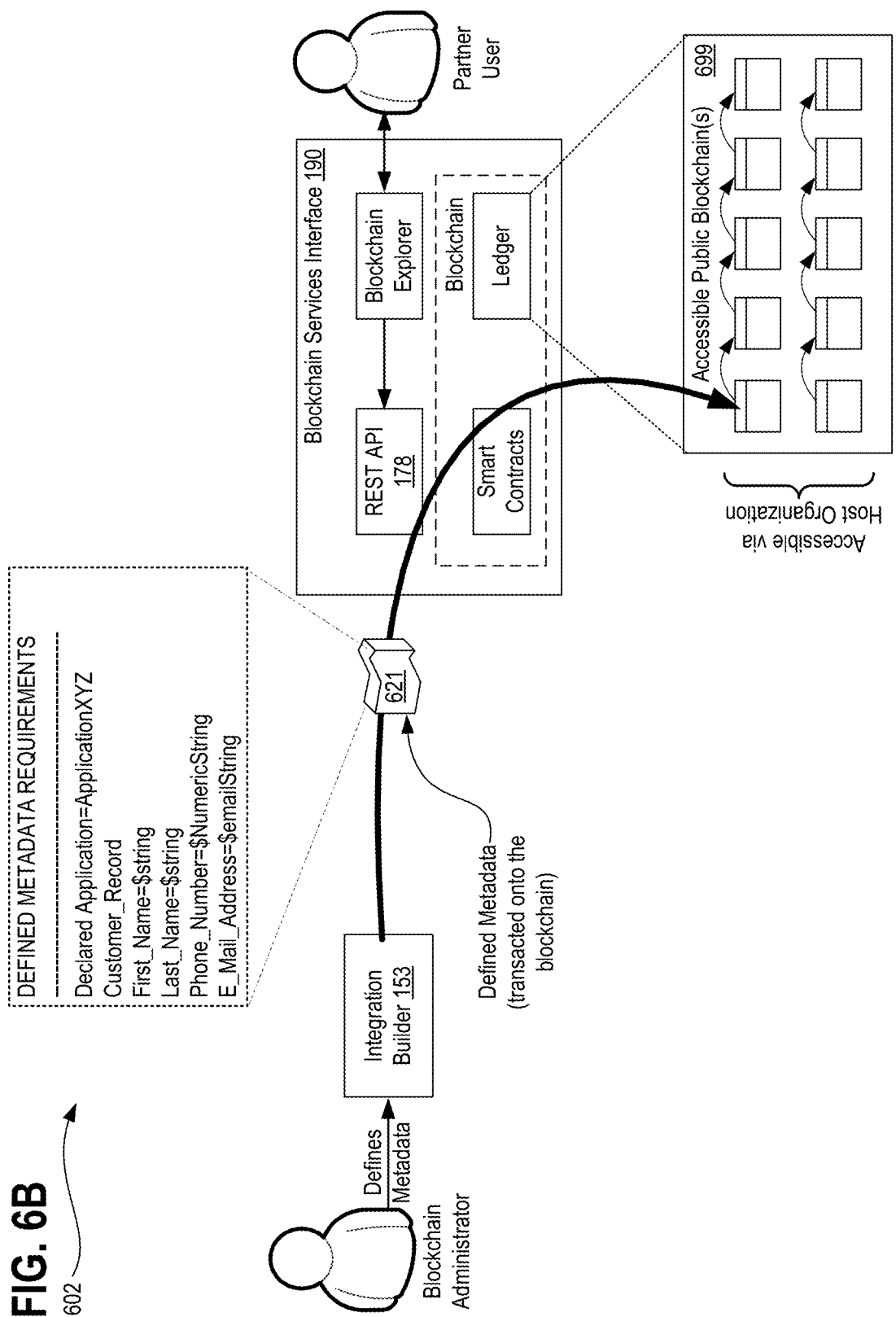
FIG. 6B depicts another exemplary architecture in accordance with described embodiments.

FIG. 6B depicts another exemplary architecture 602 in accordance with described embodiments.

In particular, there is now depicted a blockchain administrator defining metadata for the data utilized by an application which then standardizes the data which is written onto the blockchain on behalf of the two businesses, business 605A and business 605B.

As depicted here, the blockchain administrator defines metadata via the integration builder's (element 153) GUIs or via the integration builder's API, and that defined metadata 621 is then pushed onto the specified blockchain 699. The defined metadata 621 may be transacted through the REST API 178 provided by the blockchain services interface 190 and ultimately the asset created 614 is written onto the accessible public blockchain 699.

Now, there is, transacted onto the blockchain, a clearly defined metadata specifying the requirements for the declared application "ApplicationXYZ" and specifically for the "Customer_Record," which is now structured as follows, as per the defined metadata:

DEFINED METADATA REQUIREMENTS
Declared Application=ApplicationXYZ
Customer_Record
First_Name=$string
Last_Name=$string
Phone_Number=$NumericString
E_Mail_Address=$emailString Because the defined metadata 621 is transacted onto the blockchain, any application with permission to access data records on the blockchain 699 will be able to read and write data in compliance with the requirements specified by the defined metadata 621. This may be the specifically declared application, "ApplicationXYZ," or this may be other applications which utilized the data generated or managed by the declared application. Any application can read out the defined metadata 621 and operate in compliance with the requirements.

FIG. 6C depicts another exemplary architecture 603 in accordance with described embodiments.

In particular, it is now depicted that businesses 605A and 605B are enabled to share data transacted onto the blockchain 699 and because the defined metadata 621 specifies the requirements for formatting such data, the data written to the blockchain 699 and retrieved from the blockchain will embody a known format, and thus be transferable between the various businesses.

As shown here, the blockchain administrator defines the metadata via the blockchain services interface 190 which is transacted onto the blockchain, and then later, business 605A creates an asset 614 via application #1 and it writes that asset having the details of a customer record into the blockchain. Subsequently, business 605B retrieves the asset from the blockchain and when the asset is interpreted 617 via application #2 executing at business 605B, that data is successfully interpreted and understood by the application because there is a known and defined metadata structure for the customer record data.

Therefore, according to a particular embodiment, there are operations by a system of a host organization that declare a new application and transact defined metadata for the new application onto a blockchain. For instance, such operations may include operating a blockchain interface to the blockchain on behalf of a plurality of tenants of the host organization, in which each one of the plurality of tenants operate as a participating node with access to the blockchain. Such operations may further include, receiving, from a user device communicably interfaced with the system, first input declaring the new application. Such operations may further include, receiving second input from the user device adding a plurality of network participants for the new application, in which the network participants are granted access rights to the new application. Such operations may further include, receiving third input from the user device declaring a plurality of entity types for the new application. Such operations may further include, receiving fourth input from the user device declaring one or more new field definitions for each of the plurality of entity types. Such operations may further include, generating a blockchain asset having encoded therein as the defined metadata for the new application, at least (i) the plurality of network participants declared, (ii) the plurality of entity types declared, and (iii) the one or more new field definitions declared for each of the plurality of entity types. Such operations may further include, transacting the blockchain asset having the defined metadata encoded therein for the new application onto the blockchain.

According to the operations of another embodiment, the blockchain asset has a defined transaction type; and in which the defined transaction type for the blockchain asset having the defined metadata encoded therein associates the defined metadata for the new application with a smart contract to execute data validation for any data transacted onto the blockchain for the new application; in which the smart contract validates the data transacted onto the blockchain for the new application is in compliance with the defined metadata for the new application transacted onto the blockchain.

According to another embodiment such operations may further include: receiving a transaction at the blockchain specifying data for the new application; and triggering a smart contract based on the received transaction specifying the data for the new application; and executing the smart contract to validate the specified data for the new application is in compliance with the defined metadata for the new application; and in which the transaction is rejected if the specified data is non-compliant with the defined metadata for the new application.

According to the operations of another embodiment, transacting the blockchain asset onto the blockchain includes: adding a transaction to a new block on the blockchain specifying the defined metadata for the new application as payload data for the transaction; subjecting the added transaction to consensus by participating nodes of the blockchain, in which the added transaction is subjected to a consensus protocol by the participating nodes of the blockchain prior to the added transaction being accepted as part of a primary chain of the blockchain by the participating nodes of the blockchain; and in which the defined metadata for the new application is persisted within an accepted transaction on a new block of the blockchain pursuant to successful consensus for the added transaction.

According to another embodiment, such operations may further include: receiving new input at the system, in which the new input declares a second new application; and receiving additional input at the system selecting one of the plurality of entity types declared for the first new application as a selected entity type for the second new application, in which the selected entity type inherits the one or more new field definitions as specified via the defined metadata for the respective one or more entity types associated with the first new application.

According to the operations of another embodiment, multiple different declared applications specify at least one of the plurality of entity types declared for the first new application as a selected entity type for the multiple different declared applications; and in which a single instance of the defined metadata corresponding to the respective one of the plurality of entity types declared for the first new application and all of the one or more new field definitions associated with the respective entity type declared for the first new application controls both (i) the respective one of the plurality of entity types declared for the first new application and (ii) the selected entity type for all of the multiple different declared applications having selected the respective entity type declared for the first application.

According to the operations of another embodiment, receiving the fourth input from the user device declaring one or more new field definitions for each of the plurality of entity types further includes receiving the fourth input defining a field definition type for each of the one or more new field definitions; and in which each field definition type is selected from the group including: integer, Boolean, numeric, alphanumeric, date, hyperlink, computed, or custom.

According to another embodiment such operations may further include: authenticating the user device with the host organization as being associated with one of the plurality of tenants; and in which the one of the plurality of tenant is a subscriber to cloud based on-demand services provided by the host organization over a public Internet.

According to another embodiment such operations may further include: executing an event listener to monitor any changes to the blockchain associated with the new application; and triggering an event when the changes to the blockchain associated with the new application are observed by the event listener.

According to another embodiment such operations may further include: receiving fifth input from the user device declaring an event and one or more monitored event conditions for the new application declared; in which the declared event specifies one of: (i) a process flow to execute at the host organization responsive to occurrence of the event at the blockchain or (ii) a database transaction to execute against a database system internal to the host organization responsive to occurrence of the event at the blockchain; and monitoring, via an event listener, for any change to the blockchain meeting the specified event and the one or more event conditions.

According to the operations of another embodiment, each network participant is granted access rights to the new application and to data on the blockchain associated with the new application.

According to the operations of another embodiment, each of the plurality of network participants are selected from among the group including: a user of the host organization associated with one of the plurality of tenants of the host organization; a partner user corresponding to one of the plurality of tenants of the host organization; a customer organization corresponding to one of the plurality of tenants of the host organization; a non-user of the host organization; a partner organization which is not one of the plurality of tenants of the host organization; and one or more participating nodes on the blockchain which correspond to either a tenant of the host organization or a customer organization which subscribes to cloud computing services from the host organization; and one or more participating nodes on the blockchain which do not subscribe to cloud computing services from the host organization.

According to the operations of another embodiment, receiving the first input from the user device declaring the application further includes: receiving with the first input for the new application declared one or both of specified administrative control for the new application or ownership for the new application declared.

According to another embodiment, such operations may further include: receiving instructions to deploy the new application declared and the defined metadata for the new application onto the blockchain; and in which transacting the blockchain asset having the defined metadata encoded therein for the new application onto the blockchain includes deploying the new application and the defined metadata via the blockchain responsive to receiving the instructions to deploy.

According to the operations of another embodiment, receiving the inputs defining each of (i) the plurality of network participants declared, (ii) the plurality of entity types declared, and (iii) the one or more new field definitions declared for each of the plurality of entity types includes receiving the inputs as programming code via an API at a blockchain metadata definition manager exposed by the host organization.

According to another embodiment such operations may further include: transmitting a GUI to the user device from a blockchain metadata definition manager, in which the GUI prompts for the inputs defining each of (i) the plurality of network participants declared, (ii) the plurality of entity types declared, and (iii) the one or more new field definitions declared for each of the plurality of entity types; in which the inputs are received at the GUI via one or more interactive click events, drag events, drop down selection events, text input events, and touch events; and in which receiving the inputs includes receiving the inputs from the GUI transmitted to the user device.

According to the operations of another embodiment, the blockchain protocol for the blockchain is defined by the host organization and further in which the host organization permits access to the blockchain for the plurality of tenants of the host organization operating as participating nodes on the blockchain; or alternatively in which the blockchain protocol for the blockchain is defined by a third party blockchain provider other than the host organization and further in which the host organization also operates as a participating node on the blockchain via which the host organization has access to the blockchain.

According to another embodiment such operations may further include: receiving an SQL query at a receive interface requesting data associated with the new application; translating the SQL query into native blockchain executable code via an Apex translator engine at the host organization; executing the native blockchain executable code against the blockchain to retrieve the data requested; and returning the data requested responsive to receipt of the SQL query.

According to another embodiment such operations may further include: generating a virtual table within a database system of the host organization; and structuring the virtual table at the database system of the host organization based on the metadata declared for the new application; in which entity types are represented as tables within the virtual table and further in which the one or more new field definitions declared for each of the plurality of more entity types for the new application are represented as columns within the tables at the virtual table.

According to the operations of another embodiment, the virtual table includes a materialized view hosted at the database system of the host organization structured based on the metadata declared for the new application; and in which the materialized view hosted at the database system of the host organization does not store any data associated with the new application; and in which SQL queries requesting read-only access are processed against the materialized view by translating the read-only SQL queries into a blockchain transaction to retrieve the requested data associated with the new application from the blockchain.

According to another embodiment such operations may further include: retrieving the defined metadata for the new application from the blockchain, including plurality of entity types declared for the new application, the one or more new field definitions declared for each of the plurality of entity types, and any field types applied to the one or more new field definitions; generating a materialized view of the data persisted with the blockchain within a virtual table at the host organization by structuring the virtual table based on the defined metadata for the new application; in which the materialized view represents the structure of the data associated with the new application which is persisted to the blockchain without storing the data associated with the new application within the materialized view at the host organization.

According to another embodiment such operations may further include: receiving, at the host organization, an SQL statement from a user device, in which the SQL statement is directed toward the materialized view requesting an SQL update or an SQL insert for the data persisted to the blockchain and associated with the new application; processing the SQL statement against the materialized view by translating the SQL statement requesting the SQL update or the SQL insert into a corresponding blockchain transaction to update or add the data associated with the new application at the blockchain; and issuing an acknowledgment to the user device confirming successful processing of the SQL statement against the materialized view pursuant to the corresponding blockchain transaction being accepted by consensus to the blockchain and successfully updating or adding the data associated with the new application at the blockchain.

According to another embodiment such operations may further include: receiving an SQL statement directed toward the materialized view at the host organization; in which the SQL statement specifies one or more of (i) a SELECT from SQL statement, (ii) an INSERT into SQL statement, and (iii) an UPDATE set SQL statement; and in which the SQL statement received is processed by translating the SQL statement into a corresponding blockchain transaction and executing the corresponding blockchain transaction against the blockchain in fulfillment of the SQL statement directed toward the materialized view at the host organization.

According to another embodiment, such operations may further include: in which the metadata defined for the new application represents user specified relationships between two or more of the plurality of entity types by linking together assets at the blockchain.

According to another embodiment, such operations may further include: declaring, at the host organization, new business logic for the new application within a table structure having one or more relationships between elements of the new business logic and one or more of the plurality of entity types for the new application; and defining the new business logic any all relationships within the metadata persisted to the blockchain.

According to another embodiment such operations may further include: executing an event listener to monitor for any changes to the defined metadata for the new application at the blockchain; and triggering an event when the changes to the metadata for the new application at the blockchain are observed by the event listener; and in which the triggered event automatically pushes a metadata update to the host organization to update a materialized view of the data associated with the new application by re-structuring the materialized view at the host organization based on the metadata update triggered by the event listener.

According to the operations of another embodiment, triggering the event via the event listener based on changes to the metadata for the new application further includes: triggering one or more of: a business user defined process flow to execute responsive to changes to the defined metadata persisted to the blockchain; a business user defined data retrieval operation to execute responsive to changes to the defined metadata persisted to the blockchain; a business user defined data filtering operation to execute responsive to changes to the defined metadata persisted to the blockchain; an administrator defined process flow to update a data analytics feed responsive to changes to the defined metadata persisted to the blockchain; and an administrator defined process flow to update an Artificial Intelligence (AI) training data stream responsive to changes to the defined metadata persisted to the blockchain.

According to a particular embodiment, there is non-transitory computer-readable storage media having instructions stored thereupon that, when executed by a processor of a system having at least a processor and a memory therein, the instructions cause the system to perform operations including: operating a blockchain interface to the blockchain on behalf of a plurality of tenants of the host organization, in which each one of the plurality of tenants operate as a participating node with access to the blockchain; receiving, from a user device communicably interfaced with the system, first input declaring a new application; receiving second input from the user device adding a plurality of network participants for the new application, in which the network participants are granted access rights to the new application; receiving third input from the user device declaring a plurality of entity types for the new application; receiving fourth input from the user device declaring one or more new field definitions for each of the plurality of entity types; generating a blockchain asset having encoded therein as the defined metadata for the new application, at least (i) the plurality of network participants declared, (ii) the plurality of entity types declared, and (iii) the one or more new field definitions declared for each of the plurality of entity types; and transacting the blockchain asset having the defined metadata encoded therein for the new application onto the blockchain.

According to yet another embodiment, there is a system to execute at a host organization, in which the system includes: a memory to store instructions; a processor to execute instructions; in which the processor is to execute a blockchain services interface on behalf of on behalf of a plurality of tenants of the host organization, in which each one of the plurality of tenants operate as a participating node with access to the blockchain; a receive interface to receive first input from a user device communicably interfaced with the system, the received first input declaring a new application; the receive interface to further receive second input from the user device adding a plurality of network participants for the new application, in which the network participants are granted access rights to the new application; the receive interface to further receive third input from the user device declaring a plurality of entity types for the new application; the receive interface to further receive fourth input from the user device declaring one or more new field definitions for each of the plurality of entity types; a blockchain services interface to generate a blockchain asset having encoded therein as the defined metadata for the new application, at least (i) the plurality of network participants declared, (ii) the plurality of entity types declared, and (iii) the one or more new field definitions declared for each of the plurality of entity types; and in which the blockchain services interface further is to transact the blockchain asset having the defined metadata encoded therein for the new application onto the blockchain.

According to the embodiment of the system, the receive interface is further to receive fifth input from the user device declaring an event and one or more monitored event conditions for the new application declared; in which the declared event specifies one of: (i) a process flow to execute at the host organization responsive to occurrence of the event at the blockchain or (ii) a database transaction to execute against a database system internal to the host organization responsive to occurrence of the event at the blockchain; and in which the system further includes an event listener, in which the event listener is to monitor for any change to the blockchain meeting the specified event and the one or more event conditions and trigger the declared event responsive to a monitored change on the blockchain.

Figure 7A:
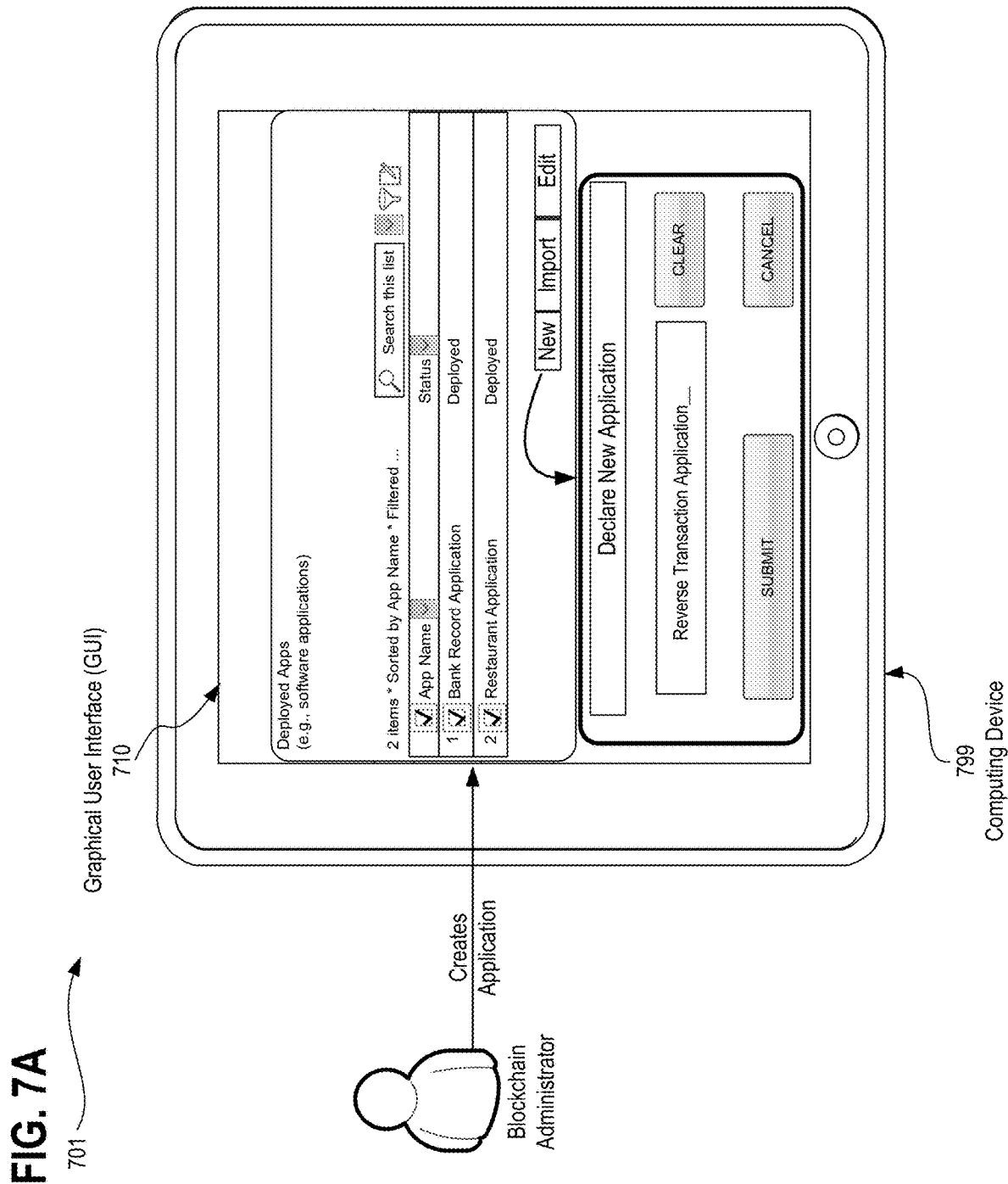
FIG. 7A depicts another exemplary architecture in accordance with described embodiments.

FIG. 7A depicts another exemplary architecture 701 in accordance with described embodiments.

As shown here, there is a GUI 710 executing at a computing device 799, such as a user device of the blockchain administrator, with the GUI 710 being pushed to the computing device 700 by the blockchain metadata definition manager 196 of the host organization.

As shown here, the blockchain administrator may view the deployed applications as shown at the top of the GUI 710 and by clicking the "new" button at the GUI 710, the declarative capability is provided for the blockchain administrator to declare a new application. While depicted here is the declaration of a new application via the GUI 710, the blockchain administrator may alternatively utilize an API provided via the blockchain metadata definition manager 196 to create the new application.

Figure 7B:
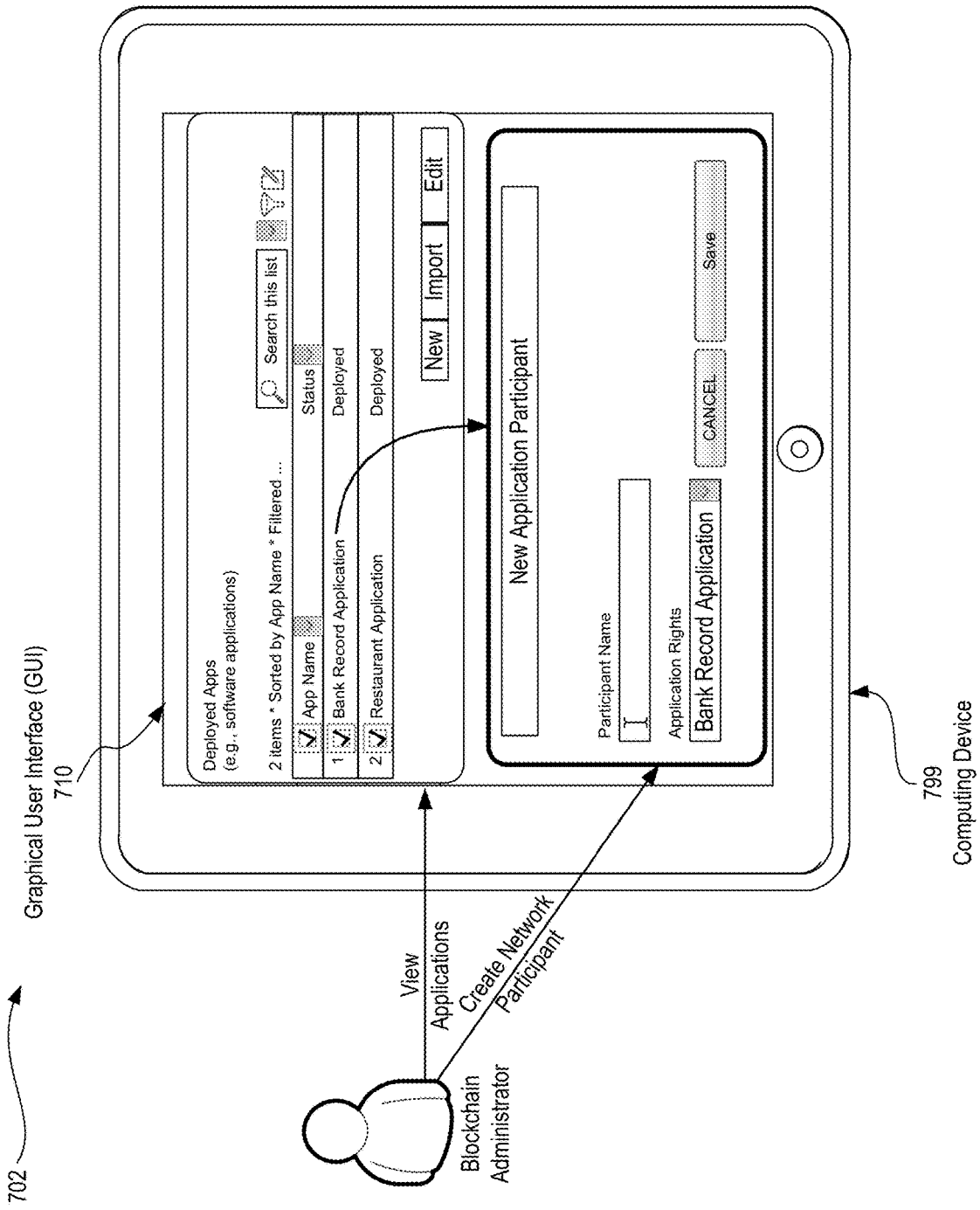
FIG. 7B depicts another exemplary architecture in accordance with described embodiments.

FIG. 7B depicts another exemplary architecture 702 in accordance with described embodiments.

In addition to the declaration of the new application or declaring the new application, there is additionally the ability for the blockchain administrator to define what participants have access to the data associated with this particular application, thus defining the network participants for this newly declared application.

Figure 7C:
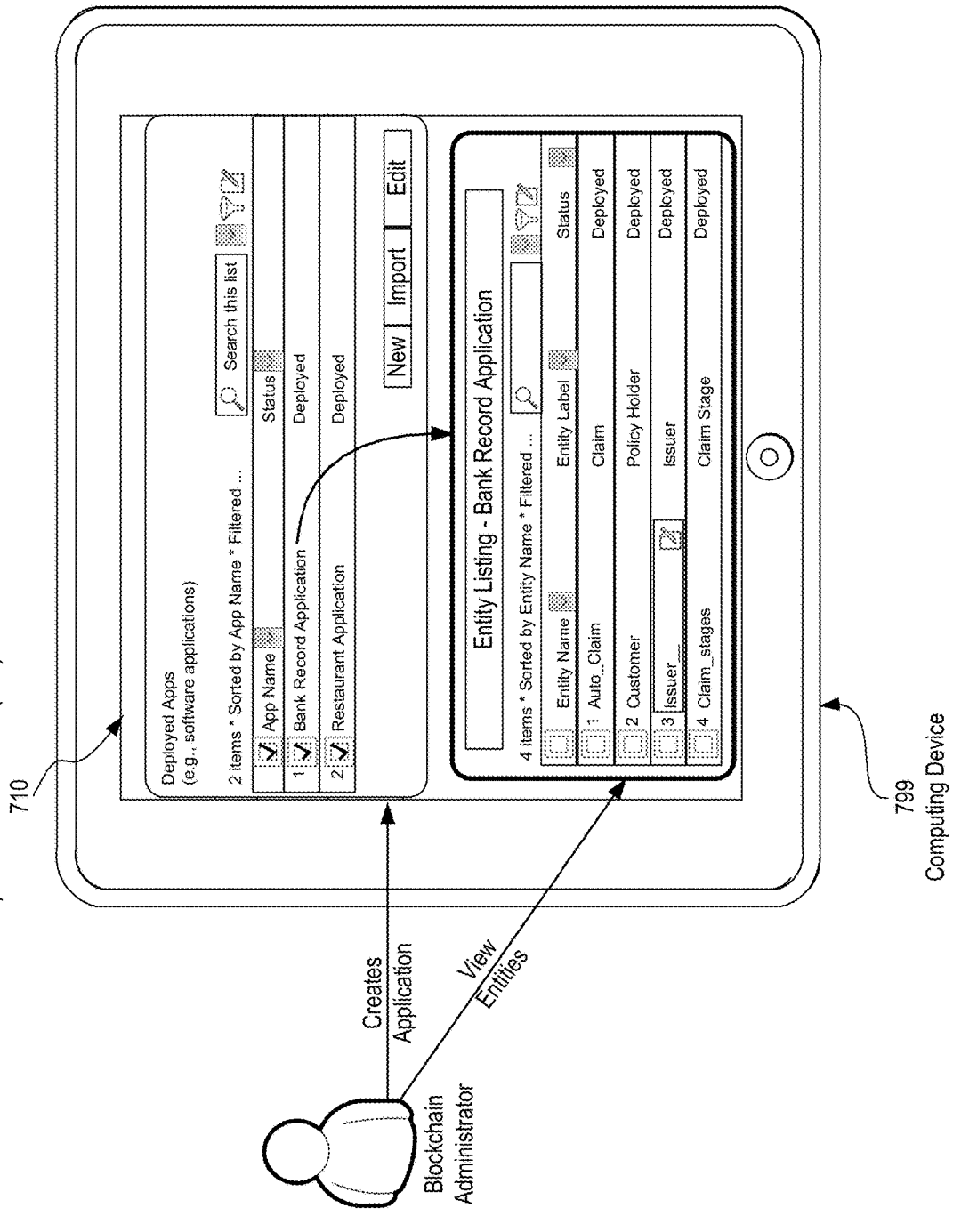
FIG. 7C depicts another exemplary architecture in accordance with described embodiments.

FIG. 7C depicts another exemplary architecture 703 in accordance with described embodiments.

There is again depicted the GUI 710, however, now depicted is the blockchain administrator viewing and editing entities for the "bank record application" by clicking on that application.

Thus, the blockchain administrator may first declare or create a new "application" and then once created, the blockchain administrator may edit or view that application and may create or declare new "entities" within the application, with each declarative entity defining the metadata for a particular custom field within which the application may ultimately store information in compliance with the defined metadata and which other applications may also interact with such data and reference such data, and possibly update, add to, or delete such data where adequate permissions exist, but again, doing so in compliance with the defined metadata.

For example, there is defined here for the bank record application, a "claim" having the entity name "Auto_Claim" and thus, any application wishing to write information to the blockchain pertaining to claims, at least to the extent such information will be utilized by the bank record application, then it is necessary to comply with the requirements of the defined entity "Auto_Claim."

Figure 7D:
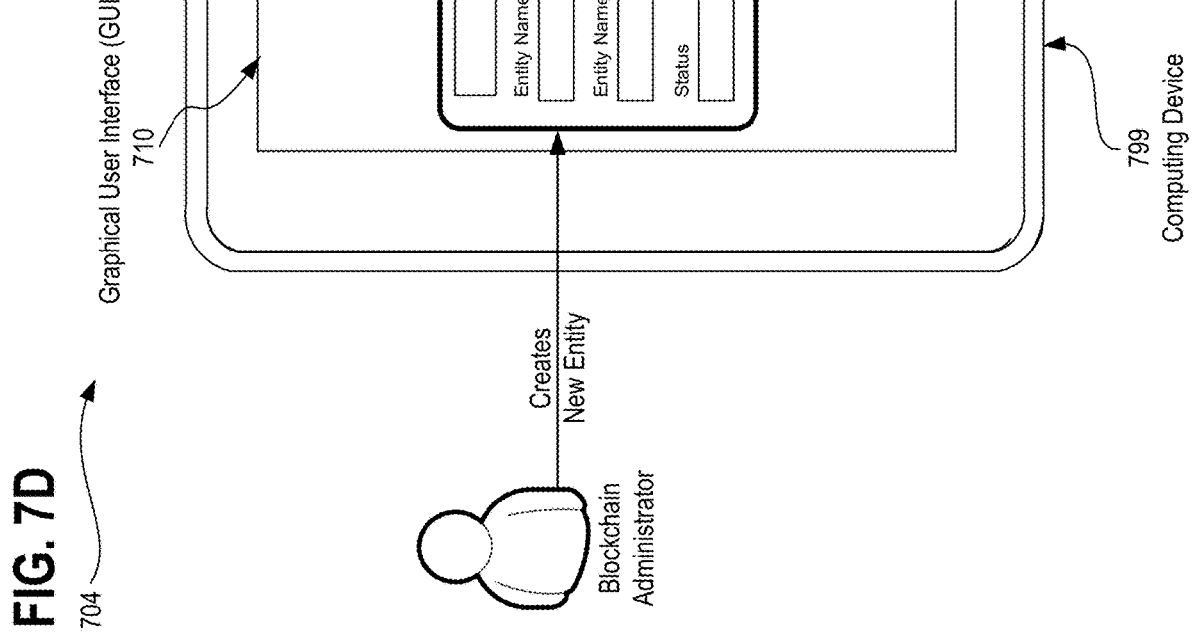
FIG. 7D depicts another exemplary architecture in accordance with described embodiments.

FIG. 7D depicts another exemplary architecture 704 in accordance with described embodiments.

Depicted here is a GUI 710 resulting from the blockchain administrator clicking on the "new" button on the prior screen to declare and create a new entity within the newly created application, or within a viewed application.

As shown here, there is a "New Entity Definition" GUI presented, in which the blockchain administrator can now create a new entity by entering the entity name, entity label, and selecting an owner for the entity, which by default is the user creating the entity. Clicking save then creates and declares this new entity. The blockchain administrator may additionally change the status to "deployed" and once saved, the entity will be transacted onto the blockchain, whereas in draft status, it will be retained only at the host organization's blockchain metadata definition manager 196.

According to a particular embodiment, every GUI has a corresponding API via which to interact with the blockchain metadata definition manager 196.

Figure 7E:
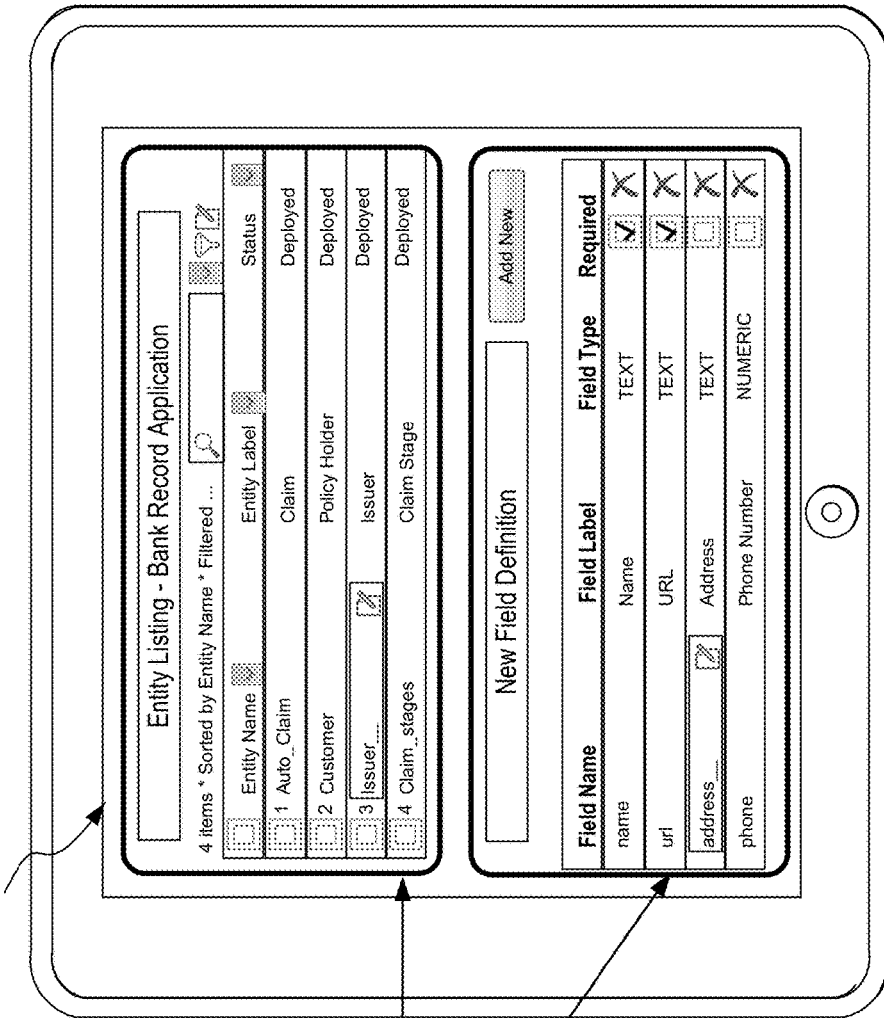
FIG. 7E depicts another exemplary architecture in accordance with described embodiments.

FIG. 7E depicts another exemplary architecture 705 in accordance with described embodiments.

Clicking on an existing entity, including the one just created at the prior GUI 710 as depicted at FIG. 7D, will result in the Field Definition GUI being presented, via which the blockchain administrator may now create any number of fields which are to be stored within that particular entity.

By way of analogy, it may be helpful to think of the declared application as a computer program, albeit one that runs via the cloud, and the declarative entities as tables comparable to tables in a relational database, and finally the declarative fields as column identifiers or populatable fields within a table, and lastly, the collection of fields would thus form a record. While the comparison is not exact, relationships between the various declarative elements and the metadata defined for them should help to illustrate their use.

Because the defined metadata specifies precisely what data is permissible, and the format and type of that data, any permitted application may then both successfully write information to the blockchain in a predictable and pre-defined format as specified by the metadata and additionally, applications with whom they are sharing may also successfully retrieve the information from the blockchain, knowing based on the defined metadata, how that information is supposed to look, and be structured, and thus how that information is to be interpreted.

Because the information is defined in blockchain via the metadata, all the participants know what each element of data means, based on the defined metadata, and therefore, for that network of participants, all participating nodes can share information via the blockchain.

Moreover, the participants are not restricted to the existing metadata transacted onto the blockchain, but they may create additional elements, create new metadata definitions, alter metadata definitions, etc.

For example, Bank Wells Fargo may decide that they, as a participant, require a new entity having fields X, Y, and Z. That participant may therefore define that metadata for the new entity (via the API or the GUI) having the fields X, Y, and Z, and then transact that new entity onto the blockchain.

The new entity will then be subjected to consensus by the other participating nodes. If the other participating nodes disagree, then consensus is not reached, and the change is negated. However, if consensus is reached, then the new entity having fields X, Y, and Z is transacted onto the blockchain by writing the defined metadata for that new entity onto the blockchain within a consensus block, or stated differently, the entity having already been written onto the blockchain, once consensus is attained, becomes a part of the "primary" chain on the blockchain which is accepted by all participants as the main chain.

According to another embodiment, smart contracts are executed for transactions on the blockchain which attempt to write or update data on the blockchain for an entity having defined metadata. For instance, there may be a trigger which causes the execution of the smart contract, in which case the smart contract retrieves or applies the defined metadata to validate that every field within the entity has a data type, data naming compliance, and a date mask which is in compliance with the requirements of the defined metadata.

Where the smart contract enforces the defined metadata, any transaction which fails compliance is either prohibited from being transacted onto the blockchain or if written to the blockchain, the transaction will never be accepted into a block on the main chain as the smart contract validation failure will prevent the transaction from reaching consensus for acceptance.

Thus, through the use of the described GUIs, it is possible for business users lacking programming and program development expertise to nevertheless declare a new application and declare new entity names as well as declaratively create new field definitions for those entity names. For those with greater technical expertise, they may utilize the APIs to interact with the blockchain metadata definition manager 196, if it is preferable for them to do so.

Regardless of the method chosen, the blockchain administrator can declaratively create a new application, new entities, and new field definitions, all without writing any code whatsoever, and the blockchain metadata definition manager 196 will then transact the defined metadata for the new application, the new entity, and/or the new field definitions onto the blockchain for voting and consensus.

Until consensus is reached, the defined metadata cannot be utilized. However, once transacted onto the blockchain and consensus is reached, then other participating nodes or participants on the blockchain can interact with all data for the declared application and the smart contract execution by the blockchain services interface 190 will force or mandate compliance with those interactions.

Figure 7F:
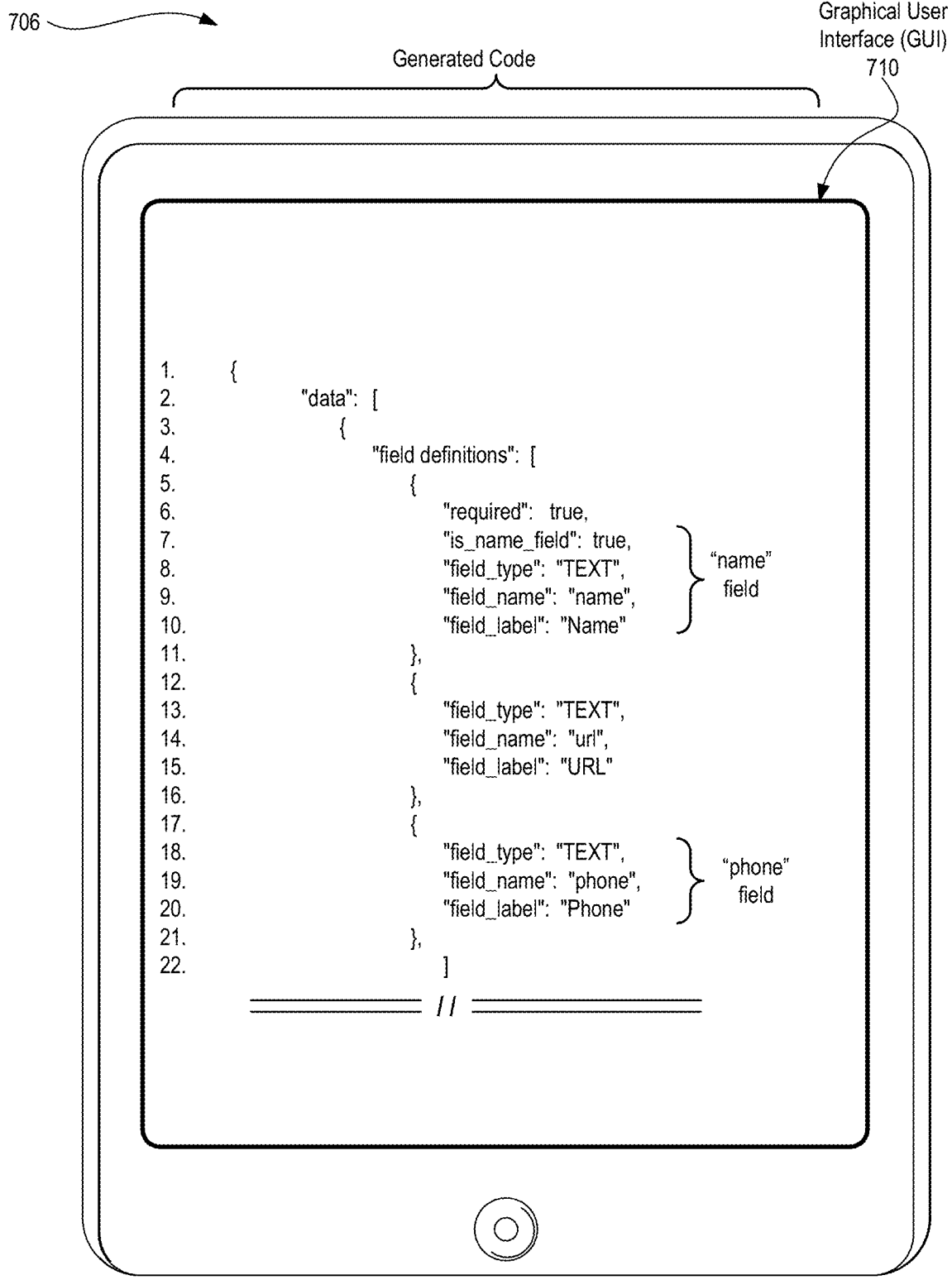
FIGS. 7F and 7G depict additional exemplary architectures in accordance with described embodiments.
Figure 7G:
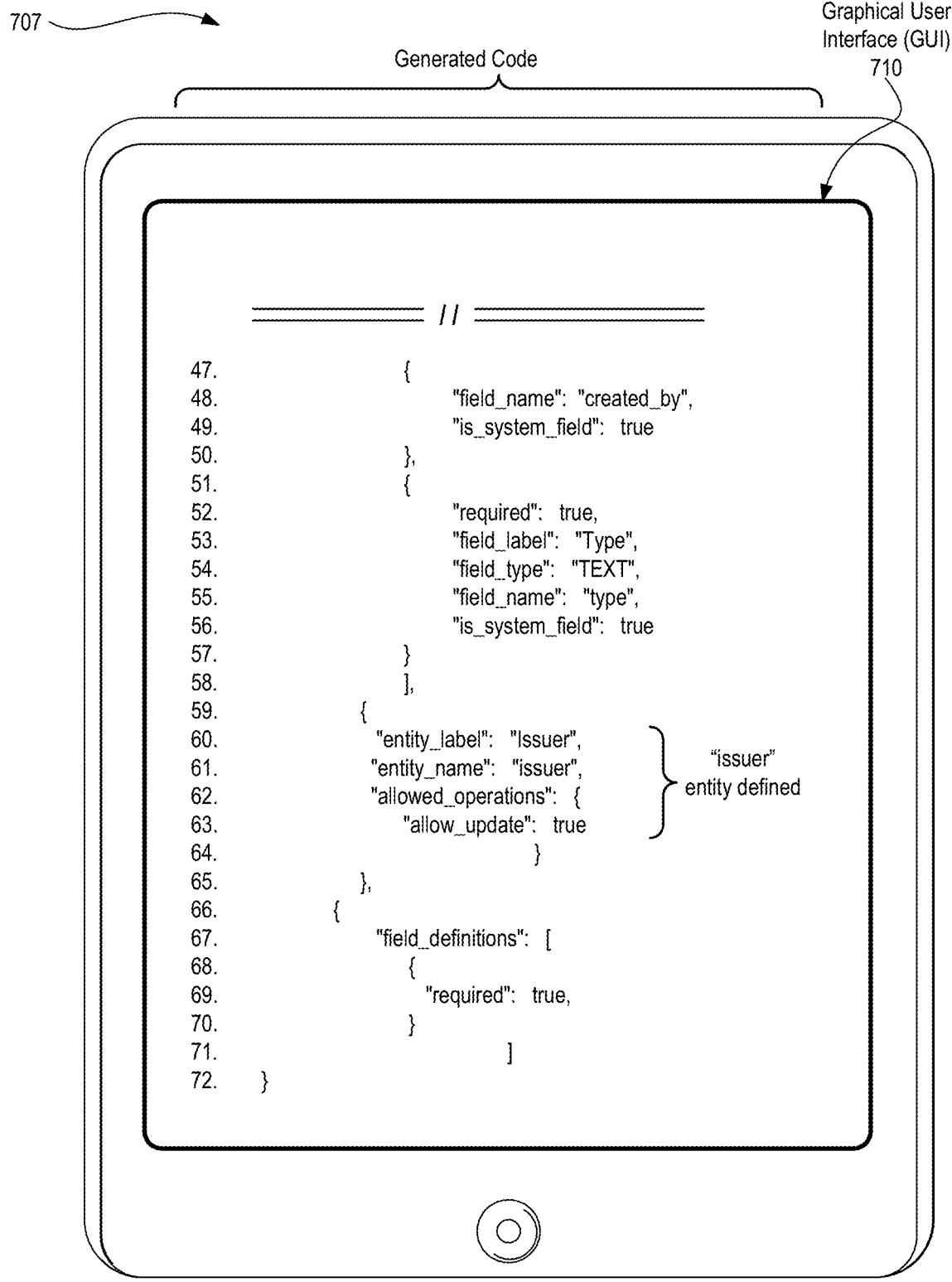

FIGS. 7F and 7G depict additional exemplary architectures 706 and 707 in accordance with described embodiments.

Depicted here is the generated code which is created on behalf of the blockchain administrator's declarative actions to define the application and declare the entity and declare the various defined fields, resulting in the API compliant code being represented within the defined metadata, despite no code having been written by the blockchain administrator. In other embodiments, a programmer or developer may elect to utilize the API to generate this code, in which case the GUIs will reflect the coded entities and the coded defined fields, just as if they had been declared via the GUIs originally.

Thus, the disclosed platform permits the creation of the necessary code to transact with the blockchain and to interact with the blockchain and to define and declare an application, and entities for that application (which may be depicted as tables within a database system via a materialized view as is discussed below), and to further define and declare new field definitions for each entity, and also define permissible network participants which may utilize the declared application.

In such a way, the declarative metadata platform performs all the heavy lifting on behalf of the blockchain administrator, allowing a non-programmer to create all the necessary code to interact with the blockchain for the newly declared application by using only point and click actions through a series of GUIs.

Moreover, the constructs of an application, and allowed network participants, and new declarative entities and new declarative field definitions are presented in a familiar manner to the blockchain administrator since the various elements may be thought of as database tables, columns, fields, and records, etc., despite the fact that database entries and database tables are not being created. Instead, the information is transacted onto the blockchain as an asset, while permitting the blockchain administrator to point and click their way through the entire process without any knowledge or requirement that the blockchain administrator understands how to transact to the underlying blockchain or how to add and update or transfer assets on a blockchain. Therefore, practice of the disclosed embodiments drastically reduces the complexity on the part of a non-programmer user operating as a blockchain administrator.

And yet, for more sophisticated users having programming knowledge and understanding of blockchain, the same code may be written and generated via the APIs exposed by the blockchain services interface 190 and specifically the blockchain metadata definition manager 196 provided by the host organization.

Figure 8:
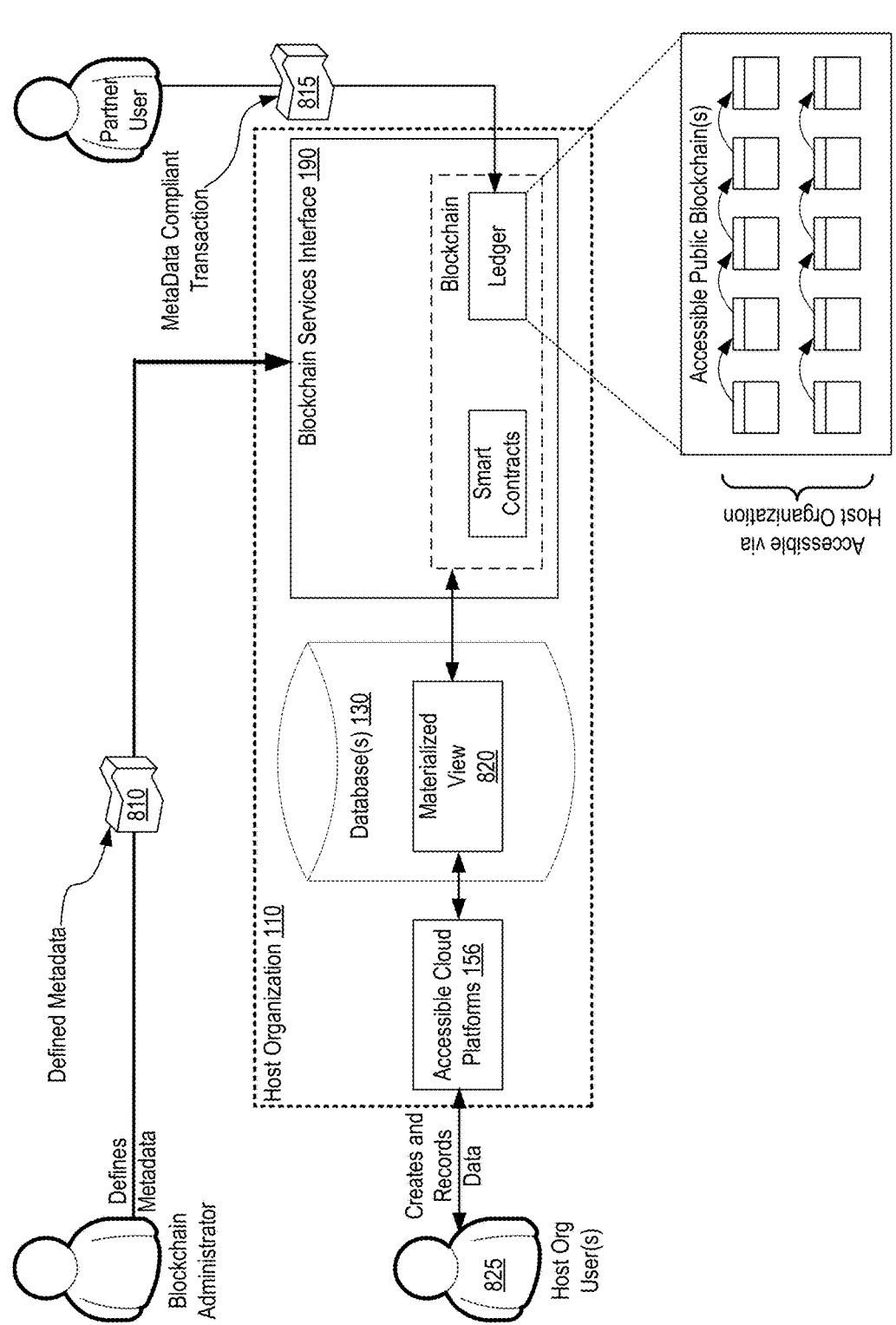
FIG. 8 depicts another exemplary architecture in accordance with described embodiments.

FIG. 8 depicts another exemplary architecture 801 in accordance with described embodiments.

As shown here, the blockchain administrator transacts the defined metadata 810 onto the blockchain, which presumably will be accepted once consensus is reached, and a partner user next transacts a metadata compliant transaction 815 onto the blockchain.

Further depicted here, is the materialized view 820 which permits a host organization user 825 to interact with the data transacted onto the blockchain via the metadata compliant transaction 815 from the accessible cloud platforms 156 available via the host organization 110.

In computing, a materialized view 820 is a database object that contains the results of a query. For example, the materialized view 820 may be a local copy of data located remotely, or may be a subset of the rows and/or columns of a table or join result, or may be a summary using an aggregate function.

The process of setting up a materialized view is sometimes called materialization. In a sense, data materialization is a form of caching the results of a query, similar to other forms of precomputation, in which database administrators leverage materialized views for performance reasons for purposes of optimization.

In any database management system following the relational model, a view is a virtual table representing the result of a database query. Whenever a query or an update addresses an ordinary view's virtual table, the DBMS converts these into queries or updates against the underlying base tables.

Conversely, a materialized view takes a different approach insomuch that the query result is cached as a concrete ("materialized") table that may be updated separately from the original base tables. Such an approach permits for more efficient access, at the cost of extra storage and of some data being potentially out-of-date. Materialized views find use especially in data warehousing scenarios, where frequent queries of the actual base tables can be expensive.

In the example depicted here, the accessible cloud platforms 156 generally utilize information stored within the databases 130 of the host organization 110, however, where certain information is transacted to the blockchain and thus persisted at the blockchain, the materialized view permits the accessible cloud platforms 156 to interact with data stored by the blockchain via the materialized view 820. In such a way, both the host organization user 825 and the accessible cloud platforms may interact with the blockchain data as if it were data stored within the databases 130 of the host organization simply by referencing the materialized view.

Thus, it is in accordance with certain embodiments that any time information is transacted to the blockchain, the smart contract triggers and executes a validation scheme for the data transacted onto the blockchain to ensure it is in compliance with the defined metadata 810 and the smart contract additionally generates the materialized view 820 so as to create a referenceable copy within the database 130 of the host organization 110, thus permitting the standard query interface of the host organization to reference the information within the materialized view, which in turn corresponds to the information transacted onto the blockchain.

Thus, any entity which is declared and created for the blockchain, and for which data is then written or transacted onto the blockchain, will automatically have an equivalent entity (e.g., a table in a relational database) created within the database of the host organization 110 within the materialized view, and as defined fields are created and accepted onto the blockchain, those corresponding columns will then be created within the host organization database system 130, and then when data is transacted onto the blockchain, that corresponding entity table within the database system 130 of the host organization will then be populated, within the materialized view, such that users and processes interacting with the data from the side of the host organization, may access the information from the materialized view.

Consequently, developers and users may interact with the declared application which utilizes data and defined metadata persisted to the blockchain without any knowledge that they are actually utilizing blockchain and without any requirement that such users have any knowledge of how to interact with the blockchain.

According to certain embodiments, a new table is not created within the databases 130 of the host organization and therefore, it is not necessary to synchronize any data between the databases 130 of the host organization and the blockchain. Rather, a channel, pipeline, or view of the data persisted by the blockchain external from the host is represented via the materialized view at the databases 130 of the host organization, but the materialized view, although being referenceable, is not a copy that is synchronized back to the blockchain and does not allow updates or modifications. The materialized view is only permissible for read-only referencing from the databases 130 of the host organization. All modifications, updates, changes, etc., must be transacted onto the blockchain, and a refreshed materialized view will then pull those changes from the blockchain and reflect those modifications at the database 130. While such an arrangement creates additional overhead, the arrangement expressly negates the need to synchronize data within the materialized view as such data is wholly non-authoritative.

Consequently, developers, programs, processes, and users may utilize standard SQL queries to interact with the blockchain data, by referencing the materialized view 820. For example, specifying SELECT from $Table_Name WHERE . . . when specifying the entity name as the table name for the materialized view 820 will result in a database query result being returned by the host organization's database 130, despite the fact that the authoritative copy of the data resides within the blockchain itself. While this structure does create some duplicative data, and thus arguably results in wasted storage, the structure has the benefit of greatly simplifying queries originating from any of the accessible cloud platforms 156 which may utilize standard SQL without having to identify the blockchain or construct more complex blockchain transactions to retrieve the data, as the replication of the data to the materialized view 820 is performed automatically by the smart contract triggers. According to such embodiments, SQL commands which update, create, or delete records are not permitted for execution against the materialized view, however, such SQL commands which update, create, or delete records will be accepted and translated to the apex translation engine and Apex code interface 1154 (shown at FIG. 11B) into native blockchain executable compliant code to perform the equivalent action of an SQL update, create, or delete command, but as a blockchain transaction which is then transacted against the blockchain, submitted for consensus, and then accepted onto the blockchain assuming voting or consensus is successful. Note also that a smart contract will execute to validate the transaction against the blockchain to enforce data compliance with the defined metadata persisted at the blockchain.

For example, an SQL query submitted from a host organization user may request an update for customer record John Doe for a specified application. Because such information is persisted at the blockchain, the SQL cannot be executed against the database systems 130 of the host organization. Moreover, the blockchain does not accept an SQL query which requests, "Please return all data for customer record John Doe." The information on the blockchain is not human readable and also does not permit this kind of query.

Consequently, the Apex code interface 1154 will translate the SQL code received into native blockchain code to transact updated payload data onto the blockchain for the customer record John Doe for the specified application. Note that when this occurs, the newest and latest information for customer record John Doe will now be reflected at the blockchain as the most up to date information and also at any materialized view of the same data, however, the old information for customer record John Doe remains within the blockchain as the blockchain records are immutable, thus creating an immutable audit trail which may be referenced at any time. Thus, any party with access rights to such data, can look back at prior blocks of the blockchain to determine what information was previously recorded for customer record John Doe, or in the case that customer record John Doe is deleted, such a change will be again reflected by the blockchain, but the old record itself remains immutably within the prior blocks of the blockchain, though the application will understand that such information is indicated as "deleted" and thus, the deleted record will not be referenced as live current data, but it always remains available, as per the inherent design of the DLT blockchain technology.

In alternative embodiments, the Apex code interface 454 (shown at FIG. 4B) is utilized to translate SQL database queries into a native blockchain protocol, permitting the translated SQL query to then be executed against the blockchain and generate a result set, which is then translated back into an SQL compliant format and returned responsive to the SQL queries. In yet other embodiments, a smart contract engine performs transactions against the blockchain to retrieve the defined entities and defined fields and translates those into the materialized view which is then stored within the host organization database system 130, subsequent to which non-translated SQL queries may be executed to retrieve the blockchain data directly from the materialized view.

Because the application itself is declarative, as are the declared entities and the declared defined fields for those entities, all data constructs are wholly customizable and may be tailored to the particular needs of the business, subject only to consensus on the blockchain by the network participants or the participating nodes which operate on that particular blockchain.

Figure 9:
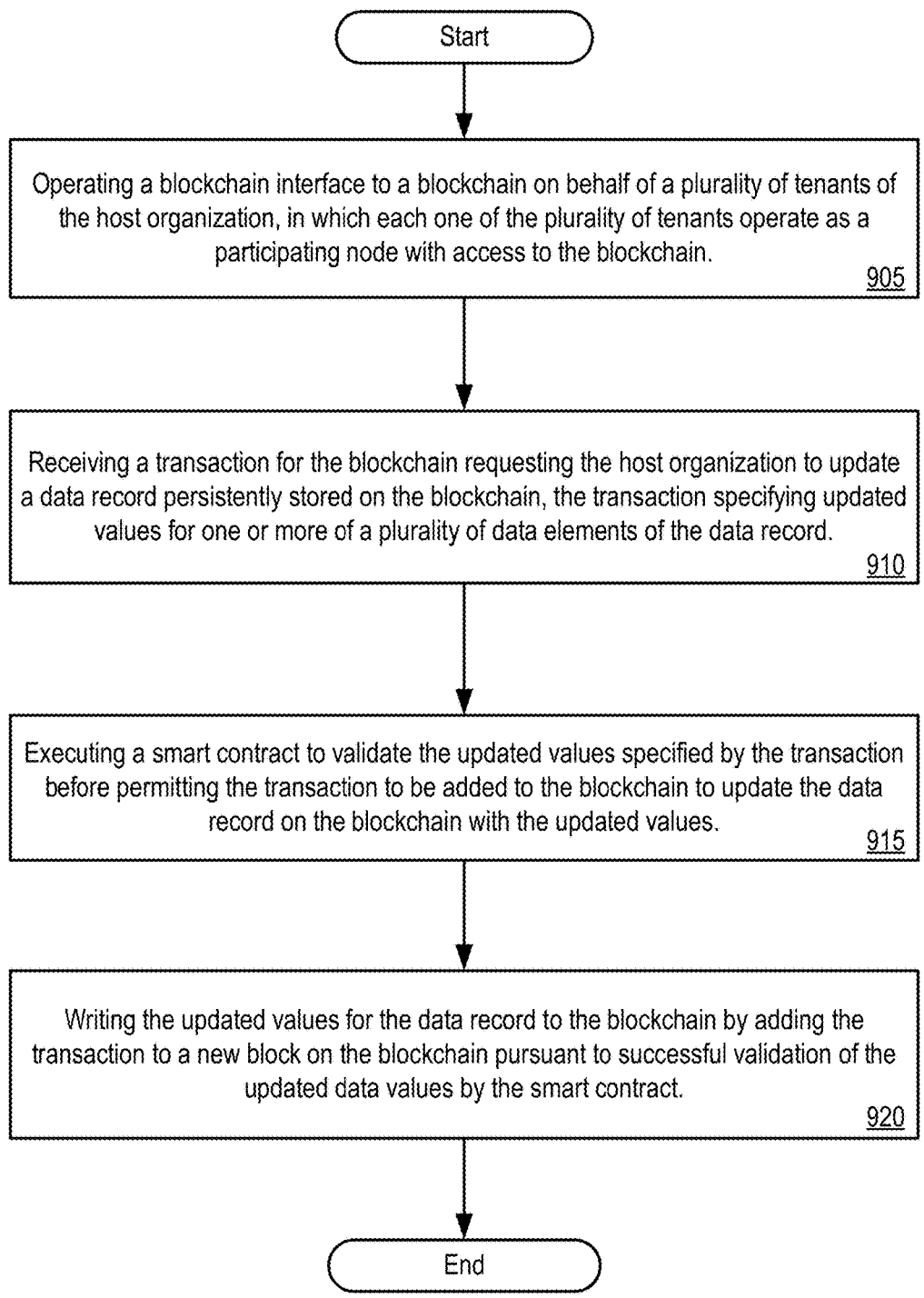
FIG. 9 depicts a flow diagram illustrating a method for implementing efficient storage and validation of data and metadata within a blockchain using Distributed Ledger Technology (DLT) in accordance with described embodiments.

FIG. 9 depicts a flow diagram illustrating a method 900 for implementing efficient storage and validation of data and metadata within a blockchain using Distributed Ledger Technology (DLT) in conjunction with a cloud based computing environment such as a database system implementation supported by a processor and a memory to execute such functionality to provide cloud based on-demand functionality to users, customers, and subscribers.

Method 900 may be performed by processing logic that may include hardware (e.g., circuitry, dedicated logic, programmable logic, microcode, etc.), software (e.g., instructions run on a processing device) to perform various operations such as operating, defining, declaring, associating, writing, receiving, retrieving, adding, transacting, training, distributing, processing, transmitting, analyzing, triggering, pushing, recommending, parsing, persisting, exposing, loading, generating, storing, maintaining, creating, returning, presenting, interfacing, communicating, querying, providing, determining, displaying, updating, sending, etc., in pursuance of the systems and methods as described herein. For example, the hosted computing environment 111, the blockchain services interface 950, and its database system 130 as depicted at FIG. 1, et seq., and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 900 depicted at FIG. 9, at block 905, processing logic operates a blockchain interface to a blockchain on behalf of a plurality of tenants of the host organization, in which each one of the plurality of tenants operate as a participating node with access to the blockchain.

At block 910, processing logic receives a transaction for the blockchain requesting the host organization to update a data record persistently stored on the blockchain, the transaction specifying updated values for one or more of a plurality of data elements of the data record.

At block 915, processing logic executes a smart contract to validate the updated values specified by the transaction before permitting the transaction to be added to the blockchain to update the data record on the blockchain with the updated values.

At block 920, processing logic writes the updated values for the data record to the blockchain by adding the transaction to a new block on the blockchain pursuant to successful validation of the updated data values by the smart contract.

FIG. 10 is a flowchart of one embodiment of a process for consensus on read. This process may be implemented by the block consensus manager 191 or similar component of the blockchain services interface 190. The consensus on read process can be triggered by a node 133 in the blockchain network seeking to access data in the blockchain to read that data where the data is protected by a permissions scheme or similar mechanism to control access to the data. This process is separate from the access control layer 162 in the blockchain services interface 190. If the data to be accessed is managed by a consensus on read process, then the consensus on read process must be satisfied to enable the requesting node to access the data from the blockchain which is protected by encryption. A request to read data in the blockchain can have any level of granularity where fields, records, metadata or similar data in the blockchain can be separately protected by the process.

The method 1000 begins with processing logic at block 1005 for operating a blockchain interface to a blockchain on behalf of a plurality of tenants of the host organization, wherein each one of the plurality of tenants operate as one of a plurality of participating nodes on the blockchain having access to the blockchain.

When the data is first stored in the blockchain that is to have restricted access for reads, the transaction is received by the blockchain service interface 190 (Block 1010). The blockchain consensus manager 191 determines whether the transaction is to be confirmed to the blockchain according to the consensus protocol of the blockchain network (block 1011). Where the transaction is to be committed, the blockchain consensus manager 191 generates a key to encrypt the data to be stored (Block 1012). The key is utilized to encrypt the data and the key will also be recovered and utilized to decrypt the data to access it. The key for encryption is transformed into a set of shared secrets (Block 1013). Any secret sharing process or protocol can be utilized (e.g., Shamir's secret sharing algorithm) that can transform the key into a set of shared secrets equal in number to the number of nodes that participate in consensus in the blockchain network (block 1014). Similarly, any secret sharing algorithm that has a desired threshold or configurable threshold can be selected to generate the shared secrets. Using such a shared secret algorithm ensures that the data can only be accessed where a threshold number of the shared secrets are provided by the other nodes in the blockchain network to reconstitute the key needed for decryption. The threshold can be fixed or configurable. The threshold can be any value, such as number equal to half or two-thirds of the number of participating nodes.

As each shared secret is generated by the secret sharing algorithm, the shared secret designated for a particular node in the blockchain network is encrypted using the public key of that node. Thus, only the associated node can decrypt the shared secret assigned to it and provide it in the case of a granted read request as part of the consensus on read process. These encrypted shared secrets are stored as metadata for the associated transaction data upon consensus for committing the transaction to the blockchain.

Subsequently, after the protected data is stored in the blockchain, then any node that seeks to service a request to access the protected data must initiate a read request that is broadcast to the other nodes of the blockchain network. This read request identifies the data to be accessed and may include information about the node or entity that is requesting to access the data (e.g., a set of credentials for the entity).

Each of the nodes then executes its consensus on read process and makes a determination whether the credentials or other criteria for accessing the requested data are met. Each node that determines that the criteria for reading the data are met, provides its shared secret to the requesting node. The requesting node can collect the shared secrets and determine whether a defined threshold number of the shared secrets have been provided. If the threshold number of shared secrets is not returned, then the consensus on read process denies the read request and it cannot be completed.

In some embodiments, the consensus on read process may enforce a time limit or window within which the process must receive the threshold number of shared secrets. If the threshold number of shared secrets are provided by the other nodes, then the requesting node can utilize the shared secret algorithm to transform the shared secrets into the key used to encrypt the requested data and then the requested data can be decrypted and accessed. After the data has been accessed then the requesting node can discard the key such that it will have to be requested and reformed again on subsequent accesses.

When the encrypted data from the initial transaction is stored in the blockchain, the associated metadata including the shared secrets for each node in the blockchain network is also stored in the blockchain. The metadata format can be defined and organized as detailed herein with relation to the other disclosed embodiments. The metadata can identify the shared secrets, owner of the transaction data, permissions or privileges for access control associated with the transaction data, privacy information related to the transaction data, ownership information for the transaction data and similar information. The metadata can define these attributes of the transaction on an object, record, field or similar component level consistent with the format of the transaction data. Owners of transaction data can be users, nodes or similar entities that operate on and utilize the blockchain network. Further embodiments for access control processes and right to forget processes are defined herein below that utilize this additional detailed meta data along with the principles of the consensus on read process.

According to one embodiment, method 1000 is performed by a system of a host organization for managing read access of data in a blockchain. According to such an embodiment, the system provides a blockchain interface to a blockchain on behalf of a plurality of tenants of the host organization, in which the processing of the method via the system includes at least: receiving a transaction to be stored to the blockchain via the blockchain interface; encrypting transaction data using a key generated by the blockchain interface; dividing the key into a set of shared secrets corresponding to each node in the blockchain network; receiving a request to access the transaction data by the blockchain interface; receiving at least one of the shared secrets from a node in the blockchain network indicating consensus; and decrypting the transaction data in response to receiving the at least one of the shared secrets.

According to another embodiment, method 1000 further includes: encrypting each shared secret in the set of shared secrets using a public key of the respective node.

According to another embodiment, method 1000 further includes: storing encrypted the at set of shared secrets in the blockchain as metadata for the transaction data upon consensus for the transaction.

According to another embodiment of method 1000, the transaction data is decrypted in response to receiving a threshold number of shared secrets.

According to another embodiment of method 1000, a decryption key is recovered from received shared secrets.

According to another embodiment, method 1000 further includes: denying access to the transaction data in response to a number of the received shared secrets being below a threshold for recovering the key for encryption.

According to a particular embodiment, there is a computing system of a host organization configured to perform a method for managing read access of data in a blockchain, the computer system providing a blockchain interface to a blockchain on behalf of a plurality of tenants of the host organization, the computing system including: a computer readable medium having stored therein the blockchain interface; and a processor coupled to the blockchain interface, the processor configured to execute the blockchain interface, the block chain interface to receive a transaction to be stored to the blockchain, to encrypt transaction data using a key generated by the blockchain interface, to divide the key into a set of shared secrets corresponding to each node in the blockchain network, to receive a request to access the transaction data, to receive at least one of the shared secrets from a node in the blockchain network indicating consensus, and to decrypt the transaction data in response to receiving the at least one of the shared secrets.

According to another embodiment, there is a computer-readable medium having stored therein a set of instructions, which when executed cause a computer system of a host organization to perform a set of operations of a method for managing read access of data in a blockchain, the computer system providing a blockchain interface to a blockchain on behalf of a plurality of tenants of the host organization, the set of operations including: receiving a transaction to be stored to the blockchain via the blockchain interface; encrypting transaction data using a key generated by the blockchain interface; dividing the key into a set of shared secrets corresponding to each node in the blockchain network; receiving a request to access the transaction data by the blockchain interface; receiving at least one of the shared secrets from a node in the blockchain network indicating consensus; and decrypting the transaction data in response to receiving the at least one of the shared secrets.

Figure 11A:
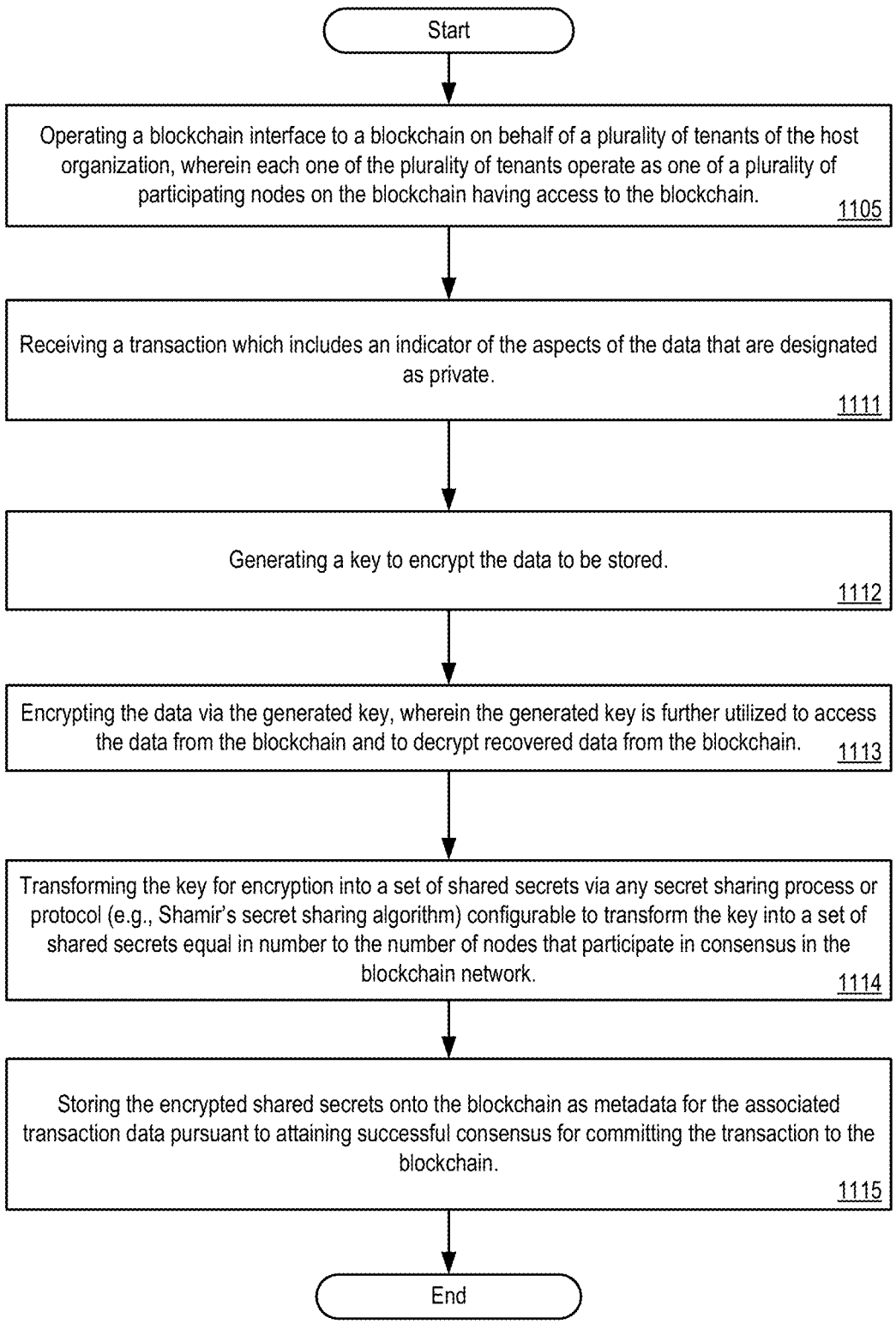

FIGS. 11A, 11B, and 11C depict flowcharts related to a set of processes for implementing a right to forget function within a blockchain service interface 190. The right to forget function utilizes aspects of the consensus on read process to enable an entity to designate data as private data and to have the blockchain 'forget' the data that is private upon request of the entity. This functionality can help enable a blockchain that implements the right to forget function to be compliant with GDPR. The flowcharts of FIGS. 11A-11C describe three related aspects of the right to forget process, namely, an initial store of private data also referred to as private information or PI information, a request for the data to be 'forgotten,' and an access request. These functions together provide the ability for a blockchain to 'forget' data by encrypting the private data and then deleting the encryption key upon request of the controlling entity to ensure the data cannot be accessed again, and thus the right to forget function is effectively able to designate data as 'forgotten' by the blockchain since it cannot be subsequently accessed even though the data is present in an encrypted form on the blockchain.

The General Data Protection Regulation (GDPR) is a regulation for data protection and privacy in the European Union (EU) and the European Economic Area (EEA). The GDPR also addresses the transfer of personal data outside the EU and EEA areas. The GDPR increases control by individuals over their personal data and simplifies the regulatory environment for international business by unifying the regulation within the EU.

With reference first to FIG. 11A, processing of the method 1100 begins with operating a blockchain interface to a blockchain on behalf of a plurality of tenants of the host organization, wherein each one of the plurality of tenants operate as one of a plurality of participating nodes on the blockchain having access to the blockchain (block 1105).

The specific processing for the right to forget process is initiated by a node receiving a transaction to be stored to the blockchain at a blockchain interface where the transaction includes a unique user identifier (UUID) for the entity that is associated with this data (Block 1111). In addition, the received transaction includes an indicator of the aspects of the data that are to be designated private. The entirety of the data or any aspect of the data at any level of granularity can be designated private, e.g., an object, record, field of the data and/or metadata. Upon the transaction being determined to be committed to the blockchain based on the consensus of the nodes in the blockchain, an object and metadata format for the transaction data are determined that is utilized to store the data on the blockchain where the object and metadata will include the owning entity UUID or similar identifier and a set of indicators to identify the object, record, field or similar component of the data that is designated as private.

The blockchain consensus manager 191 or permissions manager generates a key to encrypt the data to be stored (Block 1112). The key utilized to encrypt the data and will be utilized to decrypt the data to access it (Block 1113). The key is then transformed into a set of shared secrets (Block 1114). Any secret sharing process or protocol can be utilized (e.g., Shamir's secret sharing algorithm) that can transform the key into a set of shared secrets equal in number to the number of nodes that participate in consensus in the blockchain network. Similarly, a secret sharing algorithm that has a desired threshold or configurable threshold can be selected to generate the shared secrets. Using such a shared secret algorithm ensures that the data can only be accessed where a threshold number of the shared secrets are provided by the other nodes in the blockchain network to reconstitute the key needed for decryption. The threshold can be fixed or configurable. The threshold can be any value, such as number equal to half or two-thirds of the number of participating nodes.

As each shared secret is generated by the secret sharing algorithm, the shared secret designated for a particular node in the blockchain network is encrypted using the public key of that node. Thus, only the associated node can decrypt the shared secret assigned to it and provide it in the case of a granted read request as part of consensus on read. These encrypted shared secrets are stored as metadata for the associated transaction data upon consensus for committing the transaction to the blockchain (Block 1115).

FIG. 11B is a flowchart of the process for servicing a request to 'forget' private data in the blockchain network.

Processing of the method 1101 begins with operating a blockchain interface to a blockchain on behalf of a plurality of tenants of the host organization, wherein each one of the plurality of tenants operate as one of a plurality of participating nodes on the blockchain having access to the blockchain (block 1135).

The permissions manager 181 receives a request from an entity to forget specified data associated with a UUID (Block 1136). The permissions manager 181 or related component may authenticate the request to verify that sufficient credentials have been presented to ensure that the requestor is authorized to initiate a process to forget the identified data (Block 1137). A requestor may optionally present a security token, password, encryption key and/or similar credentials to verify authorization, in which the resented token, password, encryption key and/or similar credentials are received by the permissions manager 181 at the host organization to effectuate the authentication request (Block 1138). If authenticated, then the request is processed to add the UUID and/or an identifier for the data to be forgotten (Block 1139). The process can be configured to 'forget' all data associated with an UUID, or a specific object, record or field identified by the request. The UUID and any data identification information can then be recorded to a list of 'forgotten' items (Block 1140) If there are any keys or shared secrets specific to the UUID or identified information associated with the UUID, then the node can delete this local information (Block 1140). In addition, the node can also broadcast or similarly synchronize the list of forgotten UUIDs and/or information with other nodes in the blockchain (Block 1141).

FIG. 11C is a flowchart of the process for servicing a request to access 'forgotten' private data in the blockchain network.

Processing of the method 1102 begins with operating a blockchain interface to a blockchain on behalf of a plurality of tenants of the host organization, wherein each one of the plurality of tenants operate as one of a plurality of participating nodes on the blockchain having access to the blockchain (block 1150).

After the private data is stored in the blockchain, any node that seeks to service a request to access the protected data (Block 1151) makes an initial check of the UUID of the requestor and/or identification information of the requested data against the forgotten UUID/data list (Block 1152). If the UUID or requested data is listed as 'forgotten' then the request to access this data is denied (Block 1153).

Conversely, if the UUID or the requested data is not found on the list, then the permission manager 181 must initiate a read request that is broadcast to the other nodes of the blockchain network and identifies the data to be accessed and includes information about the node or entity that is requesting to access the data (i.e., the UUID and possibly a set of credentials for the entity) (Block 1154). Each of the nodes then executes its consensus process for private information and makes a determination whether the credentials or other criteria for accessing the requested data are met (Block 1155). Each node that determines that the criteria for reading the data are met, provides its shared secret to the requesting node (Block 1156). The requesting node then can collect the shared secrets and determine whether a defined threshold number of the shared secrets have been provided. If the threshold number of shared secrets is not returned, then the consensus process denies the read request and it cannot be completed.

In some embodiments, the consensus process can have a time limit or window within which the process must receive the threshold number of shared secrets. If the threshold number of shared secrets are provided by the other nodes, then the requesting node can utilize the shared secret algorithm to transform the shared secrets into the key and then the requested data can be decrypted and accessed. After the data has been accessed then the requesting node can discard the key such that it will have to be requested and reformed again on subsequent accesses.

According to disclosed embodiments, private information (PI information) may be stored directly in the blockchain or in a distributed storage. A node that seeks to add PI information to the blockchain can interact with the REST API to create/update the PI information. Metadata associated with the PI information, i.e., the PI metadata is defined via the Metadata API of the blockchain platform. In turn, the REST API manages the creation of the key for a record with the PI information and the storage of the PIN information in the blockchain or in the distributed storage. Non PI data and a hash of the PI data can be stored in the blockchain via the REST API. The metadata can be stored in the blockchain via the Metadata API as separate metadata and/or as part of a consent and GDPR model.

In the distributed storage case, the hash of the PI data is stored in the blockchain while the actual PI data is stored off the blockchain. Deleting the PI information at the off-chain storage location leaves only a hash of the PI information in the blockchain. The hash is a one-way function and cannot be used to retrieve the PI information when deleted. In some cases, the hash can be stored with ciphertext to further protect it.

According to another embodiment, the methods 1100, 1101, and 1102 are performed by a system of a host organization for providing a right to forget data in a blockchain. According to such embodiments, such a system performs processing providing a blockchain interface to a blockchain on behalf of a plurality of tenants of the host organization each serving as nodes in a blockchain network, the method including: receiving a request including an identifier of a requestor, the request to access transaction data designated as private; requesting access to the transaction data from nodes in the blockchain network including the identifier of the requestor; receiving at least one shared secret from a node in the blockchain network indicating consensus to access the transaction data by the requestor; and denying access to the transaction data in response to receiving insufficient shared secrets from the nodes indicating the transaction data is permanently unavailable to access.

According to another embodiment of methods 1100, 1101, and 1102, the processing performed by the system further includes: determining whether the identifier of the requestor is on a forgotten list before requesting access to the transaction data.

According to another embodiment of methods 1100, 1101, and 1102, the processing performed by the system further includes: receiving a request to forget data associated with a unique user identifier; and adding the unique user identifier to a forgotten list.

According to another embodiment of methods 1100, 1101, and 1102: the transaction data is decrypted in response to receiving a threshold number of shared secrets.

According to another embodiment of methods 1100, 1101, and 1102: a decryption key is recovered from received shared secrets.

According to another embodiment of methods 1100, 1101, and 1102: denying access to the transaction data is in response to a number of received shared secrets being below a threshold for recovering a key for encryption.

According to another embodiment of methods 1100, 1101, and 1102, the processing performed by the system further includes: defining object and metadata for the transaction data to be stored in the blockchain including identification of private information for objects and fields.

According to a particular embodiment, there is a computing system of a host organization configured to perform a method for providing a right to forget data in a blockchain, the computer system providing a blockchain interface to a blockchain on behalf of a plurality of tenants of the host organization each serving as nodes in a blockchain network, the computer system including: a computer readable medium having stored therein the blockchain interface and a permissions manager; and a processor coupled to the blockchain interface, the processor configured to execute the blockchain interface and the permissions manager, the permissions manager to receive a request including an identifier of a requestor, the request to access transaction data designated as private, to request access to the transaction data from nodes in the blockchain network including the identifier of the requestor, to receive at least one shared secret from a node in the blockchain network indicating consensus to access the transaction data by the requestor, and to deny access to the transaction data in response to receiving insufficient shared secrets from the nodes indicating the transaction data is permanently unavailable to access.

According to yet another embodiment, there is a computer-readable medium having stored therein a set of instructions, which when executed cause a computer system of a host organization to perform a set of operations of a method for managing read access of data in a blockchain, the computer system providing a blockchain interface to a blockchain on behalf of a plurality of tenants of the host organization, the set of operations including: receiving a request including an identifier of a requestor, the request to access transaction data designated as private; requesting access to the transaction data from nodes in the blockchain network including the identifier of the requestor; receiving at least one shared secret from a node in the blockchain network indicating consensus to access the transaction data by the requestor; and denying access to the transaction data in response to receiving insufficient shared secrets from the nodes indicating the transaction data is permanently unavailable to access.

FIGS. 12A, 12B, and 12C depict flowcharts related to a set of processes for implementing an access control function within a blockchain service interface 190. The access control functions utilize aspects of the read on consensus process to enable an entity to designate access controls for data to enable read and write permission for the blockchain. The flowcharts of FIGS. 12A, 12B, and 12C describe three related aspects of access controls, namely, an initial store of data with a set of permissions, a request for writing to the data, and a read request for the data. These functions together provide the ability for a blockchain to implement access controls for data by encrypting the data and then controlling writes to the data using smart contracts while controlling reads of the data using consensus on read. These access control functions are applicable to both permissioned (i.e., private) and public blockchains and are separate from the access control layers associated with permissioned blockchains.

With reference first to FIG. 12A, processing of the method 1200 begins with operating a blockchain interface to a blockchain on behalf of a plurality of tenants of the host organization, wherein each one of the plurality of tenants operate as one of a plurality of participating nodes on the blockchain having access to the blockchain (block 1205).

Next, the access controls process continues with a node receiving a transaction to be stored to the blockchain at a blockchain interface where the transaction includes a unique user identifier (UUID) for the entity that is associated with this data along with an indication of the ownerships and access privileges (i.e., permissions) for the data (Block 1211). In addition, the received transaction includes an indicator of the aspects of the data that are to have defined permissions. The entirety of the data or any aspect of the data at any level of granularity can have defined permissions, e.g., an object, record, field of the data and/or metadata. Upon the transaction being determined to be committed to the blockchain based on the consensus of the nodes in the blockchain (Block 1212), an object and metadata format for the transaction data are determined that is utilized to store the data on the blockchain where the object and metadata will include the owning entity UUID or similar identifier and a set of permissions to identify the object, record, field or similar component of the data that is designated as private (Block 1213).

The blockchain consensus manager 191 or permissions manager 181 generates a key to encrypt the data to be stored (Block 1214). The key utilized to encrypt the data and that will also be utilized to decrypt the data to access it, is then transformed into a set of shared secrets (Block 1214). Any secret sharing process or protocol can be utilized (e.g., Shamir's secret sharing algorithm) that can transform the key into a set of share secrets equal in number to the number of designated owner nodes in the blockchain network (Block 1215). Similarly, a secret sharing algorithm that has a desired threshold or configurable threshold can be selected to generate the shared secrets. Using such a shared secret algorithm ensures that the data can only be accessed where a threshold number of the shared secrets are provided by the owner nodes in the blockchain network to reconstitute the key needed for decryption.

As each shared secret is generated by the secret sharing algorithm, the shared secret designated for a particular owner node in the blockchain network is encrypted using the public key of that node. Thus, only the associated node can decrypt the shared secret assigned to it and provide it in the case of a granted read request as part of consensus on read. These encrypted shared secrets are stored as metadata for the associated transaction data upon consensus for committing the transaction to the blockchain along with the access privileges for the data (Block 1216).

FIG. 12B is a flowchart of the process for servicing a request to write data in the blockchain network.

With reference to FIG. 12B, processing of the method 1201 begins with operating a blockchain interface to a blockchain on behalf of a plurality of tenants of the host organization, wherein each one of the plurality of tenants operate as one of a plurality of participating nodes on the blockchain having access to the blockchain (block 1225).

The permissions manager 181 receives a request from an entity to write specified data associated with a UUID and access control privileges (Block 1226). The permissions manager 181 or related component may authenticate the request to verify that sufficient credentials have been presented to ensure that the requestor is authorized to initiate a write process to change the identified data (Block 1227). For example, a requestor may present a security token, password, encryption key and/or similar credentials to verify authorization. If authenticated, then the request is processed to determine or to identify either a smart contract tied to the UUID or to identify or determine an identifier for the data to written to the blockchain (Block 1228). A smart contract can set forth and manage the process for data to be added to the blockchain that serves as a write of the data such that the data added to the blockchain serves to replace prior data in the blockchain though that data itself cannot be modified. The smart contract for a UUID or data associated with an UUID, or a specific object, record or field identified by the request is looked up in the blockchain and the metadata associated with the data to be written is examined to determine if the privileges allow for writes. If the metadata and governing smart contract do not permit a write (block 1229) of the data by the requestor then the process denies the write and the associated transaction is not committed or the portion related to the specific data managed by the access controls is not committed. Conversely, if the smart contract and the privileges associated with the identified data and the UUID of the requestor do permit a write, then the transaction and/or the portion of the data in the transaction identified to be written can be committed to the blockchain (Block 1230) and will reference the data that is written to such that it will function to replace it.

FIG. 12C is a flowchart of the process for servicing a request to read data with access control privileges in the blockchain network.

With reference to FIG. 12C, processing of the method 1202 begins with operating a blockchain interface to a blockchain on behalf of a plurality of tenants of the host organization, wherein each one of the plurality of tenants operate as one of a plurality of participating nodes on the blockchain having access to the blockchain (block 1235).

After the access controlled data is stored in the blockchain, any node that seeks to service a request to access the data makes an initial check of the permissions for the requestor and/or identification information of the requested data to examine the permissions in the associated metadata (Block 1236). If the permissions indicate that the requestor does not have permission, then the request to access this data is denied (Block 1237). If the UUID and the metadata of the requested data does not prohibit access, then the permission manager 181 must initiate a read request that is broadcast to the other nodes (Block 1238) indicated as owners of the data in the blockchain network and identifies the data to be accessed and includes information about the node or entity that is requesting to access the data (i.e., the UUID and possibly a set of credentials for the entity). Each of the nodes then executes its consensus process for access controlled data and makes a determination whether the credentials or other criteria for accessing the requested data are met (Block 1239). Each node that determines that the criteria for reading the data are met, provides its shared secret to the requesting node. The requesting node then can collect the shared secrets and determine whether a defined threshold number of the shared secrets have been provided (Block 1240). If the threshold number of shared secrets is not returned, then the consensus process denies the read request and it cannot be completed. In some embodiments, the consensus process can have a time limit or window within which the process must receive the threshold number of shared secrets. If the threshold number of shared secrets are provided by the other nodes, then the requesting node can utilize the shared secret algorithm to transform the shared secrets into the key and then the requested data can be decrypted and accessed. The threshold can be fixed or configurable. The threshold can be any value, such as number equal to half or two-thirds of the number of participating nodes. After the data has been accessed then the requesting node can discard the key such that it will have to be requested and reformed again on subsequent accesses.

In the context of a distributed enterprise platform, both role based and attribute based control can be implemented. Role based control defines the access rights of a user and the attribute based control extends access rights to attributes such as properties of a resource, entities and the execution environment. The access controls can be divided into entity level and record level access in combination with blockchain. The entity level access is similar to a object or field level control that allows a set of defined users or partners to access an entity in a blockchain as well as associated fields. A record level access can be similar to sharing settings in other platforms that allow access to the record based on permission defined by the record owner.

In this example use case, the access controls (which are also referred to as "permissions") are definable and configurable in relation to participants, records, record policies, and record authorization. A participant in this use case is represented with participant metadata in the blockchain, which can be a defined set of users or entities that have ownership or access privileges over specified data in the blockchain. A record in this context can be a metadata entity that contains the identifier for an entity that extends the record (e.g., a customer entity includes an identifier for a record entity. Participants are associated in this example with the record entity. Access is defined at the record level to manage entity access.

In such a use case, a record policy can be a junction object that keeps the record and participant access policy. Access levels can be defined with two types, a permission level (e.g., read, write, and read/write) and a consensus level (e.g., where there are multiple owners) such as one or majority. A record authorization can track transactions about individual authorization by each record owner in relation to the record policy.

For example, access control may be described in relation to an access request from a third party (i.e., a non owner). For sake of the example, a third party may be a college requesting to review transcripts of a student (i.e., the owner) from another institution (e.g., a high school) that manages the transcripts using the blockchain as described herein. The process starts with the third part (college) asking to access the transcripts. An access request handler queries the blockchain to determine permission for access. If access is already granted, then a verification can be returned.

Where access has not yet been granted, then the access request handler can send access requests to the owners. When all of the owners (or a majority) approve the access, then the policy/permissions for the transcripts are updated in the blockchain. The access request of the third party can then be accepted to grant access to the requested record (e.g., the transcripts) in the blockchain. If access is not approved by the owners, then the access is blocked.

According to another embodiment, the methods 1200, 1201, and 1202 are performed by a system of a host organization for providing access controls for data a blockchain, the system providing a blockchain interface to a blockchain on behalf of a plurality of tenants of the host organization each serving as nodes in a blockchain network, the method including: receiving a request including an identifier of a requestor, the request to access transaction data having defined privileges; requesting access to the transaction data from nodes in the blockchain network, a request for access including the identifier of the requestor; receiving at least one shared secret from an owner node in the blockchain network indicating consensus to access the transaction data by the requestor; and denying access to the transaction data in response to receiving insufficient shared secrets from the nodes indicating the requestor does not meet requirements of the defined privileges of the transaction data.

According to another embodiment of methods 1200, 1201, and 1202, the processing performed by the system further includes: determining whether the identifier of the requestor has read access privileges before requesting access to the transaction data.

According to another embodiment of methods 1200, 1201, and 1202, the processing performed by the system further includes: receiving request to write data associated with the transaction data; and determining whether the request to write is permitted by the privileges of the transaction data by a smart contract.

According to another embodiment of methods 1200, 1201, and 1202, the transaction data is decrypted in response to receiving a threshold number of shared secrets.

According to another embodiment of methods 1200, 1201, and 1202, a decryption key is recovered from received shared secrets.

According to another embodiment of methods 1200, 1201, and 1202, denying access to the transaction data is in response to a number of received shared secrets being below a threshold for recovering a key for encryption.

According to another embodiment of methods 1200, 1201, and 1202, the processing performed by the system further includes: defining object and metadata for the transaction data to be stored in the blockchain including identification of access privileges for objects and fields.

According to a particular embodiment, there is a computing system of a host organization configured to perform a method for providing a right to forget data in a blockchain, the computer system providing a blockchain interface to a blockchain on behalf of a plurality of tenants of the host organization each serving as nodes in a blockchain network, the computer system including: a computer readable medium having stored therein the blockchain interface and a permissions manager; and a processor coupled to the blockchain interface, the processor configured to execute the blockchain interface and the permissions manager, the permissions manager to receive a request including an identifier of a requestor, the request to access transaction data having defined privileges, to request access to the transaction data from nodes in the blockchain network, a request for access including the identifier of the requestor, to receive at least one shared secret from an owner node in the blockchain network indicating consensus to access the transaction data by the requestor, and to deny access to the transaction data in response to receiving insufficient shared secrets from the nodes indicating the requestor does not meet requirements of the defined privileges of the transaction data.

According to yet another embodiment, there is a computer-readable medium having stored therein a set of instructions, which when executed cause a computer system of a host organization to perform a set of operations of a method for managing read access of data in a blockchain, the computer system providing a blockchain interface to a blockchain on behalf of a plurality of tenants of the host organization, the set of operations including: receiving a request including an identifier of a requestor, the request to access transaction data having defined privileges; requesting access to the transaction data from nodes in the blockchain network, a request for access including the identifier of the requestor; receiving at least one shared secret from an owner node in the blockchain network indicating consensus to access the transaction data by the requestor; and denying access to the transaction data in response to receiving insufficient shared secrets from the nodes indicating the requestor does not meet requirements of the defined privileges of the transaction data.

Figure 13:
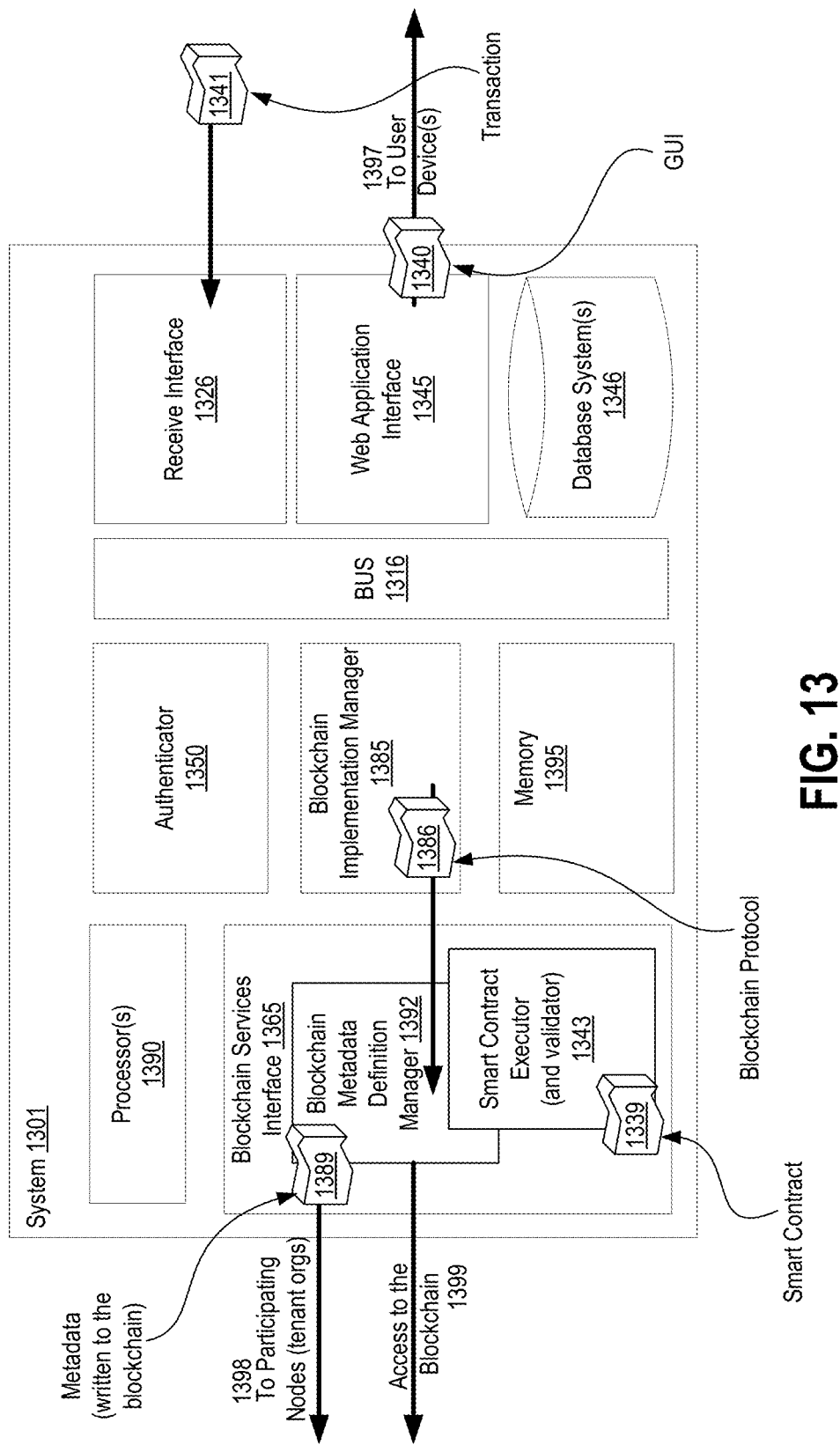
FIG. 13 shows a diagrammatic representation of a system within which embodiments may operate, be installed, integrated, or configured in accordance with described embodiments.

FIG. 13 shows a diagrammatic representation of a system 1301 within which embodiments may operate, be installed, integrated, or configured. In accordance with one embodiment, there is a system 1301 having at least a processor 1390 and a memory 1395 therein to execute implementing application code for the methodologies as described herein. Such a system 1301 may communicatively interface with and cooperatively execute with the benefit of a hosted computing environment, such as a host organization, a multi-tenant environment, an on-demand service provider, a cloud based service provider, a client-server environment, etc.

According to the depicted embodiment, system 1301, which may operate within a host organization, includes the processor 1390 and the memory 1395 to execute instructions at the system 1301. According to such an embodiment, the processor 1390 is to execute a blockchain services interface 1365 on behalf of on behalf of a plurality of tenants 1398 of the host organization, in which each one of the plurality of tenants 1398 operate as a participating node with access to the blockchain 1399. Internal to the blockchain services interface 1365, there is depicted the blockchain metadata definition manager 1392, depicted here as writing metadata onto the blockchain via its access to the blockchain 1399 as provided by the blockchain services interface 1365.

A receive interface 1326 of the system 1301 is to receive a transaction 1341 for the blockchain requesting the host organization to update a data record persistently stored on the blockchain, in which the transaction specifies updated values for one or more of a plurality of data elements of the data record. Such a system further includes a smart contract 1339 executable via the processor 1390 and the smart contract executor and validator 1343 via which to validate the updated values specified by the transaction 1341 before permitting the transaction to be added to the blockchain to update the data record on the blockchain with the updated values. A blockchain services interface 1365 is further provided via which to the system 1301 is to write the updated values for the data record to the blockchain by adding the transaction 1341 to a new block on the blockchain pursuant to successful validation of the updated data values by the smart contract 1339.

A blockchain protocol 1386 for the blockchain defines a group of functions for the blockchain (e.g., as provided by the blockchain implementation manager 1385), in which the group of base functions are accessible to any participating node 1398 of the blockchain. The system 1301 may further persist metadata 1389 onto the blockchain; in which the receive interface 1326 is to further receive a transaction 1341 requesting such metadata 1389 to be stored on the blockchain, sometimes for use with validating updated values of a received transaction 1341. According to such a system 1301, the blockchain services interface 1365 is further to add the transaction 1341 to a new block on the blockchain pursuant to successful validation by the smart contract 1339.

According to such an embodiment of the system 1301, the receive interface 1326 may pass the transaction data contents of the transaction 1341 to be stored within in index persisted by the database system(s) 1346.

According to such an embodiment of the system 1301, a GUI 1340 may be pushed to the user devices 1397 via which the user devices or admin computing devices may interact with the blockchain metadata definition manager 1392.

According to another embodiment of the system 1301, the blockchain services interface 1365 is to interact with and provide access to the blockchain 1399.

According to another embodiment of the system 1301, the receive interface 1326 communicates with a user client device 1397 remote from the system and communicatively links the user device with the system via a public Internet. According to such an embodiment, the system operates at a host organization as a cloud based service provider to the user device 1399; in which the cloud based service provider hosts a receive interface 1326 exposed to the user client device via the public Internet, and further in which the receive interface (or web application interface 1345) receives inputs from the user device as a request for services from the cloud based service provider.

Bus 1316 interfaces the various components of the system 1301 amongst each other, with any other peripheral(s) of the system 1301, and with external components such as external network elements, other machines, client devices, cloud computing services, etc. Communications may further include communicating with external devices via a network interface over a LAN, WAN, or the public Internet while the authenticator 1350 authenticates user devices and users seeking to access data from the host organization exposed by the system 1301.

Figure 14A:
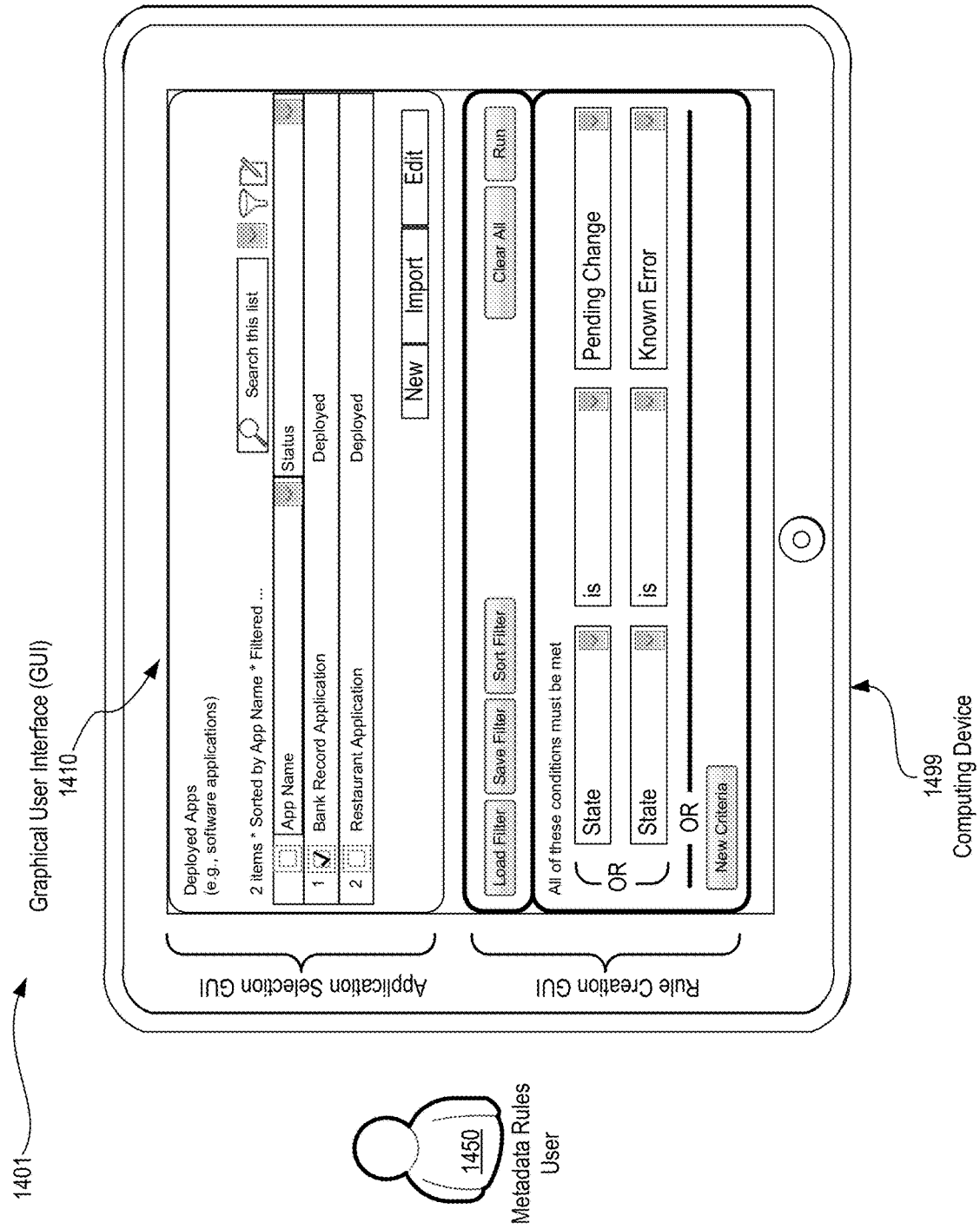
FIG. 14A depicts another exemplary architecture in accordance with described embodiments.

FIG. 14A depicts another exemplary architecture 1401 in accordance with described embodiments.

In particular, there is now depicted a metadata rules user 1450 utilizing the computing device 1499 and specifically utilizing the graphical user interface (GUI) 1410 to configure metadata rules to be applied to transactions occurring on the blockchain.

As shown here, there is an application selection GUI via which the metadata rules user 1450 may first select one or more applications to which a new metadata rule is to be applied, and then at the bottom, there is a rule creation GUI via which the metadata rules user 1450 may create a new rule to be deployed to the blockchain.

As shown here, the Rule Creation GUI provides the metadata rules user 1450 with a condition builder interface, via which the user may select through the GUI, states which must be present, and an operator, such as "is" or "not" or "includes" or "does not include" or "is equal to" or "is greater than" or "is less than" and so forth, and then the descriptor, such as "pending change" for a rule that is to be applied when the "State is pending change" or when the "state is known error," or some other new criteria to be added.

The GUI additionally permits the user to load existing filters or rules already declared and available via the system or to save the newly created rule or filter, or to sort, etc. Further still, the "Run" capability, which is discussed in greater detail below, permits the metadata rules user 1450 to simulate execution of the newly defined rule without actually transacting anything onto the blockchain and without pushing the newly created rule to the blockchain for consensus and acceptance.

Notably, the Application Selection GUI permits the metadata rules user 1450 to create rules which are to be applied to transactions associated with a particular application, such as the "bank record application" which is depicted as having been selected here within the application selection GUI. However, it is also permissible to have metadata rules applied to specific transactions on the blockchain or to all transactions on the blockchain.

FIG. 14B depicts another exemplary architecture 1402 in accordance with described embodiments.

There is again depicted the metadata rules user 1450 utilizing the computing device 1499 and specifically utilizing the graphical user interface (GUI) 1410 to configure metadata rules to be applied to transactions occurring on the blockchain.

Whereas the prior GUI permitted the metadata rules user to apply newly defined rules or apply previously created rules to transactions associated with a particular application previously declared, the transaction selection GUI depicted here permits the metadata rules user 1450 to apply rules specifically to transactions of a given type or to all transactions on the blockchain, regardless of type, and regardless of whether such transactions happen to be associated with any declared application.

As shown here, there are various permissible configurations for newly defined metadata rules or for available previously defined metadata rules. For example, the metadata rules user 1450 may apply a new or existing rule to "All transactions—Pre Execution" in which case the rule is, as described, executed for every transaction which arrives on the blockchain prior to executing the transaction itself. Such pre-execution rules may be utilized for any defined criteria and conditions, but are ideally suited for validation procedures, such as validating that alphanumeric characters are not entered into a numeric field, or that a date entered into a date field corresponds to a valid date format, or complies with certain restrictions, such as within a permissible number of days, or represents a date which is not in the future or not in the past, and so forth. Additional validation schemes to occur prior to execution of a received transaction at the blockchain may include, for example, a validation that an account holder has sufficient funds available for a requested funds transfer. For example, if a user wants to transfer 1 bitcoin value or some other unit of value to another user, a pre-execution rule may check to validate that the user or account holder has possession of the funds equal to or greater than the amount of funds to be transferred.

Additionally permissible are post execution metadata rules for all transactions. Such rules may be utilized to take some action after a transaction occurs on the blockchain, such as triggering a notification or issuing a confirmation to a transaction requestor, or pushing transaction data to a log or to an analytics engine or to an AI engine, etc. Many possibilities exist, but the rule creation and application to a post-execution transaction means that the rule will be applied to every transaction on the blockchain after execution of the transaction or alternatively, based on the rule's conditions and criteria, to every transaction on the blockchain which matches the defined criteria and conditions, after execution of the transaction on the blockchain.

There is further permissible the application of defined metadata rules to any transaction having a particular transaction type (for pre or post transaction execution) or for any transaction having a particular transaction type and which meets certain defined criteria and conditions in accordance with the defined rule as set forth by the rule creation GUI. For example, there is depicted here that the metadata rules user 1450 has selected the "Loan Approval Transaction Type," for application of a particular rule, which as depicted by the GUI, happens to have already been defined and deployed to the blockchain for pre-execution. The deployed state indicates that consensus has already been reached for this existing metadata rule, whereas any newly defined rule would require consensus to be reached before the status would indicate a "deployed" state.

Ultimately, the GUIs will consume the entered data provided by the metadata rules user 1450 and auto-generate applicable code. For example, the exemplary code depicted here may be output by the GUI and transacted onto the blockchain for consensus and then execution against the matching transactions:

```
# COMMENT:      current_inventory < 5
# COMMENT:                OR
# COMMENT:      (current_month = "December"
# COMMENT:                AND
# COMMENT:         current_inventory < 20)
{
  "rules":
    [{
        "name" : "inventory_rule",
        "criteria": { "any":
                    [
                        { "name": "inventory",
                          "operator": "less_than",
                          "value": 5,
                        },
                    ]},
        "actions":
                    [
                        { "name": "order_more",
                          "params":{"number_to_order": 40},
                        },
                    ]
    }]
}
```

Thus, as depicted here, the GUIs output appropriate syntax, which according to this example, will be applied to transactions for which the "current inventory" is less than 5 or in situations in which the "current month" is December and for which the "current inventory" is less than 20, presumably because there is a spike in demand for the month of December, and so the metadata rules creator has indicated that such rules are to be applied anytime inventory falls below five or in the special situation of December when inventory falls below twenty.

Such syntax may then be processed through the Apex translation engine to transform the blockchain platform agnostic syntax into a native blockchain syntax for the targeted blockchain to which the rule is to be applied and executed via smart contracts on that respective blockchain, as was described previously with regard to, for example, FIGS. 4A and 4B with issuance (deployment) of metadata to the blockchain and retrieval thereof being depicted at FIG. 4C.

The code the follows the syntax then implements the necessary rule via smart contract execution. Notably, the code is created by the GUI interface on behalf of the metadata rules user 1450, thus greatly simplifying the configuration and creation of such rules.

One of the biggest problems for business users seeking to leverage the capabilities of Blockchain technology is the creation and programming of business rules for smart contracts execution.

Problematically, each of the different blockchain platforms have different smart contract requirements for executing such business rules, resulting in different syntaxes, different permissible conditions and criteria and different mechanisms by which to deploy any created rules to the respective blockchain.

Consequently, any validation schemes and workflows to execute such business rules are written via smart contracts which are then deployed to the respective blockchain, and because of the differing syntaxes, such rules must be manually written by programmers and developers specifically for a particular blockchain to which such rules are to be applied and utilized.

It is therefore in accordance with the described embodiments that metadata rules users, blockchain administrators, and programmers utilizing the metadata driven blockchain platform may create metadata driven business rules which are then executed via the same smart contracts on the respective blockchain platforms, but without necessitating the metadata rules users, blockchain administrators, and programmers create different rules syntax for every different platform.

Therefore, it is permissible for blockchain administrators and metadata rule users to define a business rule within their own cloud environment utilizing GUIs provided by the host organization's which then generates the necessary syntax and metadata defining such rules which is then stored in Blockchain as metadata as well as, according to certain embodiments, being converted into a native blockchain smart contract execution format.

As software systems utilizing blockchain grow in complexity and usage, it becomes burdensome to business users if every change to the logic and/or behavior of the system breaks previously configured smart contracts and business rules, thus requiring the business users to write and deploy new code, which is a significant problem with decentralized networks given that the business user is often not in a position to dictate how and when the blockchain platform they are using is updated or modified.

Therefore, use of the metadata driven business rules engine in blockchain provides such business users with a simple interface, allowing anyone to capture new rules and logic defining the behavior of a system, including non-programmers through the use of the GUIs. Such rules, represented by the metadata written to the blockchain, may then be executed by the blockchain via smart contract execution. When changes to the behavior of the blockchain platform occur, the metadata does not need to be re-written or re-coded, rather, the metadata stored on the blockchain is simply read and executed in accordance with the new behavior of the blockchain platform, as the defined metadata rules is agnostic in terms of such changes to the underlying blockchain platform. However, in certain situations, the host organizations Blockchain Metadata Definition Manager 196 may need to trigger a re-conversion of the defined metadata rules into native smart contract executable code for the blockchain in question, but such events may be automated and do not require any specific action on the part of the business user and certainly do not require the business user to re-write their business rules or the associated code to implement such rules. In other embodiments, the metadata, having been written to the blockchain, may simply be re-read by the smart contract execution engine and interpreted and executed appropriately at the blockchain's back-end processor, without any action by the host organization or the business user, depending upon the capabilities of the particular blockchain platform for which the business rules have been applied.

According to a particular embodiment, a blockchain administrator may define marketing logic and business rules for a specific declared application (DApp), such as one selected via the Application Selection GUI at FIG. 14A. For example, blockchain administrator or other metadata rules user having appropriate permissions may then define conditions specifying when certain customers or items are eligible for a discount based on the transaction in blockchain. The conditions may be specified for certain customers, or certain items, or other criteria, such as inventory levels, date ranges, or whatever business logic is appropriate of the needs of the business's objectives.

Normally, the creation of such business rules requires specialized syntax to be developed by a programmer for execution via a blockchain platform's smart contract execution engine, with such syntax being different for different blockchain platforms. However, in the event that the metadata rules user or blockchain administrator utilizes the Blockchain Metadata Definition Manager 196 provided by the host organization's suite of blockchain services, then the blockchain administrator need only define the rule via the GUIs, associating them with particular declared applications or specific types of transactions (or all transactions), and then, once the submitted rule is approved by the blockchain network's consensus mechanism, the defined rule will be executed automatically by host organization's blockchain services interface and associated smart contract execution and management engines.

FIG. 14C depicts another exemplary architecture 1403 in accordance with described embodiments.

As shown here, there is also permissible entry of the metadata rules via an Application Programming Interface (API) 1411 via the metadata rules user in the event that a metadata rules programmer 1451 or developer wishes to create the rule syntax manually or in the event that another application is utilized to push the appropriate syntax to the metadata rules creation engine, which may permissibly be accomplished via the metadata rules API to the same effect as if the metadata rules user configures such rules via the GUIs.

Regardless of how such metadata rules are written, be it via the GUIs provided or the API interface, the defined rules may be utilized to enforce validation requirements for data entry and input submitted to an application or to trigger various execution flows, such as discounting merchandise for certain customers or based on certain inventory levels as noted above.

Once defined, the metadata rules written to the blockchain are executed at the blockchain network level using the blockchain's smart contract execution engine where available or executed via the host organization's smart contract execution engine when such capabilities are not available via the blockchain platform.

Utilizing such metadata rules driven smart contracts, exemplary validations may include, for example, prohibiting entry of incorrect data (e.g., telephone numbers with incorrect numbers of digits or malformed email addresses, etc.) or the entry of improper type data, such as entering alpha characters into a numeric only field, etc.

However, very often, the rules are not validation specific, but represent more complex business rules to be defined via the blockchain metadata definition manager 196. For instance, as noted above in the inventory application example, there may be various actions to be taken based on inventory levels being too high or inventory levels being diminished, etc. Such metadata rules may be utilized therefore for the management of stock levels across multiple partners, each of which may have their own local inventor, but for which the rules are applied based on an aggregate inventory, etc.

Prior solutions required that programmers and developers cod the rules into a native blockchain executable format for smart contract execution and the process was complex, error prone, and simply not available to novice or non-programmer business users, who are the very individuals most likely to craft and define such rules. This arrangement therefore adds cost and complexity on the part of businesses wishing to utilize the blockchain technology and leverage the capabilities of smart contract execution, as it was necessary to pay a highly skilled developer to code the rules into the engine, while not addressing the problem of the high potential for error.

Because the metadata rules are defined and written to the blockchain utilizing a blockchain agnostic format, it is possible for the same metadata rule to be created once and then applied to multiple different blockchain platforms. Moreover, because the UI allows the user to create the full syntax (either via the GUIs or the API), it is further possible of the GUI condition builder to specify conditions specific to the needs of the business developer or program such conditions through the API.

Further still, regardless of whether the GUI or the API is utilized, the defined metadata rules are restricted to the creation of permissible entities, field definitions, and field types for an associated application or for an associated transaction because the metadata driven blockchain platform will not allow the creation of a rule or condition which violates the defined metadata for a declared application or a declared entity or its dependent field definitions and field types.

In such a way, creation of metadata rules is restricted to only those conditions, criteria, transactions and declared applications for which the blockchain administrator or metadata rules user has permissions to interact with and for which such defined business rules is in compliance with the metadata for the associated declared application (DApp), entity, etc.

By restricting the definition of the metadata rules to only permissible entries in compliance with previously defined metadata definitions for existing applications, entities, transaction types, etc., it is therefore further possible to significantly reduce the possibility for security holes, logic errors, or other malformed business rules which may occur if the code for such rules were to be written free form, without being restricted to such metadata definitions or to the permissible criteria on the condition builder GUIs.

According to yet another embodiment, once the metadata rules code is output from the GUI or accepted by the API, it is then processed and traversed through a metadata governance model, prior to the metadata rules code being submitted to the blockchain.

Processing the code through the governance model then presents to metadata rules user or the blockchain administrator creating the metadata rules information on how the created code will affect blockchain transactions and assets, thus permitting the user to see on the fly within a simulated or sandbox environment, how the rule will perform when executed for a blockchain transaction. For example, the governance model and rule simulation may mimic or simulate certain values to show what the rule will create when executed on the blockchain and how data, assets, and transaction execution will be affected on the blockchain.

According to another embodiment, once the code is created and processed through the governance model, the user may then submit the code to partners on the blockchain platform (e.g., submitting the code to other blockchain participating nodes) for evaluation and consensus prior metadata rules and code defining such rules being accepted onto the blockchain.

According to such an embodiment, the partners and any participating node onto the blockchain may apply the same governance model and also simulate execution of the created metadata rule to observe how the rule will affect data, assets, and transactions for the blockchain, without actually executing anything on the blockchain itself.

Based on the simulated execution, the partners and participating nodes may then vote for consensus or vote to reject the rule, etc., so as to determine whether or not the defined metadata rule will be accepted onto the blockchain.

According to a particular embodiment, the code and syntax for the rule is created in a JSON compatible format, but then later, when written onto the blockchain after consensus, is translated into Web Assembly Language, and thus takes on a safer binary format with cryptographic properties of a contract that cannot be changed by anyone once deployed onto the blockchain. Stated differently, all of the participating nodes can see the deployed and accepted code in its Web Assembly Language format, but they cannot change it, without again proceeding throughout the entire creation/editing of the rule, validation against metadata definitions, subjection to governance, and submitted again for consensus and then acceptance onto the blockchain.

WebAssembly (often shortened to Wasm or WASM) is a standard that defines a binary format and a corresponding assembly-like text format for executables used by web pages. The purpose of Wasm is to enable the JavaScript engine of a web browser to execute page scripts nearly as fast as native machine code. While not a full replacement for JavaScript, Wasm provides improved execution for performance-critical portions of page scripts and runs in the same sandbox as regular script code.

Representation of WebAssembly code or Wasm code is intended to be run on a portable abstract structured stack machine designed to be faster than parsing JavaScript, as well as faster to execute and amenable to extremely compact code representation.

Once accepted to the blockchain, the smart contract is then triggered and executed based on transaction type or based on all transactions or based on whatever defined criteria and conditions were defined and accepted.

According to such embodiments, execution of the smart contract is performed by multiple nodes on the blockchain or by all nodes on the blockchain, and output is then compared by multiple blockchain nodes to ensure that the output from concurrent executions is identical, so as to prevent tampering or any spoofing attempt or submission of malicious or fraudulent smart contract execution output as authentic.

Assuming the output is identical for multiple participating nodes having executed the smart contract, then consensus will be met and the results or output of the smart contract execution will be accepted onto the blockchain.

As noted above, there are permitted both pre and post transaction execution constructs, in which pre execution is typically preferred for validation of data prior to even attempting to execute a transaction received at the blockchain and in which post execution is utilized to evaluate whether or not an event or transaction occurs in a particular way, then to take some action via the smart contract after execution of the transaction.

The metadata rules are considered to be metadata driven and declarative on the fly because the rules may be created utilizing a condition builder and simulated to test how the transaction or rule execution will look in a sandbox environment. In such a way, partners and other participating nodes on a blockchain are put at ease because they too can review the rule via the GUI rather than having to pay a programmer or developer to review 1000s of lines of code in a costly, time consuming, and burdensome process, which thus in turn drastically improves security by limiting the conditions and values that can be coded into a smart contact from the GUI and the API to that which is compatible with the defined metadata for a declared application or its associated entities or entities and field definitions for a particular transaction, etc.

Moreover, because the code is converted into a WebAssembly (WASM) format and represented as a binary, it is safe from tampering and malicious actors.

According to yet additional embodiments, conditions specified via a metadata rule may further be limited according to whether a transaction on the blockchain is by an "owner" of a declared application or a "party" of a declared application (DApp). For example, an owner of the application may have enhanced rights to, for example, modify a record transacted onto the blockchain whereas an authorized network participant for the declared application may be merely a "party" for the application and may thus have permissions to create new records and submit additional information for records as well as read records, but perhaps they lack authority to modify or alter certain records, thus permitting a permissions enforcement mechanism for data on the blockchain in which the metadata rules will define a rule requiring that, for example, a transaction seeking to change an existing record must first "validate" in a pre-transaction execution smart contract that the transaction submitter is an "owner" for the application rather than merely a "party" for the application. Many other variations of permission enforcement are possible. Further still, such a rule could be utilized to trigger a notification when a "party" but not "owner" submits a record change transaction, with the defined metadata a rule then defining whether or not that transaction is processed or rejected.

FIG. 15 depicts a flow diagram illustrating a method 1500 for implementing consensus on read via a consensus on write smart contract trigger for a Distributed Ledger Technology (DLT) platform in conjunction with a cloud based computing environment such as a database system implementation supported by a processor and a memory to execute such functionality to provide cloud based on-demand functionality to users, customers, and subscribers.

Method 1500 may be performed by processing logic that may include hardware (e.g., circuitry, dedicated logic, programmable logic, microcode, etc.), software (e.g., instructions run on a processing device) to perform various operations such as operating, defining, declaring, associating, writing, receiving, retrieving, adding, transacting, training, distributing, processing, transmitting, analyzing, triggering, pushing, recommending, parsing, persisting, exposing, loading, generating, storing, maintaining, creating, returning, presenting, interfacing, communicating, querying, providing, determining, displaying, updating, sending, etc., in pursuance of the systems and methods as described herein. For example, the hosted computing environment 111, the blockchain services interface 1550, and its database system 130 as depicted at FIG. 1, et seq., and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 1500 depicted at FIG. 15, at block 1505, processing logic operates a blockchain interface to a blockchain on behalf of a plurality of customers of the host organization, in which each of the plurality of customers operate as a participating node on the blockchain.

Processing logic at block 1510 receives a read request for data stored on the blockchain from a user authenticated with the host organization.

Processing logic at block 1515 issues a write transaction to the blockchain specifying both (i) the user and (ii) the read request, in which the write transaction automatically triggers execution of a smart contract to enforce access controls for the user (see block 1520).

Processing logic at block 1525 attains consensus from the participating nodes of the blockchain for the write transaction at the blockchain pursuant to the access controls for the user being validated by the smart contract as allowing the user to read the data identified by the read request, in which the write transaction is added to the blockchain with an indication the user has permission to read the data identified by the read request.

Processing logic at block 1525 retrieves the data from the blockchain identified by the read request.

Processing logic at block 1535 throws an event indicating the user has permission to read the data identified by the read request and returning as part of the thrown event, the data retrieved from the blockchain.

Processing logic at block 1540 returns the data retrieved from the blockchain to the user in fulfillment of the read request.

One of the biggest challenges in the blockchain space is that most of the blockchains platforms have open access to read for all nodes once they join the blockchain network as a participating node. Most of the blockchains platforms support smart contracts on writes via their implementing protocols, however, it is sometimes necessary to define access controls and ensure that they are enforced on the blockchain, even for read transactions.

Access controls Access control and the use of an Access Control List (ACL) is sometimes of critical importance for enterprises that guards or otherwise places policy restrictions on the entities and fields on Blockchain data.

In the case of the Salesforce Blockchain Platform, because it is metadata-driven, the data is classified as metadata as well as data based on data. Consequently, it is necessary to ensure that the data is secured both for reads and writes.

It is therefore in accordance with certain embodiments that write smart contracts (e.g., smart contracts which are triggered for execution based on a write transaction arriving at the blockchain) be utilized for reading data from the blockchain and further that the write consensus mechanism be made applicable and utilized for reads from the blockchain so as to extend support for read access controls even to those blockchains that do not support smart contracts on read.

According to certain embodiments, all read access requests are treated as writes to the ledger (e.g., to the blockchain). In other words, a smart contract is written which will be invoked when a write transaction arrives at the blockchain specifying data to be read or retrieved from the blockchain. For example, for data that needs to be fetched, the smart contract will post a transaction to blockchain indicating, for example "User ID xyz is requesting to read data." This information will be subjected to consensus and then written to a new block added to the blockchain.

The smart contract specially written to be triggered for this write transaction will then check for visibility rules for access controls or any other validation which is prescribed to occur, based on metadata definitions previously written to the blockchain defining, for example access controls or an ACL, as well as any other validation logic or routines.

Once consensus is reached among the participating nodes for posting the write transaction indicating that the user is requesting to read data, the smart contract will then verify that the user has the correct read permissions based on the metadata defined access controls. The smart contract may then throw an event directly, or write another transaction to the blockchain, indicating the user has permission to read the data and providing the data requested, as part of the thrown event or the newly written transaction.

The host organization may subscribe to the corresponding event on the blockchain and utilize an event listener to monitor for status and progress or may alternatively poll periodically to determine if the transaction is posted in blockchain.

Once it is determined that the user is allowed to read the data and the event has been thrown or the transaction has been written, then the smart contract or the host organizations' event listener will retrieve the requested data from the blockchain and return the data in fulfillment of the read request from the user.

According to another embodiment, method 1500 further includes: registering an event listener of the host organization with the blockchain; catching the thrown event at the event listener; extracting the data retrieved from the blockchain from the thrown event; and in which returning the data retrieved from the blockchain to the user includes the event listener returning the data retrieved to the user as extracted from the thrown event.

According to another embodiment, method 1500 further includes: periodically polling the blockchain to determine whether consensus has been attained for the write transaction indicating the user has permission to read the data identified by the read request; in which retrieving the data from the blockchain identified by the read request includes retrieving the data responsive to the periodic polling of the blockchain determining that consensus has been attained for the write transaction; and in which returning the data retrieved from the blockchain to the user in fulfillment of the read request is performed responsive to determining that consensus has been attained for the write transaction.

According to another embodiment, method 1500 further includes: receiving a second read request for other data stored on the blockchain from the user authenticated with the host organization; issuing a second write transaction to the blockchain specifying both (i) the user and (ii) the read second read request; in which the second write transaction automatically triggers execution of the smart contract to enforce the access controls for the user; and in which consensus fails for the second write transaction.

According to another embodiment of method 1500, the second write transaction is prevented from being written to the blockchain; and in which executing the smart contract throws a second event indicating the user lacks permission to read the other data identified by the read request.

According to another embodiment of method 1500, throwing the event includes the smart contract executing on the blockchain throwing the event indicating either a denial of the read request based on the user lacking permission to read the data or an approval of the read request based the user having permission to read the data identified by the read request pursuant to access controls.

According to another embodiment, method 1500 further includes: executing a second smart contract on the blockchain; in which the second smart contract reads the write transaction having previously been added to the blockchain with the indication the user has permission to read the data identified by the read request; and in which the second smart contract executing on the blockchain throws the event indicating the user has permission to read the data identified by the read request and returning as part of the thrown event, the data retrieved from the blockchain.

According to another embodiment of method 1500, an event listener executing at the host organization subscribes to write events on the blockchain; in which the event listener receives a notification from the blockchain upon consensus being attained for the write transaction and the write transaction having been successfully added to the blockchain with the indication that the user has permission to read the data identified by the read request from the blockchain; and in which throwing the event includes the event listener throwing the event indicating the user has permission to read the data identified by the read request and returning as part of the thrown event, the data retrieved from the blockchain.

According to another embodiment of method 1500, the blockchain provides access controls for write transactions to the blockchain; and in which the blockchain does not provide access controls for read transactions from the blockchain.

According to another embodiment of method 1500, an implementing protocol for the blockchain provides consensus on write; in which any write transaction on the blockchain is subjected to consensus by the participating nodes on the blockchain; and in which the implementing protocol for the blockchain does not require consensus for reads from the blockchain.

According to another embodiment, method 1500 further includes: associating the smart contract with a transaction type corresponding to the write transaction for the blockchain; in which the smart contract implements a consensus on read validation scheme triggered by the write transaction matching the transaction type associated with the smart contract; in which the smart contract reads metadata from the blockchain defining the access controls for the user enforces the access controls for read requests arriving at the blockchain via write transactions to the blockchain.

According to another embodiment, method 1500 further includes: receiving input from a GUI defining access controls for one or more users of the host organization; generating metadata representing the defined access controls; and transacting the metadata representing the defined access controls onto the blockchain; and in which the smart contract reads the metadata representing the defined access controls from the blockchain at run-time to enforce the access controls for the user's read request.

According to a particular embodiment, there is a non-transitory computer readable storage medium having instructions stored thereon that, when executed by a system of a host organization having at least a processor and a memory therein, the instructions cause the system to perform the following operations: operating a blockchain interface to a blockchain on behalf of a plurality of customers of the host organization, in which each of the plurality of customers operate as a participating node on the blockchain; receiving a read request for data stored on the blockchain from a user authenticated with the host organization; issuing a write transaction to the blockchain specifying both (i) the user and (ii) the read request; in which the write transaction automatically triggers execution of a smart contract to enforce access controls for the user; attaining consensus from the participating nodes of the blockchain for the write transaction at the blockchain pursuant to the access controls for the user being validated by the smart contract as allowing the user to read the data identified by the read request, in which the write transaction is added to the blockchain with an indication the user has permission to read the data identified by the read request; retrieving the data from the blockchain identified by the read request; throwing an event indicating the user has permission to read the data identified by the read request and returning as part of the thrown event, the data retrieved from the blockchain; and returning the data retrieved from the blockchain to the user in fulfillment of the read request.

According to yet another embodiment, there is a system to execute at a host organization, in which the system includes: a memory to store instructions; a processor to execute instructions; in which the system is configurable to execute the instructions via the processor to carry out operations including: operating a blockchain interface to a blockchain on behalf of a plurality of customers of the host organization, in which each of the plurality of customers operate as a participating node on the blockchain; receiving a read request for data stored on the blockchain from a user authenticated with the host organization; issuing a write transaction to the blockchain specifying both (i) the user and (ii) the read request; in which the write transaction automatically triggers execution of a smart contract to enforce access controls for the user; attaining consensus from the participating nodes of the blockchain for the write transaction at the blockchain pursuant to the access controls for the user being validated by the smart contract as allowing the user to read the data identified by the read request, in which the write transaction is added to the blockchain with an indication the user has permission to read the data identified by the read request; retrieving the data from the blockchain identified by the read request; throwing an event indicating the user has permission to read the data identified by the read request and returning as part of the thrown event, the data retrieved from the blockchain; and returning the data retrieved from the blockchain to the user in fulfillment of the read request.

According to certain embodiments, rules, permissions, etc. are inferred from the access control objects written onto the blockchain and enforced at run-time via a smart contract which executes at the blockchain.

While access control models are well known, it was not previously possible to enforce access control rules and policies via the blockchain. However, through practice of the disclosed embodiments, it is now possible to define such policies and permissions via the above described metadata platform, with such access control objects being written to the blockchain and then enforce the access permissions through the use of a smart contract executing at runtime and infer the applicable rules from the access control objects already written to the blockchain based on the access control objects themselves as well as the additional context of the participant ID (e.g., user) that is requesting access to automatically allow or deny access to the requested information from the blockchain.

Conversely, the way that blockchains operate presently it is required that every access control permission, rule, policy, etc., be tailor made and specifically constructed via a custom coded smart contract, through a process which is not only technically complex and labor intensive, but is also error-prone. For example, for a rule that says student, John, may access his transcript and grades but not the grades of other students, it was necessary with conventionally implemented blockchains to create a smart contract that explicitly defined the rule for the public key associated with the user John. As many more users are accommodated and as the rules become increasingly complex, there becomes a larger number of smart contracts required to enforce such rules and the smart contracts themselves become extremely complex, to the point where they are potentially unwieldy and very difficult if not impossible to maintain, as there literally must be a coded entry for every single user or participant. Such problems, in practicality, often prevent organizations from migrating data to a blockchain platform given the above complexities, instead utilizing well known and established access control mechanism for their non-distributed monolithic data stores.

Stated differently, there is no presently known mechanism by which to store and execute access control rules and policies from the blockchain.

However, by tying together the dynamic access control system together with the blockchain platform, it is possible for a generic smart contract to infer the information needed from the access control objects already written onto the blockchain based on the contextual knowledge determined from what user is making the access request and the metadata already written to the blockchain defining the various access control objects needed to understand and control any access request to the blockchain.

Because the access control objects are stored utilizing the metadata platform a single agnostic smart contract may be utilized for different customer organizations as the smart contract only needs to know to go and retrieve the access control objects upon receipt of a blockchain transaction requesting access to any blockchain entity object. In such a way, all access control permissions may be resolved dynamically at runtime and such policies, rules, permissions, etc., may be updated at anytime through the updating of the access control objects without needing to update or change the smart contract or the underlying blockchain platform's configuration.

Once metadata is represented on the blockchain via access control objects a smart contract provided with the blockchain platform will execute and will retrieve the appropriate access control objects to infer the applicable rules for the user associated with a particular read request. The smart contract will then determine dynamically at run-time any applicable criteria and then enforce the access control rules and policies applicable to that user based on the metadata within the access control objects previously written to the blockchain.

The smart contract which enforces the access controls is wholly agnostic as to what user, organization, criteria, or rules are applicable for any given access request. Rather, the smart contract is coded in such a way that it knows to refer to the access control objects from which it may then be determined at run time, what rules or permissions are to be enforced. In such a way, those access control objects may be updated, modified, added to, etc., without any programmatic or coding change to the smart contract responsible for inferring such rules and enforcing the rules.

Stated differently, the generic smart contract will already be present on the blockchain ready to execute for any data access request, and my utilize consensus mechanisms such as, for example, consensus on read via a consensus on write smart contract trigger, as described herein.

Regardless of the consensus mechanism, the smart contract will retrieve the metadata from the access control objects to infer the rules and based on the known user which is determined from the originator of the access request (e.g., what user is requesting access), the smart contract will then enforce the rules for the referenced entity objects as they apply specifically to that particular user, without any of the entity objects, users, or access permissions being coded within the smart contract. In such a way, an entirely generic smart contract may be utilized for any company or organization, so long as such organizations utilize the metadata platform for configuring their access control objects to define such rules and permissions on the blockchain.

Further provided, as part of the access control objects, the ability to group entity objects and apply permissions to them for a particular user (e.g., participant) or for a group of participants or a group that defines many participants.

For example, it is permissible via the access control objects to define that user John may access an defined entity group having multiple entities within it. For example, user John may access both a grades entity object and also a schedule entity object. Or a group of users may have read access to a defined entity group having both vehicle entity objects and also part number objects. Thus, the access control objects may define that a single user participant 1320 may access a single entity 1325, or may define that a group of user participants 1320 may access a single access a single entity 1325, or may define that a single user participant 1320 may access a group of blockchain entities 1325, or may define that multiple user participants 1320 may access such a group of multiple blockchain entities 1325.

According to the described embodiments, the access control objects may include embedded criteria which is to be enforced, but which is wholly unknown by the executing smart contract until run time because the criteria is not coded into such a smart contract.

For example, consider a medical patient having undergone a clinical trial and provides consent for certain doctors to see the information. Such a user may define that the doctors have consent to view the information for no more than 3 months from the conclusion of the clinical trial.

With such an example, it simply cannot be known at the time that the criteria is written to the blockchain whether or not the criteria will resolve to permissible access or prohibited access at the time that some future unknown access request is received to the blockchain. For example, one month after the clinical trial, a request by the doctor to retrieve the data would be permissible, however, at three months and one day after the conclusion of the clinical trial, the identical request by the exact same doctor for the exact same information would be a prohibited access.

Therefore, it is in accordance with the described embodiments that a smart contract interpreter operates to dynamically resolve criteria at run time and determine whether or not a rule applies and whether or not an access request is permissible or impermissible.

Figure 16A:
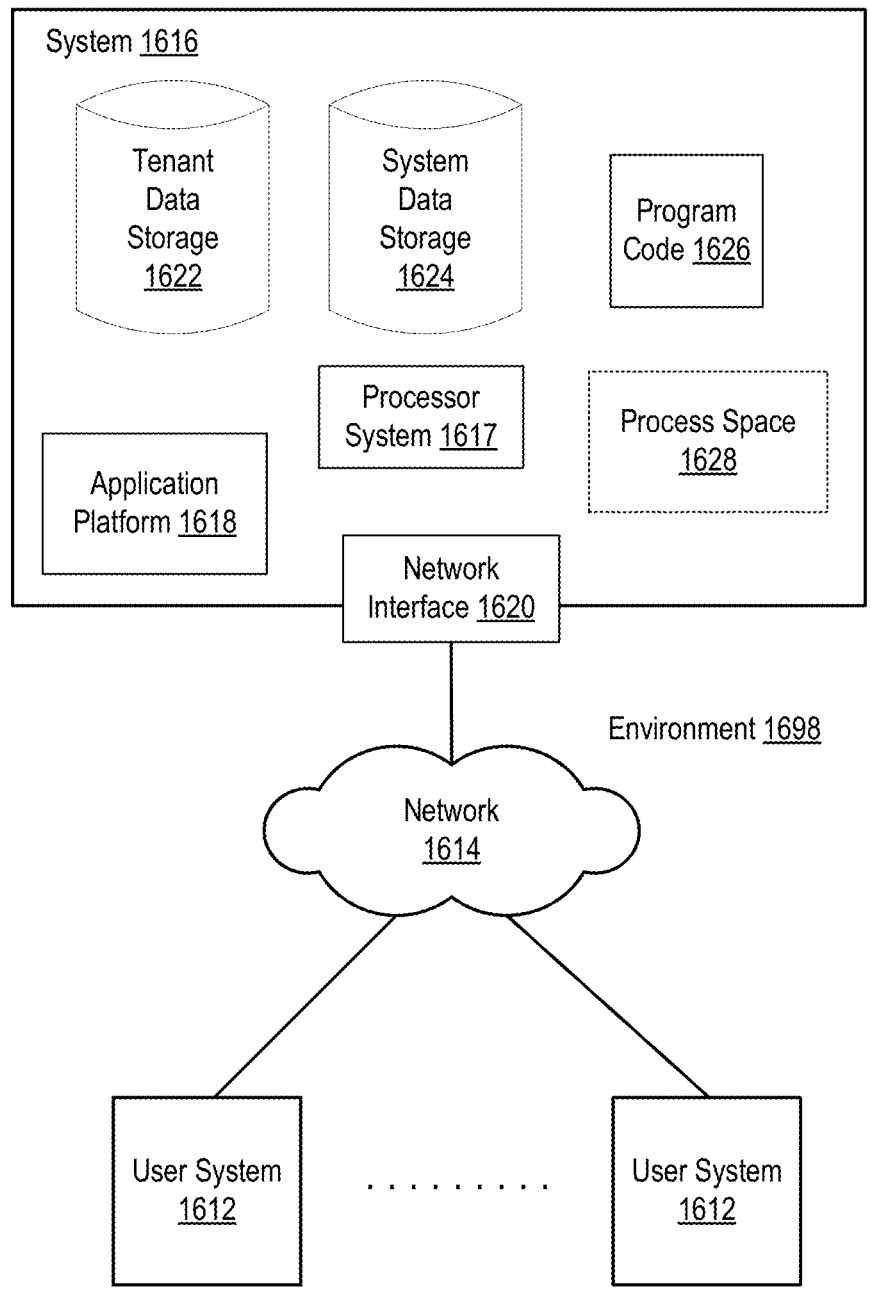
FIG. 16A illustrates a block diagram of an environment in which an on-demand database service may operate in accordance with described embodiments.

FIG. 16A illustrates a block diagram of an environment 1698 in which an on-demand database service may operate in accordance with the described embodiments. Environment 1698 may include user systems 1612, network 1614, system 1616, processor system 1617, application platform 1618, network interface 1620, tenant data storage 1622, system data storage 1624, program code 1626, and process space 1628. In other embodiments, environment 1698 may not have all of the components listed and/or may have other elements instead of, or in addition to, those listed above.

Environment 1698 is an environment in which an on-demand database service exists. User system 1612 may be any machine or system that is used by a user to access a database user system. For example, any of user systems 1612 may be a handheld computing device, a mobile phone, a laptop computer, a work station, and/or a network of computing devices. As illustrated in FIG. 16A (and in more detail in FIG. 16B) user systems 1612 might interact via a network 1614 with an on-demand database service, which is system 1616.

An on-demand database service, such as system 1616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1616" and "system 1616" is used interchangeably herein. A database image may include one or more database objects. A relational database management system (RDMS) or the equivalent may execute storage and retrieval of information against the database object(s). Application platform 1618 may be a framework that allows the applications of system 1616 to run, such as the hardware and/or software, e.g., the operating system. In an embodiment, on-demand database service 1616 may include an application platform 1618 that enables creation, managing and executing one or more applications developed by the provider of the on-demand database service, users accessing the on-demand database service via user systems 1612, or third party application developers accessing the on-demand database service via user systems 1612.

The users of user systems 1612 may differ in their respective capacities, and the capacity of a particular user system 1612 might be entirely determined by permissions (permission levels) for the current user. For example, where a salesperson is using a particular user system 1612 to interact with system 1616, that user system has the capacities allotted to that salesperson. However, while an administrator is using that user system to interact with system 1616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 1614 is any network or combination of networks of devices that communicate with one another. For example, network 1614 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 1612 might communicate with system 1616 using TCP/IP and, at a higher network level, use other common Internet protocols to communicate, such as HTTP, FTP, AFS, WAP, etc. In an example where HTTP is used, user system 1612 might include an HTTP client commonly referred to as a "browser" for sending and receiving HTTP messages to and from an HTTP server at system 1616. Such an HTTP server might be implemented as the sole network interface between system 1616 and network 1614, but other techniques might be used as well or instead. In some implementations, the interface between system 1616 and network 1614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1616, shown in FIG. 16A, implements a web-based Customer Relationship Management (CRM) system. For example, in one embodiment, system 1616 includes application servers configured to implement and execute CRM software applications as well as provide related data, code, forms, webpages and other information to and from user systems 1612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1616 implements applications other than, or in addition to, a CRM application. For example, system 1616 may provide tenant access to multiple hosted (standard and custom) applications, including a CRM application. User (or third party developer) applications, which may or may not include CRM, may be supported by the application platform 1618, which manages creation, storage of the applications into one or more database objects and executing of the applications in a virtual machine in the process space of the system 1616.

One arrangement for elements of system 1616 is shown in FIG. 16A, including a network interface 1620, application platform 1618, tenant data storage 1622 for tenant data 1623, system data storage 1624 for system data 1625 accessible to system 1616 and possibly multiple tenants, program code 1626 for implementing various functions of system 1616, and a process space 1628 for executing MTS system processes and tenant-specific processes, such as running applications as part of an application hosting service. Additional processes that may execute on system 1616 include database indexing processes.

Several elements in the system shown in FIG. 16A include conventional, well-known elements that are explained only briefly here. For example, each user system 1612 may include a desktop personal computer, workstation, laptop, PDA, cell phone, or any wireless access protocol (WAP) enabled device or any other computing device capable of interfacing directly or indirectly to the Internet or other network connection. User system 1612 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 1612 to access, process and view information, pages and applications available to it from system 1616 over network 1614. Each user system 1612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1616 or other systems or servers. For example, the user interface device may be used to access data and applications hosted by system 1616, and to perform searches on stored data, and otherwise allows a user to interact with various GUI pages that may be presented to a user. As discussed above, embodiments are suitable for use with the Internet, which refers to a specific global internetwork of networks. However, it is understood that other networks may be used instead of the Internet, such as an intranet, an extranet, a virtual private network (VPN), a non-TCP/IP based network, any LAN or WAN or the like.

According to one embodiment, each user system 1612 and all of its components are operator configurable using applications, such as a browser, including computer code run using a central processing unit such as an Intel Pentium® processor or the like. Similarly, system 1616 (and additional instances of an MTS, where more than one is present) and all of their components might be operator configurable using application(s) including computer code to run using a central processing unit such as processor system 1617, which may include an Intel Pentium® processor or the like, and/or multiple processor units.

According to one embodiment, each system 1616 is configured to provide webpages, forms, applications, data and media content to user (client) systems 1612 to support the access by user systems 1612 as tenants of system 1616. As such, system 1616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 16B:
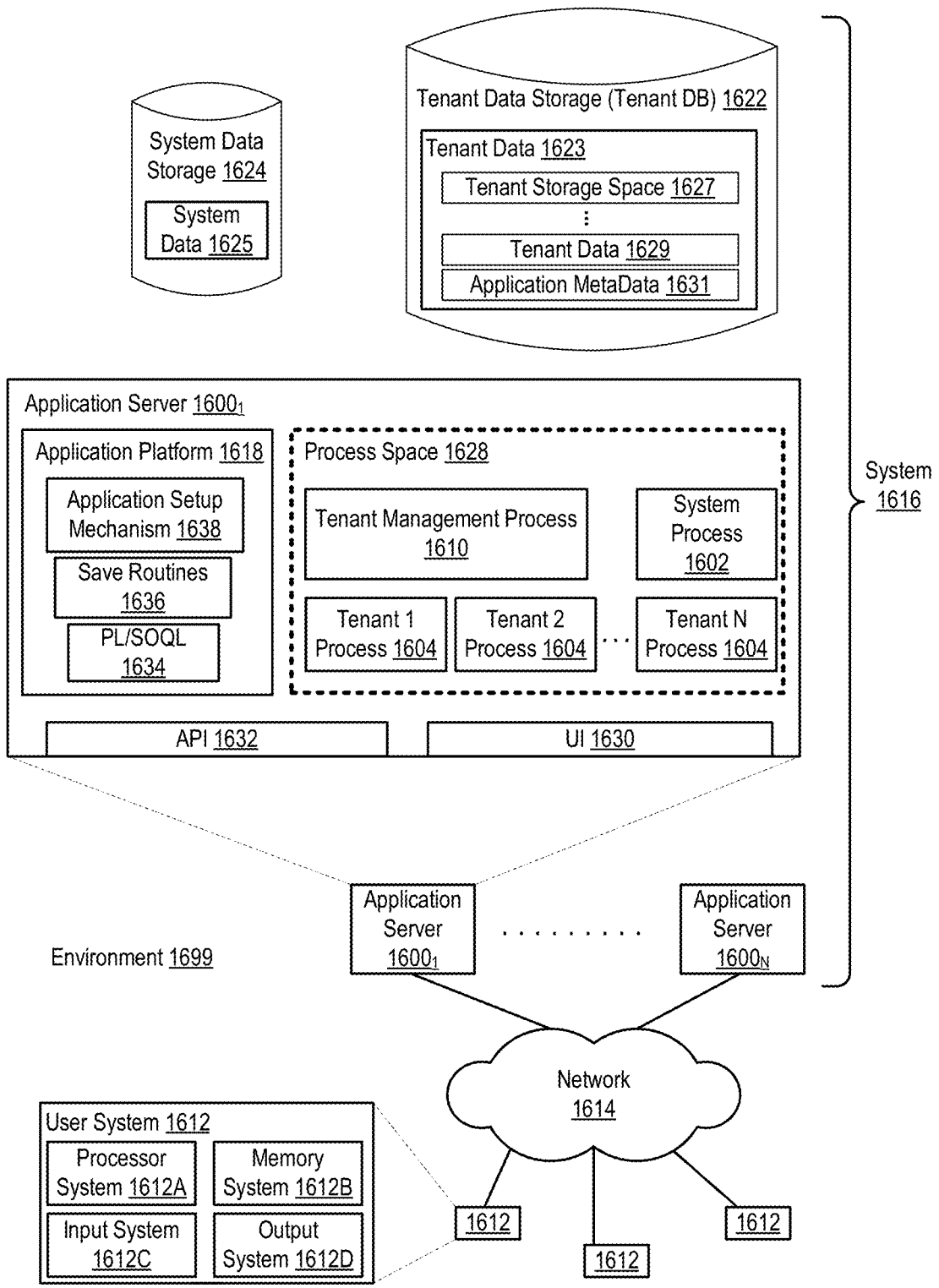
FIG. 16B illustrates another block diagram of an embodiment of elements of FIG. 16A and various possible interconnections between such elements in accordance with described embodiments.

FIG. 16B illustrates another block diagram of an embodiment of elements of FIG. 16A and various possible interconnections between such elements in accordance with the described embodiments. FIG. 16B also illustrates environment 1699. However, in FIG. 16B, the elements of system 1616 and various interconnections in an embodiment are illustrated in further detail. More particularly, FIG. 16B shows that user system 1612 may include a processor system 1612A, memory system 1612B, input system 1612C, and output system 1612D. FIG. 16B shows network 1614 and system 1616. FIG. 16B also shows that system 1616 may include tenant data storage 1622, having therein tenant data 1623, which includes, for example, tenant storage space 1627, tenant data 1629, and application metadata 1631. System data storage 1624 is depicted as having therein system data 1625. Further depicted within the expanded detail of application servers $1600_{1-N}$ are User Interface (UI) 1630, Application Program Interface (API) 1632, application platform 1618 includes PL/SOQL 1634, save routines 1636, application setup mechanism 1638, process space 1628 includes system process space 1602, tenant 1-N process spaces 1604, and tenant management process space 1610. In other embodiments, environment 1699 may not have the same elements as those listed above and/or may have other elements instead of, or in addition to, those listed above.

User system 1612, network 1614, system 1616, tenant data storage 1622, and system data storage 1624 were discussed above in FIG. 16A. As shown by FIG. 16B, system 1616 may include a network interface 1620 (of FIG. 16A) implemented as a set of HTTP application servers 1600, an application platform 1618, tenant data storage 1622, and system data storage 1624. Also shown is system process space 1602, including individual tenant process spaces 1604 and a tenant management process space 1610. Each application server 1600 may be configured to tenant data storage 1622 and the tenant data 1623 therein, and system data storage 1624 and the system data 1625 therein to serve requests of user systems 1612. The tenant data 1623 might be divided into individual tenant storage areas (e.g., tenant storage space 1627), which may be either a physical arrangement and/or a logical arrangement of data. Within each tenant storage space 1627, tenant data 1629, and application metadata 1631 might be similarly allocated for each user. For example, a copy of a user's most recently used (MRU) items might be stored to tenant data 1629. Similarly, a copy of MRU items for an entire organization that is a tenant might be stored to tenant storage space 1627. A UI 730 provides a user interface and an API 1632 provides an application programmer interface into system 1616 resident processes to users and/or developers at user systems 1612. The tenant data and the system data may be stored in various databases, such as one or more Oracle™ databases.

Application platform 1618 includes an application setup mechanism 1638 that supports application developers' creation and management of applications, which may be saved as metadata into tenant data storage 1622 by save routines 1636 for execution by subscribers as one or more tenant process spaces 1604 managed by tenant management process space 1610 for example. Invocations to such applications may be coded using PL/SOQL 1634 that provides a programming language style interface extension to API 1632. Invocations to applications may be detected by one or more system processes, which manages retrieving application metadata 1631 for the subscriber making the invocation and executing the metadata as an application in a virtual machine.

Each application server 1600 may be communicably coupled to database systems, e.g., having access to system data 1625 and tenant data 1623, via a different network connection. For example, one application server 1600$_1$ might be coupled via the network 1614 (e.g., the Internet), another application server 1600$_{N-1}$ might be coupled via a direct network link, and another application server 1600$_N$ might be coupled by yet a different network connection. Transfer Control Protocol and Internet Protocol (TCP/IP) are typical protocols for communicating between application servers 1600 and the database system. However, it will be apparent to one skilled in the art that other transport protocols may be used to optimize the system depending on the network interconnect used.

In certain embodiments, each application server 1600 is configured to handle requests for any user associated with any organization that is a tenant. Because it is desirable to be able to add and remove application servers from the server pool at any time for any reason, there is preferably no server affinity for a user and/or organization to a specific application server 1600. In one embodiment, therefore, an interface system implementing a load balancing function (e.g., an F5 Big-IP load balancer) is communicably coupled between the application servers 1600 and the user systems 1612 to distribute requests to the application servers 1600. In one embodiment, the load balancer uses a least connections algorithm to route user requests to the application servers 1600. Other examples of load balancing algorithms, such as round robin and observed response time, also may be used. For example, in certain embodiments, three consecutive requests from the same user may hit three different application servers 1600, and three requests from different users may hit the same application server 1600. In this manner, system 1616 is multi-tenant, in which system 1616 handles storage of, and access to, different objects, data and applications across disparate users and organizations.

As an example of storage, one tenant might be a company that employs a sales force where each salesperson uses system 1616 to manage their sales process. Thus, a user might maintain contact data, leads data, customer follow-up data, performance data, goals and progress data, etc., all applicable to that user's personal sales process (e.g., in tenant data storage 1622). In an example of a MTS arrangement, since all of the data and the applications to access, view, modify, report, transmit, calculate, etc., may be maintained and accessed by a user system having nothing more than network access, the user may manage his or her sales efforts and cycles from any of many different user systems. For example, if a salesperson is visiting a customer and the customer has Internet access in their lobby, the salesperson may obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1616 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1616 might also maintain system level data usable by multiple tenants or other data. Such system level data might include industry reports, news, postings, and the like that are sharable among tenants.

In certain embodiments, user systems 1612 (which may be client systems) communicate with application servers 1600 to request and update system-level and tenant-level data from system 1616 that may require sending one or more queries to tenant data storage 1622 and/or system data storage 1624. System 1616 (e.g., an application server 1600 in system 1616) automatically generates one or more SQL statements (e.g., one or more SQL queries) that are designed to access the desired information. System data storage 1624 may generate query plans to access the requested data from the database.

Each database may generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 17:
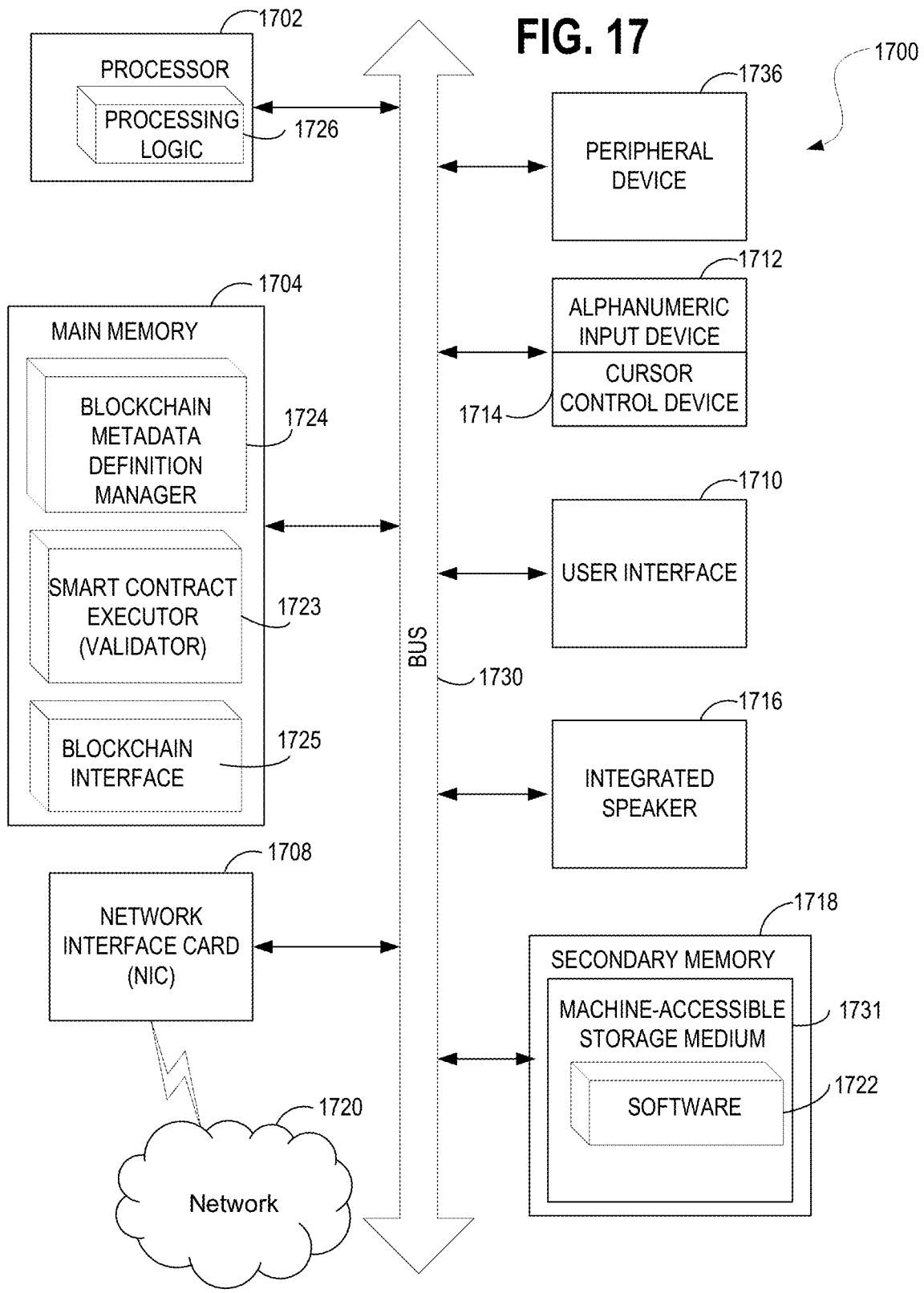
FIG. 17 illustrates a diagrammatic representation of a machine in the exemplary form of a computer system in accordance with described embodiments.

FIG. 17 illustrates a diagrammatic representation of a machine 1700 in the exemplary form of a computer system, in accordance with one embodiment, within which a set of instructions, for causing the machine/computer system 1700 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1700 includes a processor 1702, a main memory 1704 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1718 (e.g., a persistent storage device including hard disk drives and a persistent database and/or a multi-tenant database implementation), which communicate with each other via a bus 1730. Main memory 1704 includes a blockchain metadata definition manager 1724 and a smart contract executor (e.g., smart contract validator) 1723 and a blockchain interface 1725. Main memory 1704 and its sub-elements are operable in conjunction with processing logic 1726 and processor 1702 to perform the methodologies discussed herein.

Processor 1702 represents one or more general-purpose processing devices such as a microprocessor, central processing unit, or the like. More particularly, the processor 1702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1702 may also be one or more special-purpose processing devices such as an application specific integrated circuit (ASIC), a field programmable gate array (FPGA), a digital signal processor (DSP), network processor, or the like. Processor 1702 is configured to execute the processing logic 1726 for performing the operations and functionality which is discussed herein.

The computer system 1700 may further include a network interface card 1708. The computer system 1700 also may include a user interface 1710 (such as a video display unit, a liquid crystal display, etc.), an alphanumeric input device 1712 (e.g., a keyboard), a cursor control device 1714 (e.g., a mouse), and a signal generation device 1716 (e.g., an integrated speaker). The computer system 1700 may further include peripheral device 1736 (e.g., wireless or wired communication devices, memory devices, storage devices, audio processing devices, video processing devices, etc.).

The secondary memory 1718 may include a non-transitory machine-readable storage medium or a non-transitory computer readable storage medium or a non-transitory machine-accessible storage medium 1731 on which is stored one or more sets of instructions (e.g., software 1722) embodying any one or more of the methodologies or functions described herein. The software 1722 may also reside, completely or at least partially, within the main memory 1704 and/or within the processor 1702 during execution thereof by the computer system 1700, the main memory 1704 and the processor 1702 also constituting machine-readable storage media. The software 1722 may further be transmitted or received over a network 1720 via the network interface card 1708.

None of the claims in the are intended to invoke paragraph six of 35 U.S.C. § 112 unless the exact words "means for" are followed by a participle. While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method performed by a system of a host organization, the system having at least a processor and a memory therein, wherein the method comprises:

executing instructions via the processor configurable to cause the system to operate a blockchain interface to a blockchain on behalf of a plurality of customers of the host organization, wherein the host organization operates as a participating node on the blockchain to enable interactions between the host organization and the blockchain and further wherein each of the plurality of customers operate as a participating node on the blockchain;

receiving a read request at the host organization, wherein the read request specifies data to be retrieved which is stored on the blockchain on behalf of a user authenticated with the host organization;

issuing a write transaction, via the participating node of the host organization, by the host organization executing the write transaction to the blockchain specifying both (i) the user and (ii) the read request;

wherein the write transaction automatically triggers execution of a smart contract to enforce access controls for the user;

attaining consensus from the participating nodes of the blockchain for the write transaction at the blockchain pursuant to the access controls for the user being validated by the smart contract as allowing the user to read the data specified by the read request, wherein the write transaction is added to the blockchain with an indication the user has permission to read the data specified by the read request;

wherein the blockchain issues a thrown event indicating the user has permission to read the data specified by the read request and responsively returns the data specified from the blockchain to the host organization;

receiving the data specified at the host organization, sent from the blockchain to the host organization via the blockchain interface; and returning the data specified by the read request from the host organization to the user in fulfillment of the read request.

2. The method of claim 1, further comprising:
registering an event listener of the host organization with the blockchain;
catching the thrown event at the event listener of the host organization;
extracting the data retrieved from the blockchain from the thrown event; and
wherein returning the data retrieved from the blockchain to the user comprises the event listener returning the data retrieved to the user as extracted from the thrown event.

3. The method of claim 1, further comprising:
periodically polling the blockchain to determine whether consensus has been attained for the write transaction indicating the user has permission to read the data identified by the read request;
wherein retrieving the data from the blockchain identified by the read request comprises retrieving the data responsive to the periodic polling of the blockchain determining that consensus has been attained for the write transaction; and
wherein returning the data retrieved from the blockchain to the user in fulfillment of the read request is performed responsive to determining that consensus has been attained for the write transaction.

4. The method of claim 1, further comprising:
receiving a second read request for other data stored on the blockchain from the user authenticated with the host organization;
issuing a second write transaction to the blockchain specifying both (i) the user and (ii) the read second read request;
wherein the second write transaction automatically triggers execution of the smart contract to enforce the access controls for the user; and
wherein consensus fails for the second write transaction.

5. The method of claim 4:
wherein the second write transaction is prevented from being written to the blockchain; and
wherein executing the smart contract throws a second event indicating the user lacks permission to read the other data identified by the read request.

6. The method of claim 1, wherein throwing the event comprises the smart contract executing on the blockchain throwing the event indicating either a denial of the read request based on the user lacking permission to read the data or an approval of the read request based the user having permission to read the data identified by the read request pursuant to access controls.

7. The method of claim 1, further comprising:
executing a second smart contract on the blockchain;
wherein the second smart contract reads the write transaction having previously been added to the blockchain with the indication the user has permission to read the data identified by the read request; and
wherein the second smart contract executing on the blockchain throws the event indicating the user has permission to read the data identified by the read request and returning as part of the thrown event, the data retrieved from the blockchain.

8. The method of claim 1:
wherein an event listener executing at the host organization subscribes to write events on the blockchain;
wherein the event listener receives a notification from the blockchain upon consensus being attained for the write transaction and the write transaction having been successfully added to the blockchain with the indication that the user has permission to read the data identified by the read request from the blockchain; and
wherein throwing the event comprises the event listener throwing the event indicating the user has permission to read the data identified by the read request and returning as part of the thrown event, the data retrieved from the blockchain.

9. The method of claim 1:
wherein the blockchain provides access controls for write transactions to the blockchain; and
wherein the blockchain does not provide access controls for read transactions from the blockchain.

10. The method of claim 1:
wherein an implementing protocol for the blockchain provides consensus on write;
wherein any write transaction on the blockchain is subjected to consensus by the participating nodes on the blockchain; and
wherein the implementing protocol for the blockchain does not require consensus for reads from the blockchain.

11. The method of claim 1, further comprising:
associating the smart contract with a transaction type corresponding to the write transaction for the blockchain;
wherein the smart contract implements a consensus on read validation scheme triggered by the write transaction matching the transaction type associated with the smart contract;
wherein the smart contract reads metadata from the blockchain defining the access controls for the user enforces the access controls for read requests arriving at the blockchain via write transactions to the blockchain.

12. The method of claim 1, further comprising:
receiving input from a GUI defining access controls for one or more users of the host organization;

generating metadata representing the defined access controls; and transacting the metadata representing the defined access controls onto the blockchain; and wherein the smart contract reads the metadata representing the defined access controls from the blockchain at run-time to enforce the access controls for the user's read request.

13. Non-transitory computer readable storage media having instructions stored thereon that, when executed by a system of a host organization having at least a processor and a memory therein, the instructions cause the system to perform the following operations:

executing instructions via the processor configurable to cause the system to operate a blockchain interface to a blockchain on behalf of a plurality of customers of the host organization, wherein the host organization operates as a participating node on the blockchain to enable interactions between the host organization and the blockchain and further wherein each of the plurality of customers operate as a participating node on the blockchain;

receiving a read request at the host organization, wherein the read request specifies data to be retrieved which is stored on the blockchain on behalf of a user authenticated with the host organization;

issuing a write transaction, via the participating node of the host organization, by the host organization executing the write transaction to the blockchain specifying both (i) the user and (ii) the read request;

wherein the write transaction automatically triggers execution of a smart contract to enforce access controls for the user;

attaining consensus from the participating nodes of the blockchain for the write transaction at the blockchain pursuant to the access controls for the user being validated by the smart contract as allowing the user to read the data specified by the read request, wherein the write transaction is added to the blockchain with an indication the user has permission to read the data specified by the read request;

wherein the blockchain issues a thrown event indicating the user has permission to read the data specified by the read request and responsively returns the data specified from the blockchain to the host organization;

receiving the data specified at the host organization, sent from the blockchain to the host organization via the blockchain interface; and returning the data specified by the read request from the host organization to the user in fulfillment of the read request.

14. The non-transitory computer readable storage media of claim 13, wherein the instruction, when executed by the processor, cause the system to perform operations further including:

registering an event listener of the host organization with the blockchain;

catching the thrown event at the event listener of the host organization;

extracting the data retrieved from the blockchain from the thrown event; and wherein returning the data retrieved from the blockchain to the user comprises the event listener returning the data retrieved to the user as extracted from the thrown event.

15. The non-transitory computer readable storage media of claim 13, wherein the instruction, when executed by the processor, cause the system to perform operations further including:

periodically polling the blockchain to determine whether consensus has been attained for the write transaction indicating the user has permission to read the data identified by the read request;

wherein retrieving the data from the blockchain identified by the read request comprises retrieving the data responsive to the periodic polling of the blockchain determining that consensus has been attained for the write transaction; and wherein returning the data retrieved from the blockchain to the user in fulfillment of the read request is performed responsive to determining that consensus has been attained for the write transaction.

16. The non-transitory computer readable storage media of claim 13: wherein the second write transaction is prevented from being written to the blockchain; and wherein executing the smart contract throws a second event indicating the user lacks permission to read the other data identified by the read request.

17. The non-transitory computer readable media of claim 13:

wherein an event listener executing at the host organization subscribes to write events on the blockchain;

wherein the event listener receives a notification from the blockchain upon consensus being attained for the write transaction and the write transaction having been successfully added to the blockchain with the indication that the user has permission to read the data identified by the read request from the blockchain; and wherein throwing the event comprises the event listener throwing the event indicating the user has permission to read the data identified by the read request and returning as part of the thrown event, the data retrieved from the blockchain.

18. A system to execute at a host organization, wherein the system comprises:

a memory to store instructions;

a set of one or more processors;

a non-transitory machine-readable storage medium that provides instructions that, when executed by the set of one or more processors, the instructions stored in the memory are configurable to cause the system to perform operations comprising:

executing instructions via the processor configurable to cause the system to operate a blockchain interface to a blockchain on behalf of a plurality of customers of the host organization, wherein the host organization operates as a participating node on the blockchain to enable interactions between the host organization and the blockchain and further wherein each of the plurality of customers operate as a participating node on the blockchain;

receiving a read request at the host organization, wherein the read request specifies data to be retrieved which is stored on the blockchain on behalf of a user authenticated with the host organization;

issuing a write transaction, via the participating node of the host organization, by the host organization executing the write transaction to the blockchain specifying both (i) the user and (ii) the read request;

wherein the write transaction automatically triggers execution of a smart contract to enforce access controls for the user;

attaining consensus from the participating nodes of the blockchain for the write transaction at the blockchain pursuant to the access controls for the user being validated by the smart contract as allowing the user to read the data specified by the read request, wherein the write transaction is added to the blockchain with an indication the user has permission to read the data specified by the read request;

wherein the blockchain issues a thrown event indicating the user has permission to read the data specified by the read request and responsively returns the data specified from the blockchain to the host organization;

receiving the data specified at the host organization, sent from the blockchain to the host organization via the blockchain interface; and returning the data specified by the read request from the host organization to the user in fulfillment of the read request.

19. The system of claim 18, wherein the system is further configured to:

register an event listener of the host organization with the blockchain;

catch the thrown event at the event listener of the host organization;

extract the data retrieved from the blockchain from the thrown event; and wherein returning the data retrieved from the blockchain to the user comprises the event listener to return the data retrieved to the user as extracted from the thrown event.

20. The system of claim 18, wherein the system is further configured to:

periodically poll the blockchain to determine whether consensus has been attained for the write transaction indicating the user has permission to read the data identified by the read request;

wherein retrieving the data from the blockchain identified by the read request comprises the system to retrieve the data responsive to the periodic polling of the blockchain determining that consensus has been attained for the write transaction; and wherein returning the data retrieved from the blockchain to the user in fulfillment of the read request is performed responsive to determining that consensus has been attained for the write transaction.

* * * * *